United States Patent
Ono et al.

(10) Patent No.: US 9,413,251 B2
(45) Date of Patent: Aug. 9, 2016

(54) POWER DELIVERY DEVICE, AC ADAPTER, ELECTRONIC APPARATUS AND POWER DELIVERY SYSTEM, HAVING VARIABLE FUNCTION OF OUTPUT VOLTAGE VALUE AND AVAILABLE OUTPUT CURRENT CAPACITY

(71) Applicant: ROHM CO., LTD., Kyoto (JP)

(72) Inventors: Akihiro Ono, Kyoto (JP); Isao Yamamoto, Kyoto (JP); Satoru Nate, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 230 days.

(21) Appl. No.: 14/155,980

(22) Filed: Jan. 15, 2014

(65) Prior Publication Data

US 2014/0313793 A1    Oct. 23, 2014

(30) Foreign Application Priority Data

Jan. 15, 2013  (JP) ................................ 2013-004909
Feb. 25, 2013  (JP) ................................ 2013-034509
Feb. 26, 2013  (JP) ................................ 2013-035321

(51) Int. Cl.
*H02M 3/335*    (2006.01)
*H02J 7/00*    (2006.01)

(52) U.S. Cl.
CPC .... *H02M 3/33523* (2013.01); *H02J 2007/0096* (2013.01)

(58) Field of Classification Search
CPC ................................................. H02J 2007/0095
USPC ................ 363/17–19, 21.12–21.17, 44, 56.1, 363/56.11, 123
See application file for complete search history.

(56) References Cited

U.S. PATENT DOCUMENTS

| | | | | |
|---|---|---|---|---|
| 5,006,975 A | * | 4/1991 | Neufeld | H02M 1/4225 323/222 |
| 5,699,238 A | * | 12/1997 | Lee | H02M 7/53871 363/21.03 |
| 6,972,969 B1 | * | 12/2005 | Shteynberg | H02M 3/33523 363/21.12 |
| 7,170,761 B2 | * | 1/2007 | Yasumura | H02M 1/4241 363/17 |
| 7,646,189 B2 | * | 1/2010 | Chen | H02M 3/156 323/224 |
| 7,821,237 B2 | * | 10/2010 | Melanson | H02M 1/4225 323/222 |
| 7,852,646 B2 | * | 12/2010 | Rajne | H02M 7/53871 363/95 |
| 7,969,124 B2 | * | 6/2011 | Matsuda | G05F 1/62 323/220 |

(Continued)

FOREIGN PATENT DOCUMENTS

JP    2011-082802 A    4/2011

OTHER PUBLICATIONS

"Special Edition: Power Delivery with Data Lines", Nikkei Electronics, Oct. 9, 2012, pp. 23-40. With English translation.

*Primary Examiner* — Adolf Berhane
*Assistant Examiner* — Nusrat Quddus
(74) *Attorney, Agent, or Firm* — Cantor Colburn LLP

(57) ABSTRACT

The PD device includes: a DC/DC converter disposed between an input and an output; a primary-side controller configured to control an input current of the DC/DC converter; and a secondary-side controller connected with AC coupling to the output, and configured to feed back electric power information of the output to the primary-side controller. The primary-side controller varies an output voltage value and an available output current capacity of the DC/DC converter by controlling the input current on the basis of the electric power information fed back from the secondary-side controller.

16 Claims, 38 Drawing Sheets

(56) References Cited

U.S. PATENT DOCUMENTS

| | | | |
|---|---|---|---|
| 8,797,772 B2 * | 8/2014 | Thomas | H02M 3/156 363/71 |
| 9,007,048 B2 * | 4/2015 | Chen | G05F 1/10 323/285 |
| 2014/0160801 A1 * | 6/2014 | Stamm | H05B 33/0815 363/21.01 |

* cited by examiner

FIG. 12
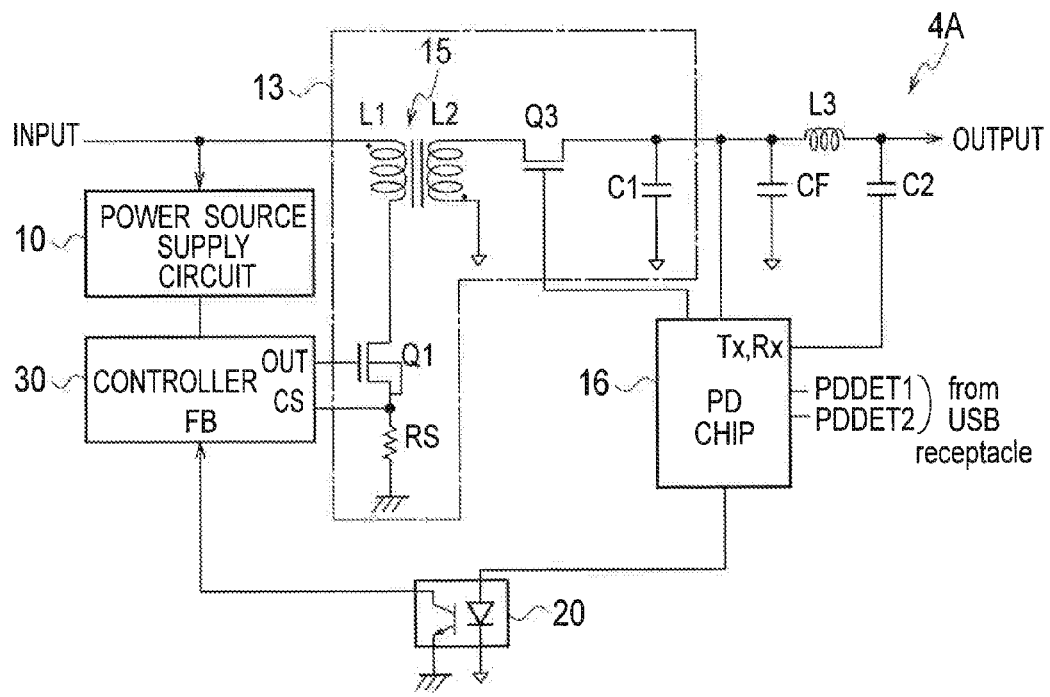
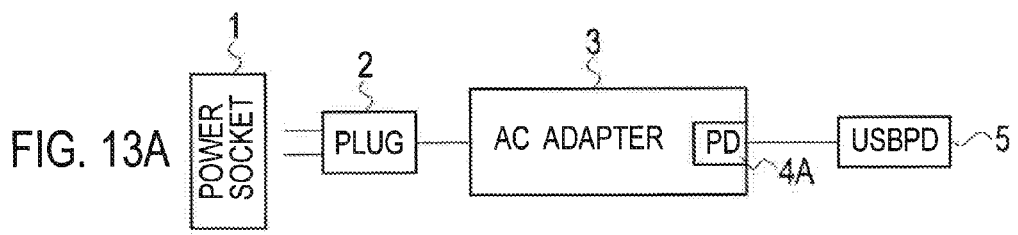
FIG. 13A
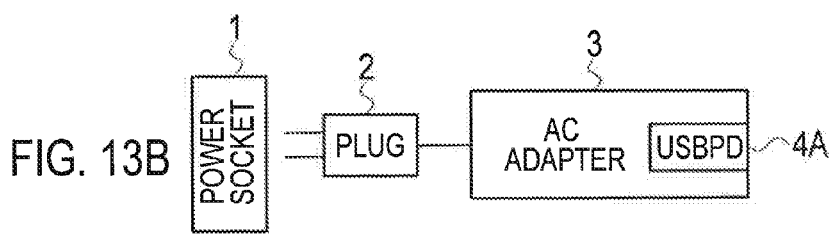
FIG. 13B
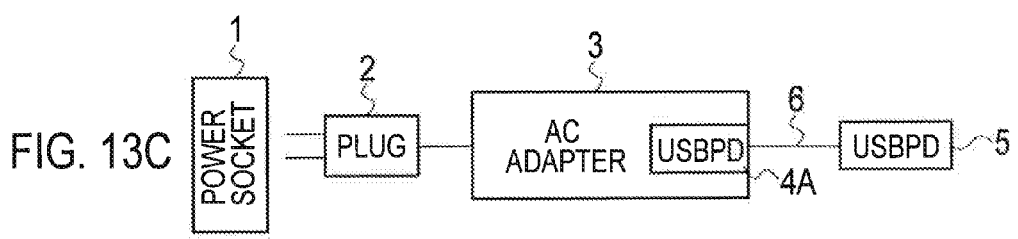
FIG. 13C

POWER DELIVERY DEVICE, AC ADAPTER, ELECTRONIC APPARATUS AND POWER DELIVERY SYSTEM, HAVING VARIABLE FUNCTION OF OUTPUT VOLTAGE VALUE AND AVAILABLE OUTPUT CURRENT CAPACITY

CROSS REFERENCE TO RELATED APPLICATIONS AND INCORPORATION BY REFERENCE

This application is based upon and claims the benefit of priority from prior Japanese Patent Application Nos. P2013-004909 filed on Jan. 15, 2013, P2013-034509 filed on Feb. 25, 2013, and P2013-035321 filed on Feb. 26, 2013, the entire contents of which are incorporated herein by reference.

TECHNICAL FIELD

The present invention relates to a Power Delivery (PD) device, an Alternating-Current (AC) adapter, an electronic apparatus, and a Power Delivery (PD) system. The present invention relates in particular to a PD device, an AC adapter, an electronic apparatus, and a PD system each which have a variable function of an output voltage value and an available output current capacity (MAX value).

BACKGROUND ART

Conventionally, there have been provided Direct Current (DC) power sockets which can intercommunicate between terminal devices and power line carrier communication networks supporting telecommunications standards with a power delivery (Refer to Patent Literature 1, for example.).

There are Power over Ethernet (PoE) technology and Universal Serial Bus (USB) technology as a power delivery technology using data lines (Refer to Non Patent Literature 1, for example.).

As the USB technologies, there are USB 2.0 Standard up to maximum supply power of 2.5 W, USB 3.0 Standard up to maximum supply power of 4.5 W, and Battery Charging Standard (BCS) Revision 1.2 up to maximum supply power of 7.5 W according to the power delivery level.

A USB Power Delivery (USB PD) Specification Revision 1.0 is compatible with existing cables and existing connectors, and coexists also with the USB 2.0 Standard, the USB 3.0 Standard, and the USB Battery Charging Standard (BCS) Revision 1.2. In such a standard, values of the charging current and voltage is selectable within a range of voltage 5V-12V-20V and a range of current 1.5 A-2 A-3 A-5 A, and the USB electric charging and power transmission can be achieved to be 10 W, 18 W, 36 W, 65 W, and the maximum of 100 W.

DC/DC converters have been used as a power source for achieving such a power delivery. There are a diode rectification system and a synchronous rectification method in the DC/DC converters.

CITATION LIST

Patent Literature 1: Japanese Patent Application Laying-Open Publication No. 2011-82802
Non-Patent Literature 1: "Special Edition: Power Delivery with Data Lines", Nikkei Electronics, Oct. 9, 2012, pp. 23-40

SUMMARY OF THE INVENTION

Technical Problem

The object of the present invention is to provide a PD device, an AC adapter, an electronic apparatus, and a PD system each which can control a variable function of an output voltage value and an available output current capacity (MAX value).

Solution to Problem

According to one aspect of the present invention, there is provided a power delivery device comprising: a DC/DC converter disposed between an input and an output; a primary-side controller configured to control an input current of the DC/DC converter; and a secondary-side controller connected with AC coupling to the output, the secondary-side controller configured to feed back electric power information of the output to the primary-side controller, wherein the primary-side controller varies an output voltage value and an available output current capacity of the DC/DC converter by controlling the input current on the basis of the electric power information fed back from the secondary-side controller.

According to another aspect of the present invention, there is provided a power delivery device comprising: a DC/DC converter disposed between an input and an output; a primary-side controller configured to control an input current of the DC/DC converter; an AC coupling capacitor connected to the output; and an insulation circuit connected to the output through the AC coupling capacitor, the insulation circuit configured to feed back the electric power information of the output to the primary-side controller, wherein the primary-side controller varies an output voltage value and an available output current capacity of the DC/DC converter by controlling the input current on the basis of the electric power information fed back from the insulation circuit.

According to still another aspect of the present invention, there is provided an AC Adapter comprising the above-mentioned power delivery device.

According to still another aspect of the present invention, there is provided an electronic apparatus comprising any one of the above-mentioned power delivery devices.

According to still another aspect of the present invention, there is provided a power delivery system comprising any one of the above-mentioned power delivery devices.

Advantageous Effects of Invention

According to the present invention, there can be provided the PD device, the AC adapter, the electronic apparatus, and the PD system each which can control the variable function of the output voltage value and the available output current capacity (MAX value).

BRIEF DESCRIPTION OF DRAWINGS

FIG. 12 is a schematic circuit block configuration diagram showing a PD device according to a sixth embodiment.

FIG. 13A shows an example of wire connection in which a plug connectable to a power socket is connected to an AC adapter using a cable, and shows in particular an example in which a PD device in the AC adapter is connected to an external USB PD device using the cable.

FIG. 13B shows the example of wire connection in which the plug connectable to the power socket is connected to the AC adapter using the cable, and shows in particular an example in which a USB PD device is included in the AC adapter.

FIG. 13c shows the example of wire connection in which the plug connectable to the power socket is connected to the AC adapter using the cable, and shows in particular an example in which the USB PD device included in the AC adapter is connected to the external USB PD device using a USB PD cable.

DESCRIPTION OF EMBODIMENTS

Figure 1:
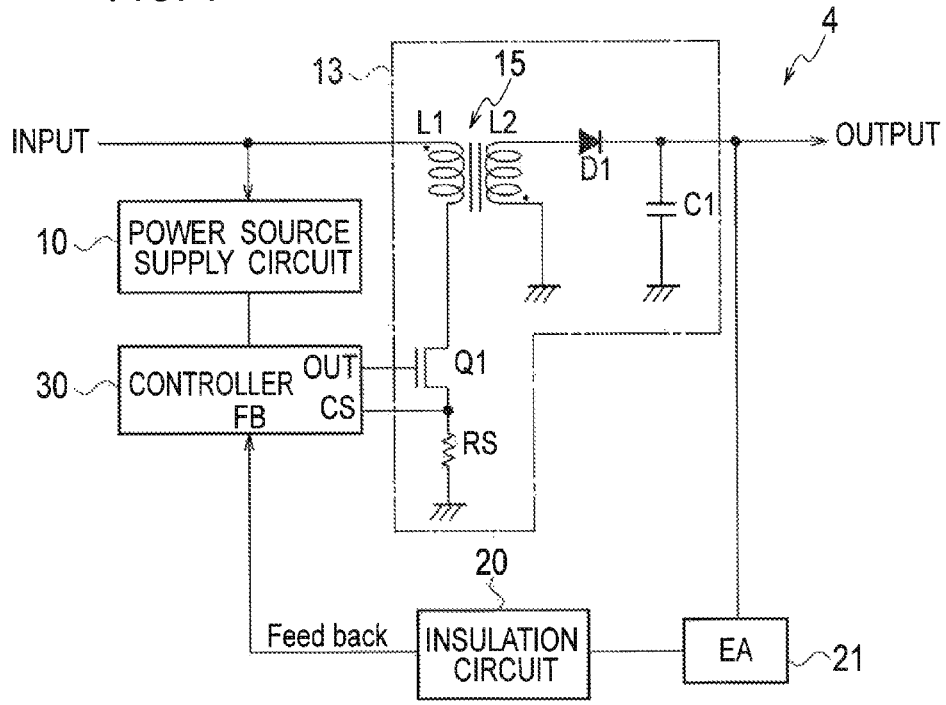
FIG. 1 is a schematic circuit block configuration diagram showing a first Power Delivery (PD) device according to basic technology.

There will be described embodiments of the present invention, with reference to the drawings. In the following drawings, same blocks or elements are designated by same reference characters to eliminate redundancy and for simplicity. However, it should be known about that the drawings are schematic and are differ from an actual thing. Of course, the part from which the relation and ratio of a mutual size differ also in mutually drawings is included.

The embodiments to be described hereinafter exemplify the apparatus and method for a technical concept or spirit of the present invention; and do not specify dispositions, etc. of each component part as examples mentioned below. The embodiments of the present invention may be changed without departing from the spirit or scope of claims.

[Basic Technology]

As shown in FIG. 1, a first PD device 4 according to a basic technology includes: a DC/DC converter 13 disposed between an input and an output, and composed of a transformer 15, a diode D1, a capacitor. C1, and a MOS transistor Q1 connected in series between a primary-side inductance L1 of the transformer 15 and a ground potential, and a resistor RS; a primary-side controller 30 configured to control the MOS transistor Q1; a power source supply circuit 10 connected between the input and the primary-side controller 30, and configured to supply a power source to the primary-side controller 30; an error amplifier 21 for error compensation connected to the output; and an insulation circuit 20 connected to the error amplifier 21 and configured to feed back output information to the primary-side controller 30.

In the first PD device 4 according to the basic technology, the voltage is fed back from the output. More specifically, the electric power information is fed back from the output (secondary) side to the input (primary) side, and ON/OFF of MOS transistor Q1 is controlled by the primary-side controller 30, thereby stabilizing the output voltage. The amount of current conducted to the primary-side inductance L1 in the transformer 15 is detected by the current sensing resistor RS, and the amount of current of the primary-side overcurrent is controlled in the primary-side controller 30.

Figure 2:
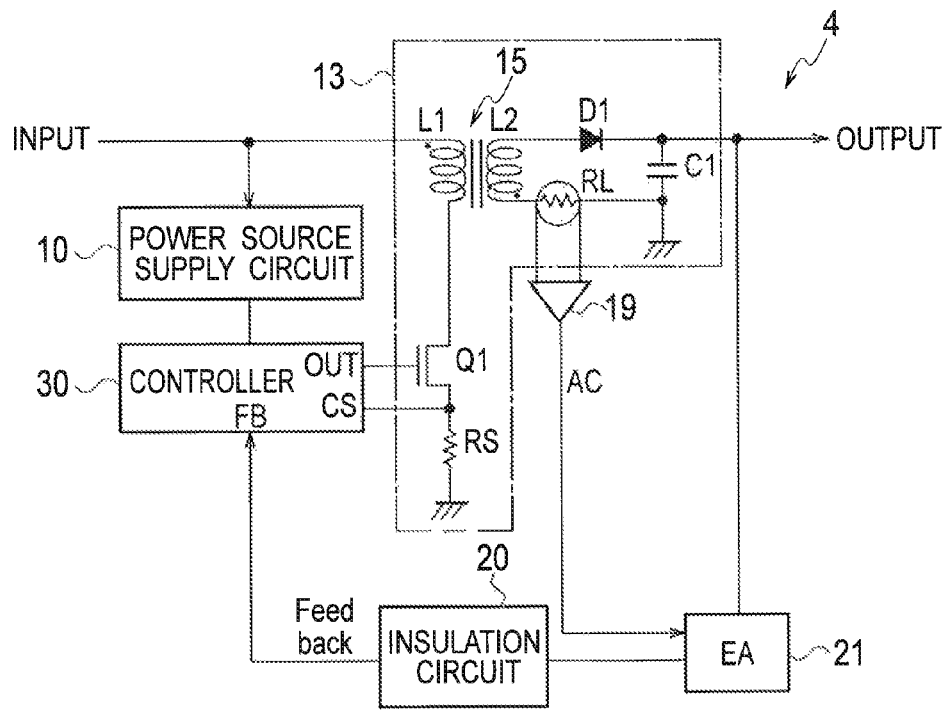
FIG. 2 is a schematic circuit block configuration diagram showing a second PD device according to basic technology.

As shown in FIG. 2, a second PD device 4 according to the basic technology includes: a current sensing resistor RL connected to in series between a secondary-side inductance L2 of the transformer 15 and the ground potential, and a power amplifier 19 connected to the both terminals of the resistor RL. The power amplifier 19 transmits AC current information detected in the resistor RL to the error amplifier 21. Other configurations are the same as those of the first PD device 4 shown in FIG. 1.

According to the second PD device 4 according to the basic technology, the current sensing circuit (RL) is disposed with respect to the secondary-side inductance L2 in the transformer 15, and the amount of current in the secondary side is detected and fed back to the primary-side controller 30 through the error amplifier 21 and the insulation circuit 20. Also the a second PD device 4 according to the basic technology, the electric power information is fed back from the output (secondary) side to the input (primary) side, and ON/OFF of MOS transistor Q1 is controlled by the primary-side controller 30, thereby stabilizing the output voltage.

The second PD device 4 according to the basic technology can control the amount of current in the secondary side. Accordingly, the various relationships between the output voltage $V_o$ and the output currents $I_o$ can be selected in accordance with loads (e.g., smart phones, laptop PCs, tablet PCs, etc.) connected to the output.

Figure 3A:
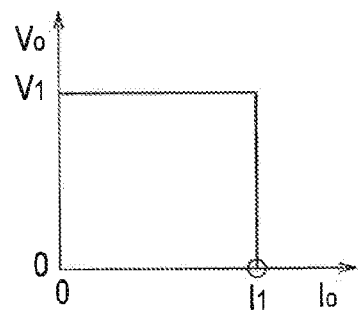
FIG. 3A is a schematic diagram showing a relationship of an output voltage and an output current obtained using the second PD device according to the basic technology, which is an example of a rectangular shape showing a Constant Voltage Constant Current (CVCC).
Figure 3B:
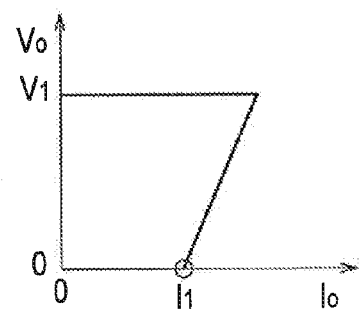
FIG. 3B is a schematic diagram showing the relationship of the output voltage and the output current obtained using the second PD device according to the basic technology, which is an example of a fold-back shape of an inverted trapezium.
Figure 3C:
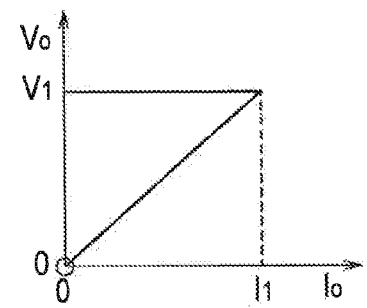
FIG. 3C is a schematic diagram showing the relationship of the output voltage and the output current obtained using the second PD device according to the basic technology, which is an example of a fold-back shape of an inverted triangle.
Figure 3D:
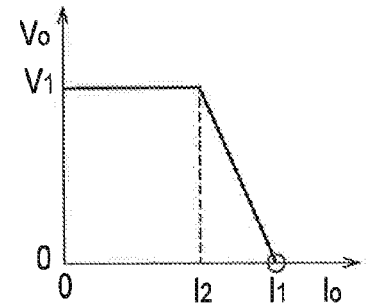
FIG. 3D is a schematic diagram showing the relationship of the output voltage and the output current obtained using the second PD device according to the basic technology, which is an example of a trapezoidal shape.
Figure 3E:
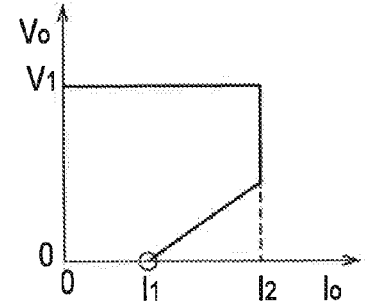
FIG. 3E is a schematic diagram showing the relationship of the output voltage and the output current obtained using the second PD device according to the basic technology, which is an example of a pentagon shape.

As the relationship between the output voltage $V_o$ and the output current $I_o$ obtained by using the second PD device 4 according to the basic technology, there can be adopted various shape, e.g. a rectangular shape as shown in FIG. 3A, a fold-back shape of inverted trapezium as shown in FIG. 3B, a fold-back shape of inverted triangle as shown in FIG. 3C, a trapezoidal shape as shown in FIG. 3D, and a pentagonal shape as shown in FIG. 3E. For example, the rectangular shape shown in FIG. 3A is an example of Constant Voltage Constant Current (CVCC).

Figure 4:
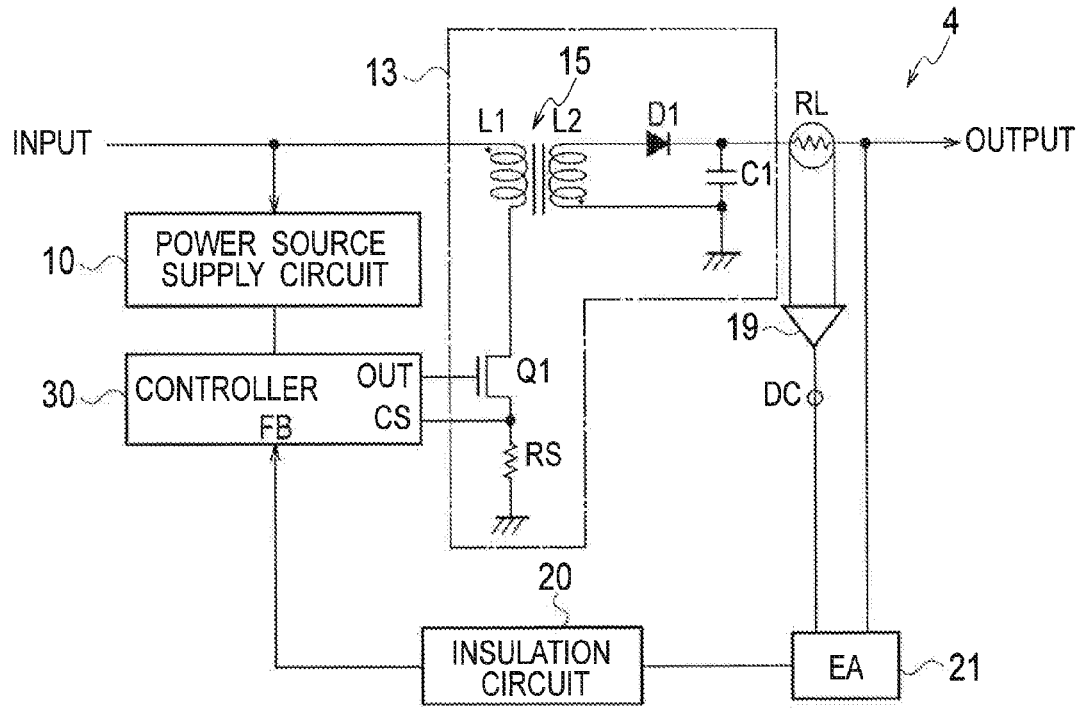
FIG. 4 is a schematic circuit block configuration diagram showing a third PD device according to the basic technology.

As shown in FIG. 4, a third PD device 4 according to the basic technology includes: a current sensing resistor RL connected in series between the diode D1 which composes the DC/DC converter 13, and the output, and a power amplifier 19 connected to the both terminals of the resistor RL. The power amplifier 19 can transmit DC current information to the error amplifier 21. Other configurations are the same as those of the first PD device 4 shown in FIG. 1.

The third PD device 4 according to the basic technology can also control the amount of current in the secondary side. Accordingly, As shown in FIGS. 3A, 3B, 3C, 3D and 3E, the various relationships between the output voltage $V_o$ and the output currents $I_o$ can be selected in accordance with loads (e.g., smart phones, laptop PCs, tablet PCs, etc.) connected to the output.

Figure 5:
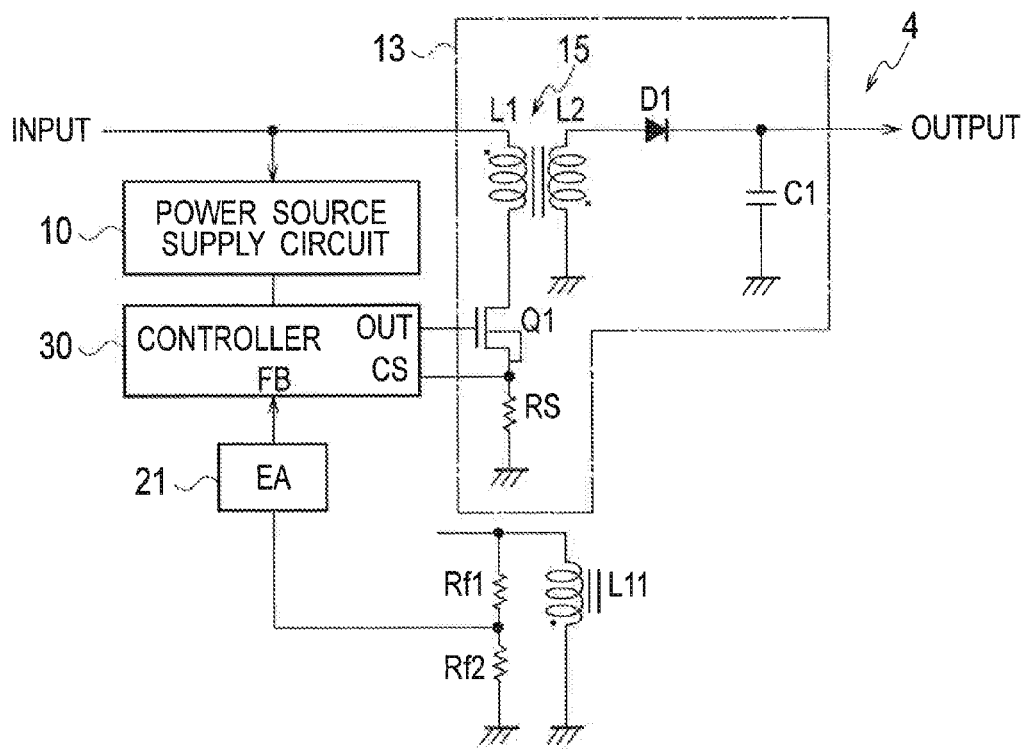
FIG. 5 is a schematic circuit block configuration diagram showing a fourth PD device according to the basic technology.

As shown in FIG. 5, a fourth PD device 4 according to the basic technology includes: an auxiliary inductance L11 composed of primary-side auxiliary winding in the transformer 15, and resistors Rf1, Rf2 for feedback connected in parallel to the auxiliary inductance L11. A detected voltage detected in the resistors Rf1, Rf2 for feedback is fed back to the primary-side controller 30 through the error amplifier 21 disposed in the primary side. Other configurations are the same as those of the first PD device 4 shown in FIG. 1.

According to the second PD device 4 according to the basic technology, the amount of power is recognized in the primary side by the auxiliary inductance L11 connected to the primary-side inductance L1 in the transformer 15 and the resistors Rf1, Rf2 for feedback, and then is fed back to the primary-side controller 30, and ON/OFF of the MOS transistor Q1 is controlled by the primary-side controller 30, thereby stabilizing the output voltage.

The second PD device 4 according to the basic technology is applicable to mobile phones, tablet PCs, etc. which can operate, for example, at approximately 10 W.

First Embodiment

Figure 6:
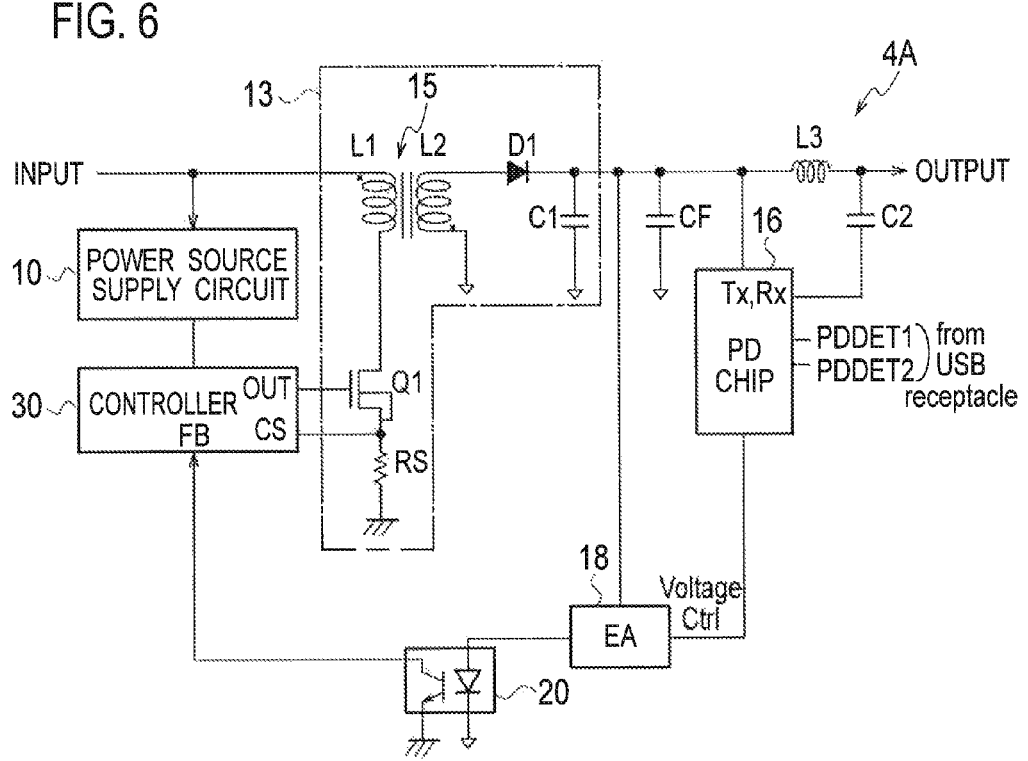
FIG. 6 is a schematic circuit block configuration diagram showing a PD device according to a first embodiment.

As shown in FIG. 6, a PD device 4A according to a first embodiment includes: a DC/DC converter 13 disposed between an input and an output, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, and configured to supply a power source to the primary-side controller 30; a secondary-side controller (PD CHIP) 16 which is connected to the output through the capacitor C2, and can control an output voltage $V_o$ and an output current $I_o$; an error amplifier 18 connected to the output of DC/DC converter 13 and the secondary-side controller 16, and used for error compensation; and an insulation circuit 20 connected to the error amplifier 18 and configured to feed back output information to the primary-side controller 30.

An inductance L3 is a separating inductance. More specifically, a filter circuit composed of the inductance L3 and a capacitor CF separates a control signal from the DC/DC converter so that the control signal from the output is not input into the DC/DC converter.

A capacitor, a photo coupler, a transformer, etc. is applicable to the insulation circuit 20. As usage, a bidirectional transformer having an insulated driver, a bilateral device, etc. may also be applied thereto.

In the PD device 4A according to the first embodiment, the voltage is fed back from the output. Moreover, the PD device 4A according to the first embodiment has an output voltage variable function.

In the PD device 4A according to the first embodiment, an AC signal is superposed on and input into the output terminal from the outside.

In the PD device 4A according to the first embodiment, the control signal is input into the secondary-side controller 16 through the capacitor C2 from the output, and the electric power information in the output side is fed back to the primary-side controller 30 through the error amplifier 18 and the insulation circuit 20. The primary-side controller 30 controls ON/OFF of the MOS transistor Q1, thereby stabilizing the output voltage.

Moreover, in the PD device 4A according to the first embodiment, the amount of current conducted to the primary-side inductance L1 is detected by the current sensing resistor RS, and the amount of current, e.g. a primary-side overcurrent, is controlled in the primary-side controller 30.

As a consequence, the PD device 4A according to the first embodiment has a variable function of an output voltage value and available output current capacity (MAX value).

In the PD device 4A according to the first embodiment, control information is transmitted to the primary-side controller 30 through the insulation circuit 20 from the secondary-side controller 16, and thereby the output voltage and the available output current capacity (MAX value) can be varied.

A voltage-current control circuit for controlling the output voltage $V_o$ and the output current $I_o$ is included in the secondary-side controller (PD CHIP) 16.

In the PD device 4A according to the first embodiment, the variable function of the output voltage value and the available output current capacity (MAX value) of the step-down (buck) type DC/DC converter 13 is achieved by the feedback control from the secondary-side controller (PD CHIP) 16 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the first embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the first embodiment, there can be provided the PD device having the variable function of the output voltage value and the available output current capacity (MAX value) of the diode rectification and step-down (buck) type DC/DC converter 13 achieved by the feedback control from the secondary-side controller (PD CHIP) 16 to the primary-side controller 30.

In the PD device 4A according to the first embodiment, since the secondary-side controller (PD CHIP) 16 is able to USB-connect, the PD device 4A according to the first embodiment can be called a USB Power Delivery (USB PD) device.

Second Embodiment

Figure 7:
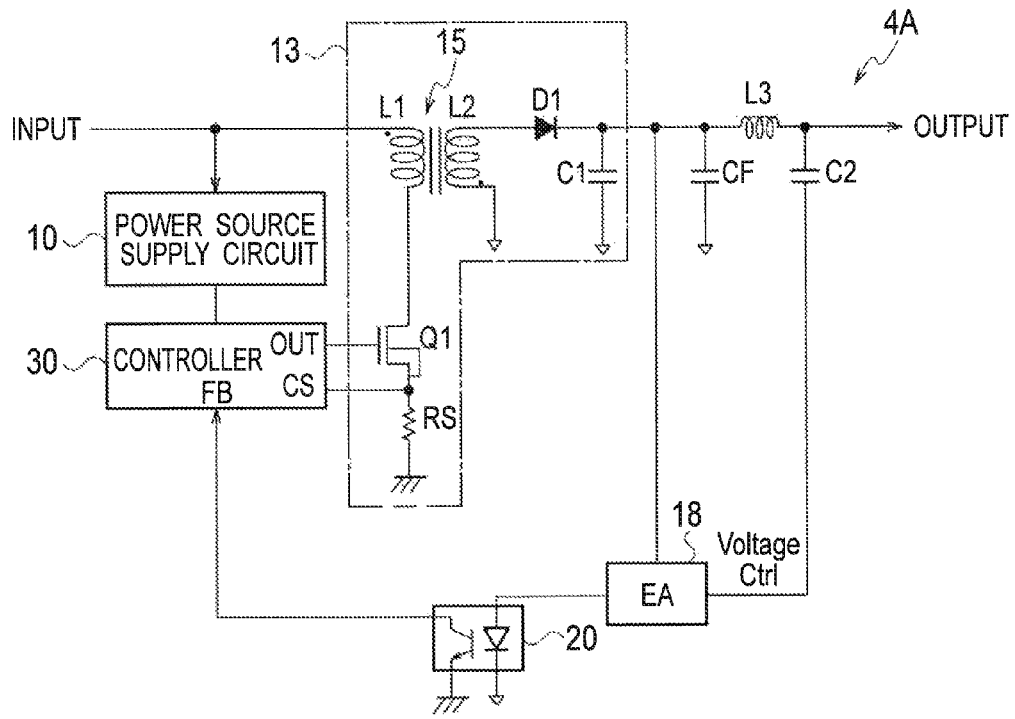
FIG. 7 is a schematic circuit block configuration diagram showing a PD device according to a second embodiment.

As shown in FIG. 7, a PD device 4A according to a second embodiment includes: a DC/DC converter 13 disposed between an input and an output, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 configured to supply a power source to the primary-side controller 30; an error amplifier 18 connected to the output of the DC/DC converter 13, and also connected to the output through the capacitor C2; and an insulation circuit 20 connected to the error amplifier 18 and configured to feed back output information to the primary-side controller 30. Other configurations are the same as those of the first embodiment.

In the PD device 4A according to the second embodiment, the AC signal is superposed on and input into the output terminal from the outside.

In the PD device 4A according to the second embodiment, there is no secondary-side controller 16 as provided in the first embodiment.

In the PD device 4A according to the second embodiment, the control signal is input directly into the error amplifier 18 and the insulation circuit 20 through the capacitor C2 from the output, and the electric power information in the output side is fed back, to the primary-side controller 30 through the error amplifier 18 and the insulation circuit 20. The primary-side controller 30 controls ON/OFF of the MOS transistor Q1, thereby stabilizing the output voltage.

In the PD device 4A according to the second embodiment, the amount of current conducted to the primary-side inductance L1 is detected by the current sensing resistor RS, and the amount of current, e.g. a primary-side overcurrent, is controlled in the primary-side controller 30.

As a consequence, the PD device 4A according to the second embodiment has a variable function of an output voltage value and available output current capacity (MAX value).

In the PD device 4A according to the second embodiment, the control information is transmitted to the primary-side controller 30 through the insulation circuit 20 and the capacitor C2 from the outside, and thereby the output voltage and the available output current capacity (MAX value) can be varied.

According to the second embodiment, the variable function of the output voltage value and the available output current capacity (MAX value) of the step-down (buck) type DC/DC converter 13 is achieved by the feedback control to the primary-side controller 30 through the capacitor C2 and the insulation circuit 20 from the outside. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the second embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the second embodiment, there can be provided the PD device having the variable function of the output voltage value and the available output current capacity (MAX value) of the diode rectification and step-down (buck) type DC/DC converter 13 achieved by the feedback control to the primary-side controller 30 through the capacitor C2 and the insulation circuit 20 from the outside.

The PD device 4A according to the second embodiment can be called merely a power delivery (PD) device since the secondary-side controller (PD CHIP) 16 can be omitted.

Third Embodiment

Figure 8:
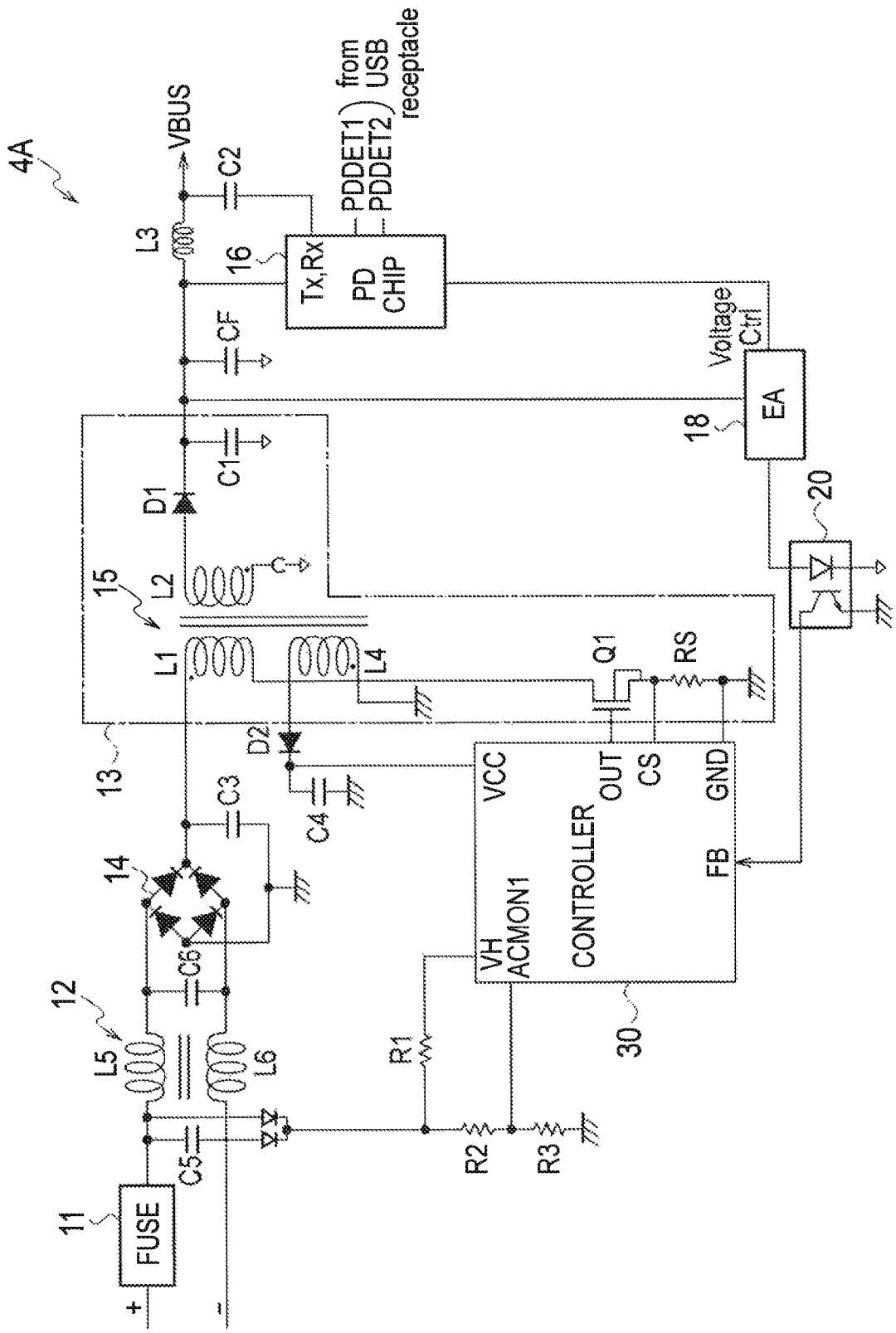
FIG. 8 is a schematic circuit block configuration diagram showing a PD device according to a third embodiment.

As shown in FIG. 8, a PD device 4A according to a third embodiment includes an AC/DC converter connected to the AC input and composed of a fuse 11, a choke coil 12, a diode rectification bridge 14, capacitors C5, C6, C3, etc., instead of the power source supply circuit 10 as in the first embodiment.

Moreover, an auxiliary inductance L4 composed of the primary-side auxiliary winding in the transformer 15, and a diode D2 and a capacitor C4 connected in parallel to the auxiliary inductance L4 are provided therein, and the DC voltage VCC is supplied from the capacitor C4 to the primary-side controller 30.

Furthermore, as shown in FIG. 8, the PD device 4A according to the third embodiment includes: a DC/DC converter 13 disposed between an output of AC/DC converter and an output, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a secondary-side controller (PD CHIP) 16 which is connected to the output through the capacitor C2, and can control an output voltage $V_o$ and an output current $I_o$; an error amplifier 18 connected to the output of DC/DC converter 13 and the secondary-side controller 16, and used for error compensation; and an insulation circuit 20 connected to the error amplifier 18 and configured to feed back output information to the primary-side controller 30. Other configurations are the same as those of the first embodiment.

In the PD device 4A according to the third embodiment, the variable function of the output voltage value and the available output current capacity (MAX value) of the step-down (buck) type DC/DC converter 13 is achieved by the feedback control from the secondary-side controller (PD CHIP) 16 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the third embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the third embodiment, there can be provided the PD device having the variable function of the output voltage value and the available output current capacity (MAX value) of the diode rectification and step-down (buck) type DC/DC converter 13 achieved by the feedback control from the secondary-side controller (PD CHIP) 16 to the primary-side controller 30.

In the PD device 4A according to the third embodiment, since the secondary-side controller (PD CHIP) 16 is able to USB-connect, the PD device 4A according to the third embodiment can be called a USB Power Delivery (USB PD) device having the AC/DC converter function (AC/DC+USB PD).

Fourth Embodiment

Figure 9:
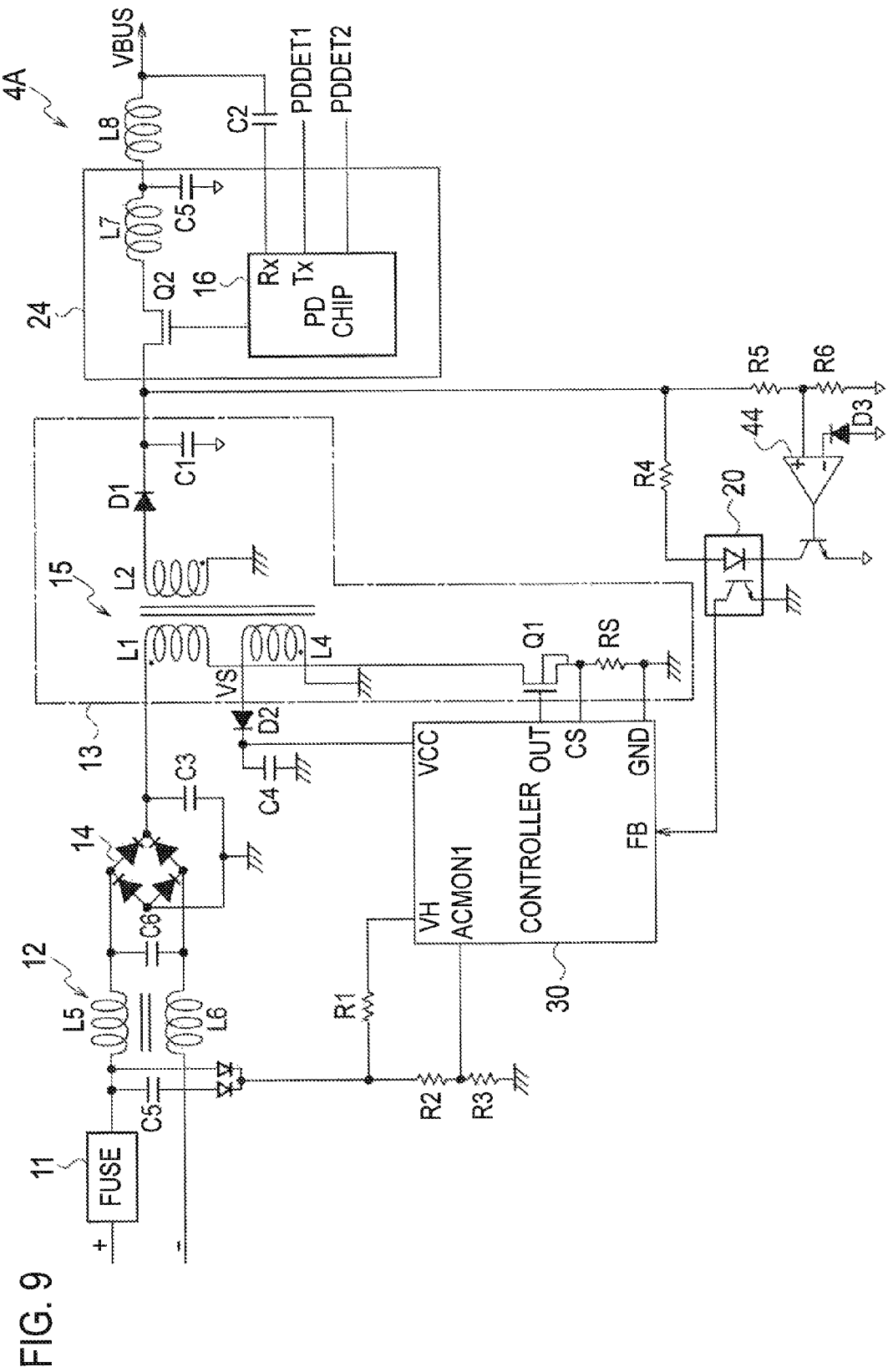
FIG. 9 is a schematic circuit block configuration diagram showing a PD device according to a fourth embodiment.

As shown in FIG. 9, a PD device 4A according to a fourth embodiment includes an AC/DC converter connected to an AC input and composed of a fuse 11, a choke coil 12, a diode rectification bridge 14, capacitors C5, C6, C3, etc., instead of the power source supply circuit 10 as in the first embodiment, in the same manner as the third embodiment.

As shown in FIG. 9, the PD device 4A according to the fourth embodiment includes an independent DC/DC converter 24 which is connected to the output of the step-down (buck) type DC/DC converter 13 and which includes the secondary-side controller (PD CHIP) 16 therein.

The synchronous rectification type DC/DC converter 24 is composed of the MOS transistor Q2, the inductance L7, and the secondary-side controller (PD CHIP) 16. The secondary-side controller (PD CHIP) 16 is connected to the gate of the MOS transistor Q2, and the secondary-side controller (PD CHIP) 16 controls ON/OFF of the MOS transistor Q2. The inductance L7 is an inductance used for the DC/DC converter 24.

An inductance L8 is a PD separating inductance. More specifically, a filter circuit composed of the inductance L8 and a capacitor C5 separates a control signal from the DC/DC converter so that the control signal from the output side is not input into the DC/DC converter.

Furthermore, as shown in FIG. 9, the PD device 4A according to the fourth embodiment includes: ADC/DC converter 13 disposed between the output of the AC/DC converter and the output of the DC/DC converter, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a secondary-side controller (PD CHIP) 16 which is connected to the output through the capacitor C2, and can control an output voltage $V_o$ and an output current $I_o$; an error amplifier 44 connected to the output of the DC/DC converter 13; and an insulation circuit 20 connected to the error amplifier 44 and configured to feed back output information to the primary-side controller 30. Furthermore, the secondary-side controller (PD CHIP) 16 may be connected to the error amplifier 44 in the same manner as the third embodiment. Other configurations are the same as those of the third embodiment.

In the PD device 4A according to the fourth embodiment, the voltage is fed back from the output of the DC/DC converter 13. More specifically, the electric power information is fed back from the output of the DC/DC converter 13 (secondary) side to the input (primary) side, and ON/OFF of MOS transistor Q1 is controlled by the primary-side controller 30, thereby stabilizing the output voltage. The amount of current conducted to the primary-side inductance L1 in the transformer 15 is detected by the current sensing resistor RS, and the amount of current of the primary-side overcurrent is controlled in the primary-side controller 30.

Moreover, in the PD device 4A according to the fourth embodiment, the variable function of the output voltage value and the available output current capacity (MAX value) of the synchronous rectification type DC/DC converter 24 is achieved by the secondary-side controller (PD CHIP) 16 included in the synchronous rectification type DC/DC converter 24. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the fourth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the fourth embodiment, the output voltage of diode rectification and step-down (buck) type DC/DC converter 13 is stabilized by the feedback control from the output of step-down (buck) type DC/DC converter to the primary-side controller 30, and the variable function of the output voltage value and the available output current capacity (MAX value) of the synchronous rectification type DC/DC converter 24 connected to the DC/DC converter 13 is achieved by the secondary-side controller (PD CHIP) 16 included in the synchronous rectification type DC/DC converter 24.

As a consequence, according to the fourth embodiment, there can be provided the PD device having the variable function of the output voltage value and the available output current capacity (MAX value) of the diode rectification and step-down (buck) type DC/DC converter 13.

In the PD device 4A according to the fourth embodiment, since the secondary-side controller (PD CHIP) 16 is able to USB-connect, the PD device 4A according to the fourth embodiment can be called a USB Power Delivery (USB PD) device having the AC/DC converter function (AC/DC+USB PD).

Fifth Embodiment

Figure 10:
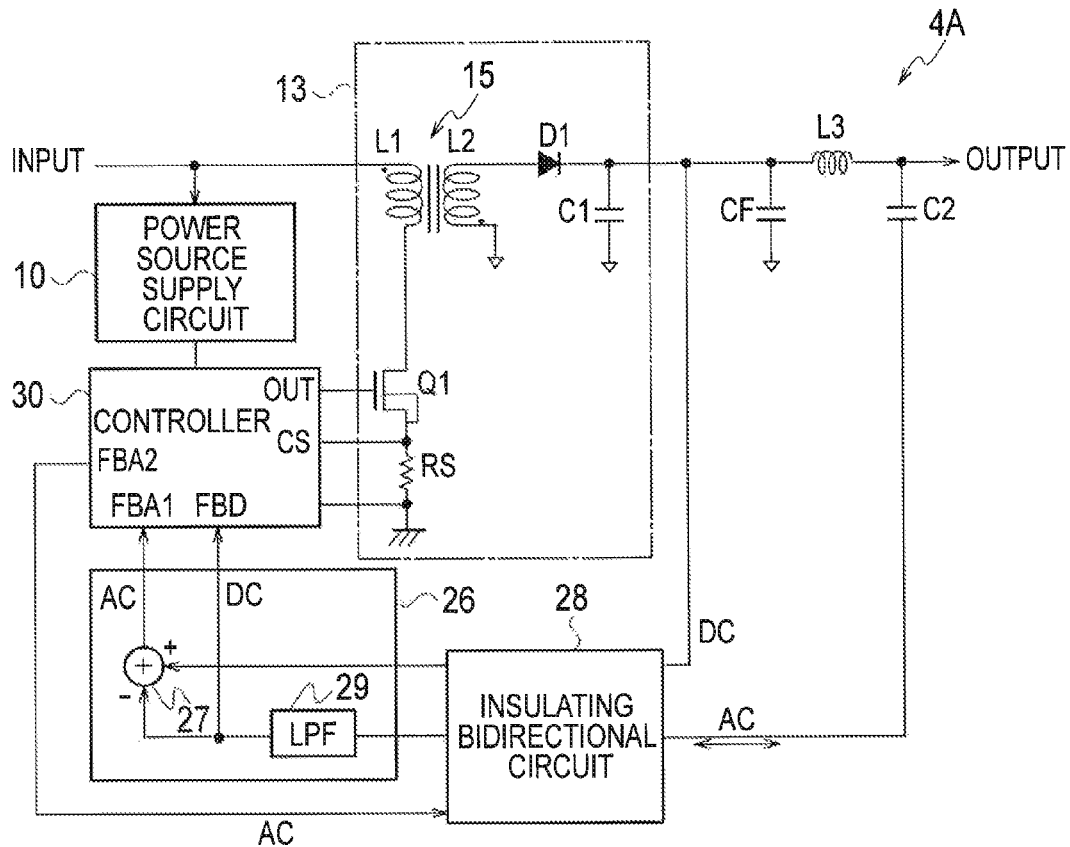
FIG. 10 is a schematic circuit block configuration diagram showing a PD device according to a fifth embodiment.

As shown in FIG. 10, a PD device 4A according to a firth embodiment includes: a DC/DC converter 13 disposed between an input and an output, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, and configured to supply a power source to the primary-side controller 30; an insulating bidirectional circuit 28 connected to the output of the DC/DC converter 13, and also connected to the output terminal through the capacitor C2; and a DC/AC component separating circuit 26 which is connected to the insulating bidirectional circuit 28 and which feeds back the electric power information in the output side to the primary-side controller 30.

The DC/AC component separating circuit 26 includes a Low Pass Filter (LPF) 29 and a DC component eliminating circuit 27, in the PD device 4A according to the firth embodiment.

The DC information of the output of DC/DC converter is input into the DC component eliminating circuit 27 and the LPF 29 in the DC/AC component separating circuit 26 through the insulating bidirectional circuit 28. The input AC information of the output terminal is also input into the DC component eliminating circuit 27 and the LPF 29 in the DC/AC component separating circuit 26 through the capacitor C2 and the insulating bidirectional circuit 28 from the output terminal.

The DC output of LPF 29 is fed back directly to the primary-side controller 30 as DC information (FBD). The DC information (DC component) of the output of DC/DC converter is removed in the DC component eliminating circuit 27, and only the input AC information is fed back to the primary-side controller 30 (FBA1). The input control signal from the outside of the output terminal is AC-superposed on the input AC information.

Furthermore, the output AC information (FBA2) is fed back from the primary-side controller 30 to the output terminal through the insulating bidirectional circuit 28 and the capacitor C2. In the present embodiment, the output control signal is superposed on the output AC information (FBA2) fed back to the output terminal from the primary-side controller 30.

The PD device 4A according to the firth embodiment includes a circuit configured to restore the input control signal included in the input AC information; and a circuit configured to superpose the output control signal on the output AC information from the primary-side controller 30, in the primary-side controller 30.

In the PD device 4A according to the firth embodiment, the input control signal superposed on the input AC information is input into the output terminal from the outside. More specifically, the input control signal is input into the insulating bidirectional circuit 28 through the capacitor C2 from the output, the electric power information is fed back to the primary-side controller 30 through the DC/AC component separating circuit 26 from the insulating bidirectional circuit 28, and ON/OFF of the MOS transistor Q1 is controlled by the primary-side controller 30, thereby stabilizing the output voltage. Moreover, the amount of current conducted to the primary-side inductance L1 is detected by the current sensing resistor RS, and the amount of current of the primary-side overcurrent is controlled in the primary-side controller 30.

The insulating bidirectional circuit 28 can bidirectionally transmit the input/output AC information with the DC information.

A bidirectional transformer having an insulated driver, a bidirectional device, etc. are applicable to the insulating bidirectional circuit 28. Moreover, the insulating bidirectional circuit 28 may be composed by combining a plurality of unidirectional circuits and unidirectional elements.

Figure 11:
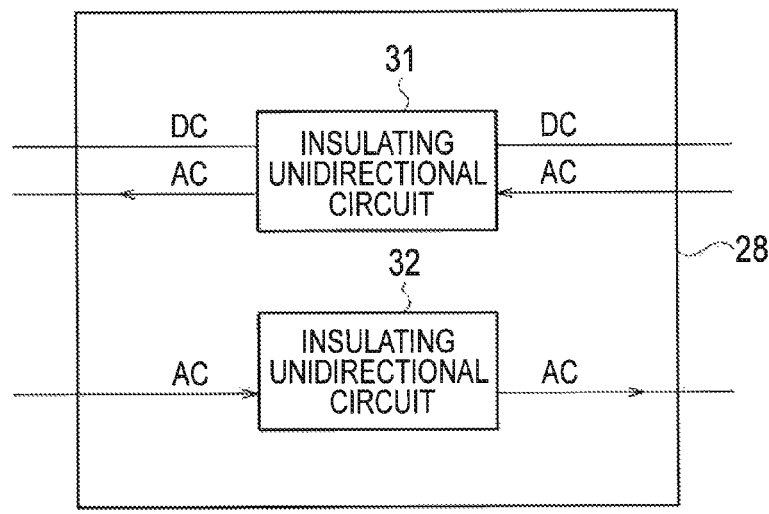
FIG. 11 shows a structural example of an insulating bidirectional circuit in the PD device according to the fifth embodiment.

For example, the insulating bidirectional circuit 28 may include a plurality of insulating unidirectional circuits 31, 32 as shown in FIG. 11. In the present embodiment, the insulating unidirectional circuit 31 can transmit the DC information and the input AC information from the secondary side to the primary side, and the insulating unidirectional circuit 32 can transmit the output AC information from the primary side to the secondary side. The plurality of the insulating unidirectional circuits 31, 32 are combined, thereby composing the insulating bidirectional circuit 28 as a consequence.

In the PD device 4A according to the fifth embodiment, the control information is transmitted to the primary-side controller 30 through the DC/AC component separating circuit 26 from the insulating bidirectional circuit 28, and thereby the output voltage and the available output current capacity (MAX value) can be varied.

In the PD device 4A according to the fifth embodiment, the variable function of the output voltage value and the available output current capacity (MAX value) of the step-down (buck) type DC/DC converter 13 is achieved by the feedback control from the insulating bidirectional circuit 28 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the fifth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the fifth embodiment, there can be provided the PD device having the variable function of the output voltage value and the available output current capacity (MAX value) of the diode rectification and step-down (buck) type DC/DC converter 13 achieved by the feedback control to the primary-side controller 30 through the capacitor C2 and the insulation circuit 20 from the insulating bidirectional circuit 28.

The PD device 4A according to the fifth embodiment can be called merely a Power Delivery (PD) device since the secondary-side controller (PD CHIP) 16 can be omitted.

Sixth Embodiment

As shown in FIG. 12, a PD device 4A according to a sixth embodiment includes: a synchronous rectification type DC/DC converter 13 disposed between an input and an output, and composed of a transformer 15, a MOS transistor Q3, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, and configured to supply a power source to the primary-side controller 30; a secondary-side controller (PD CHIP) 16 which is connected to the output through the capacitor C2, and can control an output voltage $V_o$ and an output current $I_o$; and an insulation circuit 20 connected to the secondary-side controller (PD CHIP) 16, and configured to feed back the output information to the primary-side controller 30. As shown in FIG. 6, an error amplifier 18 for error compensation may be disposed between the secondary-side controller (PD CHIP) 16 and the insulation circuit 20.

In the PD device 4A according to the sixth embodiment, since, the synchronous rectification method is adopted for the DC/DC converter, instead of the diode rectification system, and thereby DC/DC power conversion efficiency can be increased, compared with the first to fifth embodiments adapting the diode rectification system. Other configurations are the same as those of the first embodiment.

A voltage-current control circuit for controlling the output voltage $V_o$ and the output current $I_o$ is included in the secondary-side controller (PD CHIP) 16.

In the PD device 4A according to the sixth embodiment, the variable function of the output voltage value and the available output current capacity (MAX value) of the synchronous rectification type DC/DC converter 13 is achieved by the feedback control from the secondary-side controller (PD CHIP) 16 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the sixth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the sixth embodiment, There can be provided the PD device having the variable function of the output voltage value and the available output current capacity (MAX value) of the synchronous rectification type DC/DC converter 13 achieved by the feedback control from the secondary-side controller (PD CHIP) 16 to the primary-side controller 30.

In the PD device 4A according to the sixth embodiment, since the secondary-side controller (PD CHIP) 16 is able to USB-connect, the PD device 4A according to the sixth embodiment can be called a USE Power Delivery (USB PD) device.

(AC Adapter)

The PD device 4A according to the first to sixth embodiments can be included in an AC adapter 3, as shown in FIGS. 13A, 13B and 13C and FIGS. 14A, 14B, and 14C. Moreover, the AC adapter 3 can be connected to the USB PD device 5 disposed in the outside according to the first to sixth embodiments with a cable or a USB PD cable 6.

The AC adapter 3 including the PD device 4A according to the first to sixth embodiments can be connected to both of a plug 2 connectable to a power socket 1 and the USB PD device 5 disposed in the outside, using the cable, as shown in FIG. 13A.

Moreover, the AC adapter 3 including the USB PD device 4A according to the first to sixth embodiments can be connected to the plug 2 connectable to the power socket 1 using the cable, as shown in FIG. 13B.

Moreover, the AC adapter 3 including the PD device 4A according to the first to sixth embodiments can be connected to both of a plug 2 connectable to the power socket 1 and the USB PD device 5 disposed in the outside, using the USB PD cable 6, as shown in FIG. 13C.

Figure 14A:
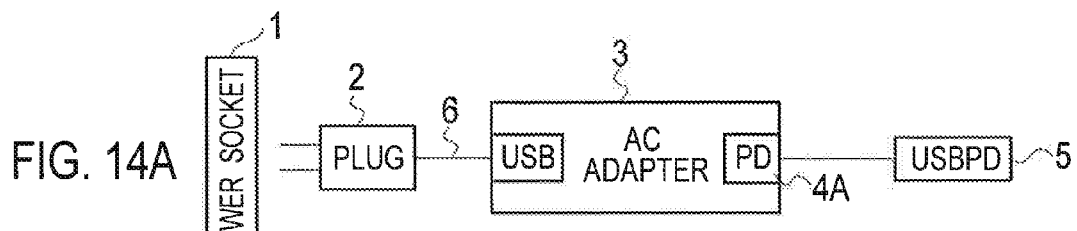
FIG. 14A shows an example of wire connection in which the plug connectable to the power socket is connected to the AC adapter using a USB PD cable, and shows in particular an example in which the PD device in the AC adapter is connected to the external USB PD device using the cable.

Moreover, as shown in FIG. 14A, the AC adapter 3 including the PD device 4A according to the first to sixth embodiments can be connected to the plug 2 connectable to the power socket 1 using the USB PD cable 6; and can be connected to the USB PD device 5 disposed on the outside using the cable.

Figure 14B:
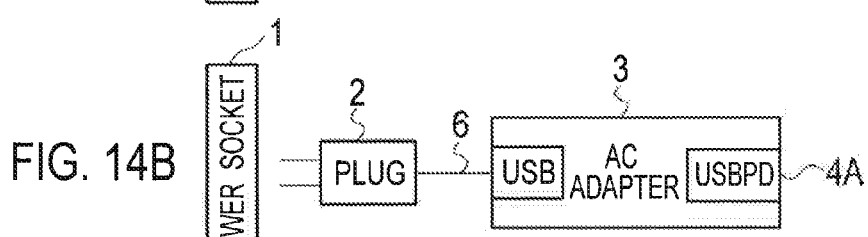
FIG. 14B shows an example of wire connection in which the plug connectable to the power socket is connected to the AC adapter using the USB PD cable, and shows in particular an example in which a USB PD device is included in the AC adapter.

Moreover, the AC adapter 3 including the PD device 4A according to the first to sixth embodiments can be connected to the plug 2 connectable to the power socket 1 using the USB PD cable 6, as shown in FIG. 14B.

Figure 14C:
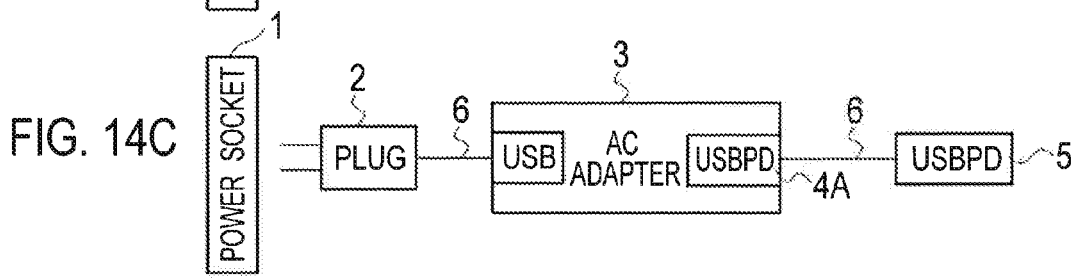
FIG. 14c shows the example of wire connection in which the plug connectable to the power socket is connected to the AC adapter using the USB PD cable, and shows in particular an example in which the USB PD device included in the AC adapter is connected to the external USB PD device using a USB PD device cable.

Moreover, as shown in FIG. 14C, the AC adapter 3 including the USB PD device 4A according to the first to sixth embodiments can be connected to the plug 2 connectable to the power socket 1 using the USB PD cable 6; and can be connected to the USB PD device 5 disposed on the outside using the USB PD cable.

Figure 15A:
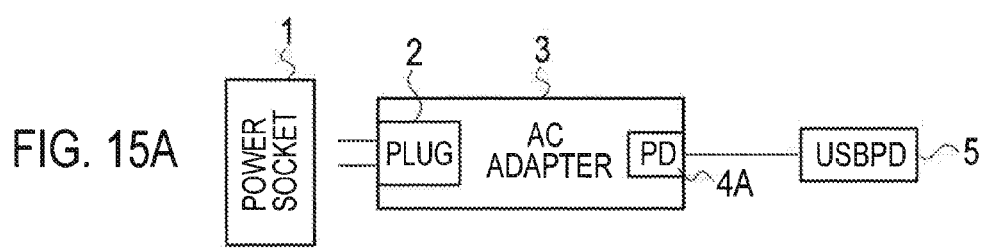
FIG. 15A shows an example of wire connection in which the plug connectable to the power socket is included in the AC adapter, and is connected the AC adapter using the connecting means other than the cable, and shows in particular an example in which the PD device in the AC adapter is connected to the external USB PD device using the cable.
Figure 15B:
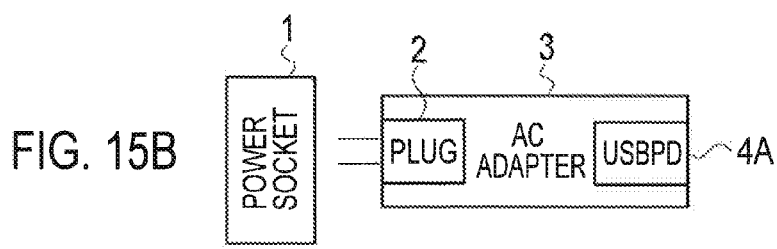
FIG. 15B shows the example of wire connection in which the plug connectable to the power socket is included in the AC adapter, and is connected the AC adapter using the connecting means other than the cable, and shows in particular an example in which the USB PD device is included in the AC adapter.
Figure 15C:
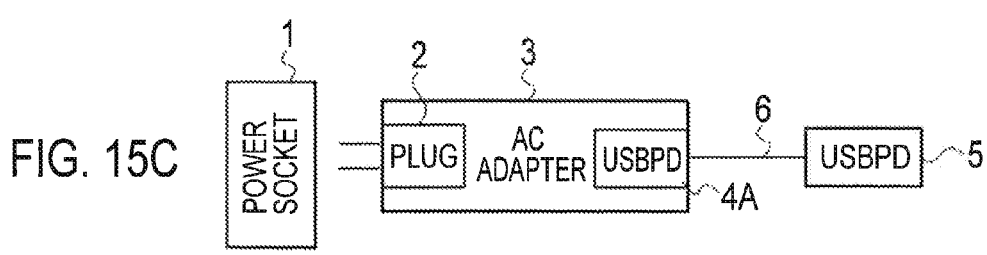
FIG. 15C shows the example of wire connection in which the plug connectable to the power socket is included in the AC adapter, and is connected the AC adapter using the connecting means other than the cable, and shows in particular an example in which the USB PD device included in the AC adapter is connected to the external USB PD device using the USB PD device cable.

Moreover, the plug 2 connectable to the power socket 1 may be included in the AC adapter 3 including the PD device 4A according to the first to sixth embodiments, as shown in FIGS. 15A, 15B and 15C.

The AC adapter 3 including the PD device 4A according to the first to sixth embodiments and the plug 2 connectable to the power socket 1 can be connected to the USB PD device 5 disposed on the outside using the cable, as shown in FIG. 15A.

Moreover, the AC adapter 3 including the USB PD device 4A according to the first to sixth embodiments and the plug 2 connectable to the power socket 1 is illustrated as shown in FIG. 15B.

Moreover, as shown in FIG. 15C, the AC adapter 3 including the USB PD device 4A according to the first to sixth embodiments and the plug 2 connectable to the power socket 1 can be connected to the USB PD device 5 disposed on the outside using the USB PD cable 6.

Figure 16A:
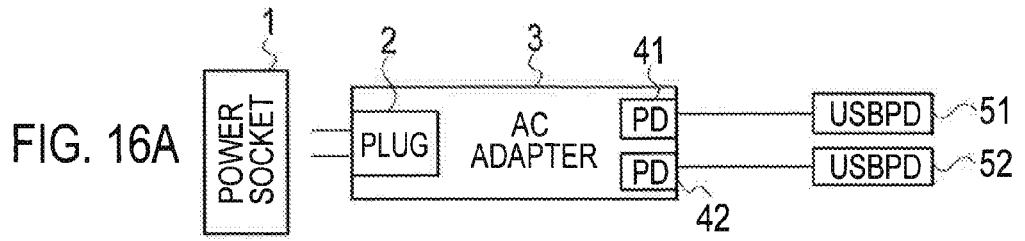
FIG. 16A shows an example of wire connection in which the plug connectable to the power socket is included in the AC adapter, and is connected the AC adapter using a connecting means other than the cable, having a plurality of USB ports, and shows in particular an example in which a plurality of the PD devices in the AC adapter is connected to a plurality of the external USB PD devices using the cable.
Figure 16B:
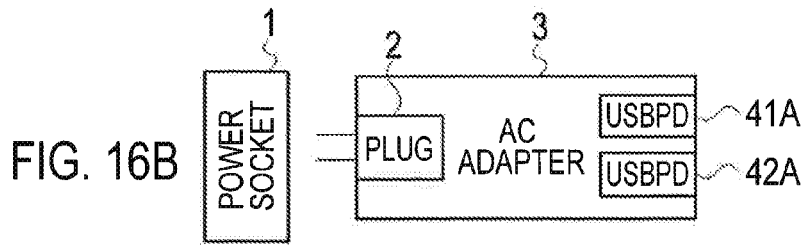
FIG. 16B shows the example of wire connection in which the plug connectable to the power socket is included in the AC adapter, and is connected the AC adapter using the connecting means other than the cable, having the plurality of the USB ports, and shows in particular an example in which the plurality of the USB PD devices is included in the AC adapter.
Figure 16C:
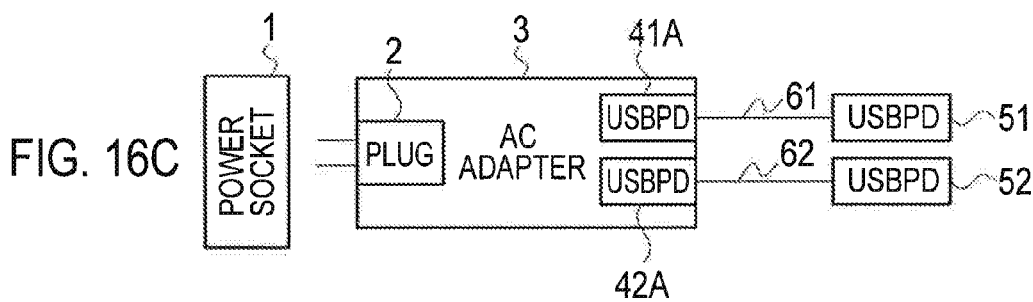
FIG. 16C shows the example of wire connection in which the plug connectable to the power socket is included in the AC adapter, and is connected the AC adapter using a connecting means other than the cable, having a plurality of USE ports, and shows in particular an example in which the plurality of the USB PD devices included in the AC adapter is connected to a plurality of the external USB PD devices using a plurality of the USB PD cables.

A plurality of the PD devices 4A according to the first to sixth embodiments can be included in the AC adapter 3, as shown in FIGS. 16A, 16B and 16C. Moreover, the PD devices 4A can be connected to the USB PD devices 51, 52 disposed in the outside according to the first to sixth embodiments with the cable or the USB PD cable 6.

As shown in FIG. 16A, the AC adapter 3 including the USB PD devices 41, 42 according to the first to sixth embodiments and the plug 2 connectable to the power socket 1 can be connected to the USB PD devices 51, 52 disposed on the outside using the cable.

Moreover, the AC adapter 3 including the USB PD devices 41A, 42A according to the first to sixth embodiments and the plug 2 connectable to the power socket 1 is illustrated as shown in FIG. 16B.

Moreover, as shown in FIG. 16C, the AC adapter 3 including the USB PD devices 41A, 42A according to the first to sixth embodiments and the plug 2 connectable to the power socket 1 can be connected to the USB PD devices 51, 52 disposed on the outside using the USB PD cables 61, 62.

(Electronic Device)

The PD devices 41A, 42A according to the first to sixth embodiments can be included in an electronic apparatus 7, as shown in FIGS. 17A, 17B, 18A and 18B. Various devices, e.g. smart phones, laptop PCs, tablet PCs, monitors or TVs, external hard disk drives, set top boxes, cleaners, refrigerators, washing machines, telephone sets, facsimile machines, printers, laser displays, are applicable to the electronic apparatus, for example.

Figure 17A:
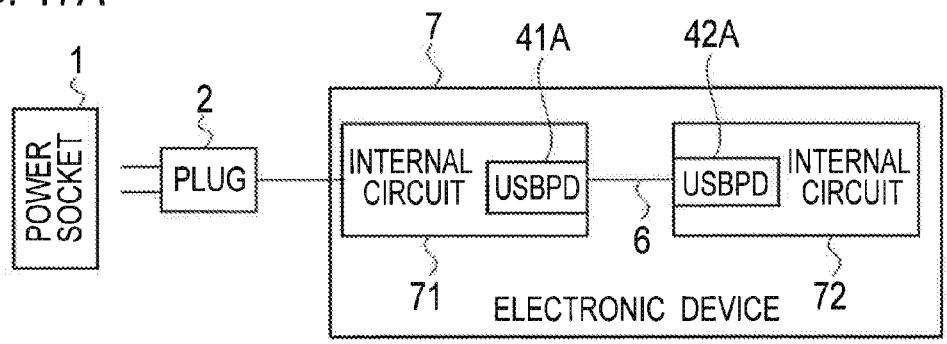
FIG. 17A shows an example of wire connection in which the electronic apparatus is connected to the plug connectable to the power socket using the cable, and shows in particular an example in which a plurality of internal circuits which include the USB PD device therein are included in an electronic apparatus, having a plurality of signals using the USB PD device.

The electronic apparatus 7 including the PD devices 41A, 42A according to the first to sixth embodiments is connected to the plug 2 connectable to the power socket 1 using the cable, as shown in FIG. 17A.

Figure 17B:
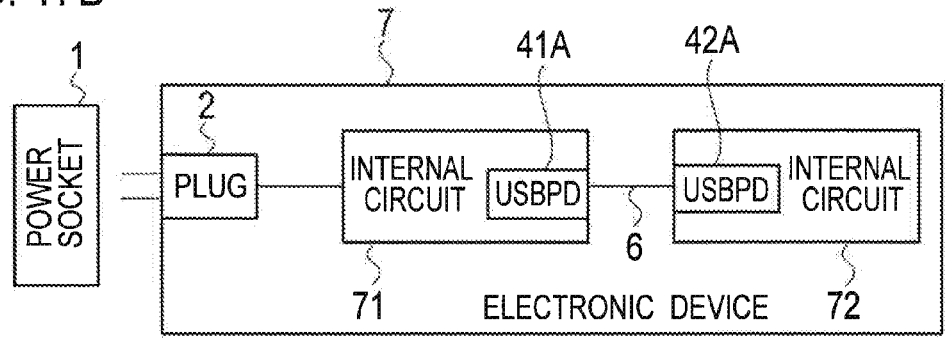
FIG. 17B shows the example of wire connection in which the electronic apparatus is connected to the plug connectable to the power socket using the cable, and shows in particular an example in which the plug connectable to the power socket is included in the electronic apparatus, the plurality of the internal circuits which include the USB PD device therein are included in the electronic apparatus, having the plurality of the signals using the USB PD device.

Moreover, the electronic apparatus 7 may include the plug 2 connectable to the power socket 1 in the electronic apparatus 7, as shown in FIG. 17B.

As shown in FIGS. 17A and 17B, the electronic apparatus 7 includes a plurality of internal circuits 71, 72 respectively including the USB PD devices 41A, 42A according to the first to sixth embodiments, and the USB PD devices 41A, 42A are connected to each other using the USB PD cable 6. Since the electronic apparatus 7 includes the plurality of the internal circuits 71, 72 including the USB PD devices 41A, 42A, there are a plurality of signals used for the USB PD devices 41A, 42A in the electronic apparatus 7.

Figure 18A:
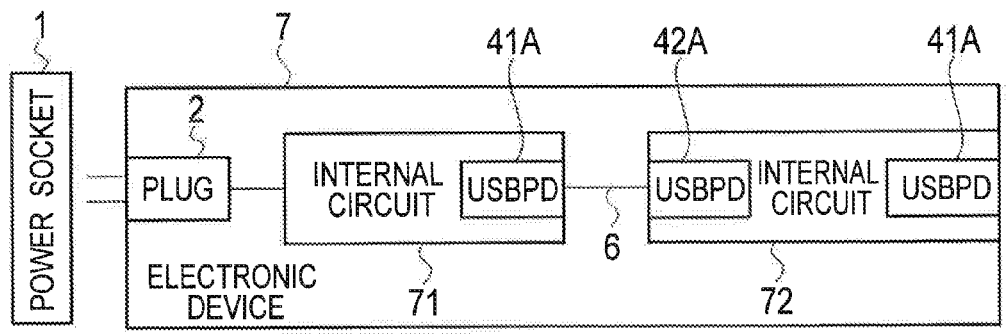
FIG. 18A shows the example in which the plug connectable to the power socket is included in the electronic apparatus, the plurality of the internal circuits which include the USB PD device therein are included in the electronic apparatus, having the plurality of the signals using the USB PD device, and shows in particular an example in which a USB PD device connected to the outside is included in one internal circuit.

The electronic apparatus 7 including the PD devices 41A, 42A according to the first to sixth embodiments may include the USB PD device 41 connectable to other electronic apparatus disposed in the outside of electronic apparatus 7, in one internal circuit 72, as shown in FIG. 18A.

Figure 18B:
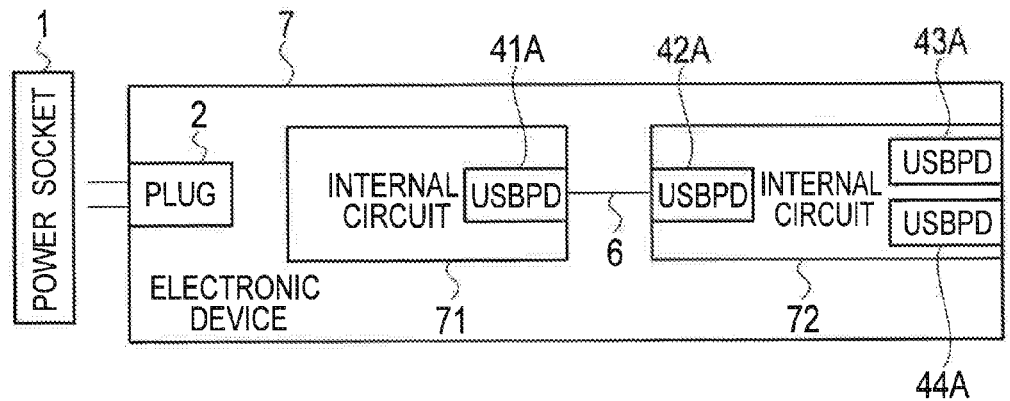
FIG. 18B shows the example in which the plug connectable to the power socket is included in the electronic apparatus, the plurality of the internal circuits which include the USB PD device therein are included in the electronic apparatus, having the plurality of the signals using the USB PD device, and shows in particular an example in which a plurality of the USB PD devices connected to the outside is included in one internal circuit.

As shown in FIG. 18B, the electronic apparatus 7 including the PD devices 41A, 42A according to the first to sixth embodiments may include a plurality of the USB PD devices 43A, 44A connectable to other electronic apparatus disposed in the outside of electronic apparatus 7, in one internal circuit 72, as shown in FIG. 18A.

(Protection Function)

Figure 19A:
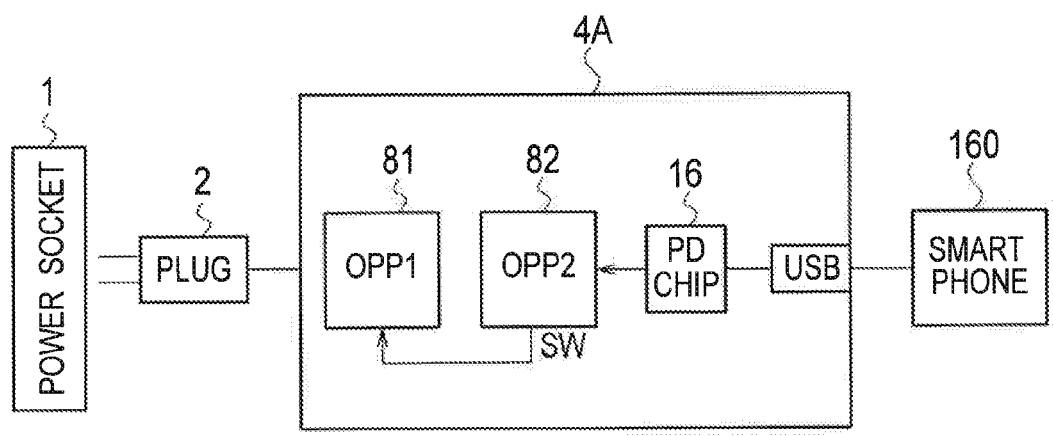
FIG. 19A is an explanatory diagram of a protection function of the USB PD device according to the first to sixth embodiments in the case where a smart phone is used as a connecting target.
Figure 19B:
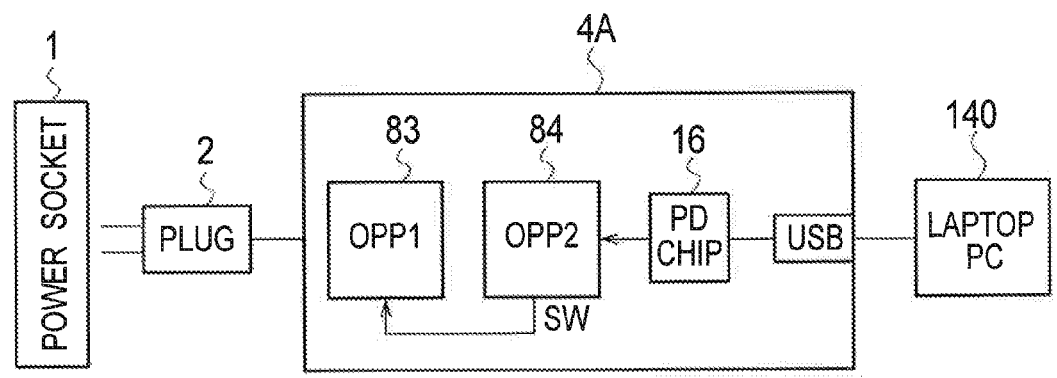
FIG. 19B is an explanatory diagram of a protection function of the USB PD device according to the first to sixth embodiments in the case where a laptop Personal Computer (PC) is used as a connecting target.

The PD device 4A according to the first to sixth embodiments may include a primary-side overpower Protecting circuit (OPP1) 81 as shown in FIG. 19A, and a secondary-side overpower Protecting circuit (OPP2) 82 connected to the primary-side overpower protecting circuit (OPP1) 81.

The primary-side overpower protecting circuit (OPP1) 81 is connected to the primary-side controller 30. Moreover, the primary-side overpower protecting circuit (OPP1) 81 may be included in the primary-side controller 30.

The secondary-side overpower protecting circuit (OPP2) 82 is connected to the secondary-side controller (PD CHIP) 16.

In FIG. 19A, although the AC/DC converter, the DC/DC converter 13, etc. are not illustrated, the configuration of the PD device 4A according to the first to sixth embodiments as shown in FIGS. 6-12 can be applied thereto.

In accordance with target equipments (sets) connected to the USB connector, the electric power information in the USB connector is transmitted to the secondary-side overpower protecting circuit (OPP2) 82 from the secondary-side controller (PD CHIP) 16, and the secondary-side overpower protecting circuit (OPP2) 82 communicates the electric power information in the output terminal to the primary-side overpower protecting circuit (OPP1) 81.

Consequently, an overcurrent detecting set value can be changed in accordance with the target equipments (sets) connected to the USB connector, thereby executing the power change of the DC/DC converter 13.

Any of the primary-side overpower protecting circuit (OPP1) 81 and the secondary-side overpower protecting circuit (OPP2) 82 may determine whether the electric power information in the USB connector exceeds the overcurrent detecting set value.

If any one of the primary-side overpower protecting circuit (OPP1) 81 and the secondary-side overpower protecting circuit 82 (OPP2) determines that the electric power information in the USB connector exceeds the overcurrent (overpower) detecting set value, the primary-side overpower protecting circuit (OPP1) 81 can transmit the overcurrent (overpower) protecting control signal to the primary-side controller 30, thereby executing the change for controlling the electric power in the DC/DC converter 13.

There are applicable functions, e.g. an OverCurrent Protection (OCP), an OverPower Protection (OPP), OverVoltage Protection (OVP), OverLoad Protection (OLP), and a Thermal Shut Down (TSD), to the PD device 4A according to the first to sixth embodiments.

The PD device 4A according to the first to sixth embodiments includes a sensor (SENSOR) protection function for executing protection corresponding to the characteristics of a certain sensor element connected to the primary-side controller 30, for example.

When changing the overcurrent (overpower) detecting set value in the PD device 4A according to the first to sixth embodiments, the electric power information in the USB connector is transmitted to the primary-side overpower protecting circuit (OPP1) 81 through the secondary-side controller (PD CHIP) 16 and the secondary-side overpower protecting circuit (OPP2) 82, and the overcurrent detecting set value is changed in accordance with the target equipments (sets) connected to the USB connector, thereby executing the power change of the DC/DC converter 13, as mentioned above.

Moreover, when changing the overcurrent (overpower) detecting set value in the PD device 4A according to the first to sixth embodiments, the electric power information in the USB connector may be directly transmitted to the primary-side overpower protecting circuit (OPP1) 81 from the secondary-side controller (PD CHIP) 16, and then the set value may be directly changed in the primary-side overpower protecting circuit (OPP1) 81.

Moreover, the electric power information may be directly transmitted to the primary-side overpower protecting circuit (OPP1) 81 from the PD device disposed in the outside of the PD device 4A according to the first to sixth embodiments.

Thus, according to the PD device 4A according to the first to sixth embodiments, it is possible to change the power delivery level corresponding to the target equipments (sets) connected to the USB connector, in the primary-side overpower protecting circuit (OPP1) 81. Consequently, a destruction of the target equipments (sets) can be prevented under an abnormal state.

When using a smart phone 160 as a connecting target, if the electric power information of 7 W is transmitted to the secondary-side overpower protecting circuit (OPP2) 82 from the secondary-side controller (PD CHIP) 16, for example, with respect to the smart phone 160 (the amount of power 5V·1 A=5 W), the electric power information of 7 W is transmitted to the primary-side overpower protecting circuit (OPP1) 81 from the secondary-side overpower protecting circuit (OPP2) 82, and then the overcurrent (overpower) detecting set value is changed (SW) from 7 W up to 10 W in the primary-side overpower protecting circuit (OPP1) 81. Consequently, the electric power up to 10 W can be transmitted, in the DC/DC converter in the PD device 4A according to the first to sixth embodiments.

When using a laptop PC 140 as a connecting target, if the electric power information of 80 W is transmitted to the secondary-side overpower protecting circuit (OPP2) 82 from the secondary-side controller (PD CHIP) 16, for example, with respect to the laptop PC 140 (the amount of power 20V·3 A=60 W), the electric power information of 80 W is transmitted to the primary-side overpower protecting circuit (OPP1) 81 from the secondary-side overpower protecting circuit (OPP2) 82, and then the overcurrent (overpower) detecting set value is changed (SW) from 80 W up to 100 W in the primary-side overpower protecting circuit (OPP1) 81. Consequently, the electric power up to 100 W can be transmitted, in the DC/DC converter in the PD device 4A according to the first to sixth embodiments.

(Plug)

Figure 20:
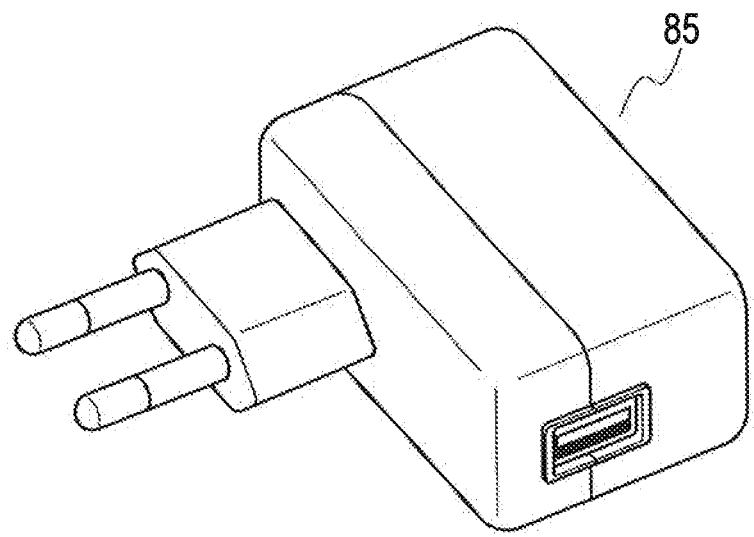
FIG. 20 shows a schematic bird's-eye view structure example of a plug applicable to the USB PD device according to the first to sixth embodiments.

As shown in FIG. 20, a plug 85 applicable to the adapter and the electronic apparatus mounted with the PD device (PD, USB PD) according to the first to sixth embodiments can be connected to the power socket having the AC power source, e.g., 100V-115V, and can also be USB-connected.

Figure 21:
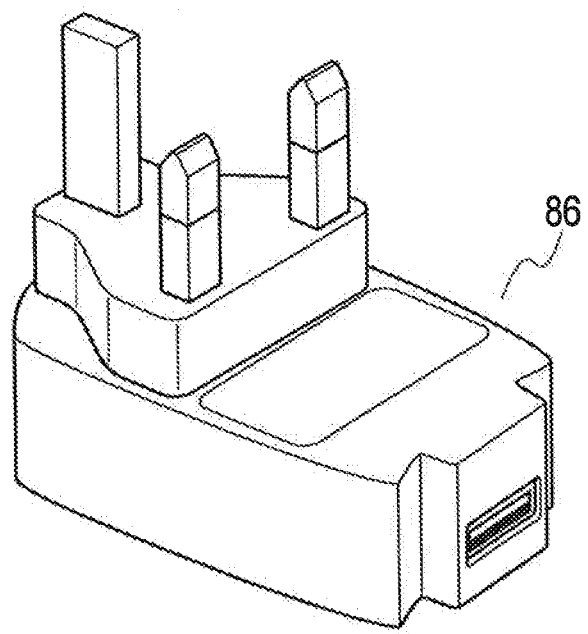
FIG. 21 shows a schematic bird's-eye view structure example of alternative plug applicable to the USB PD device according to the first to sixth embodiments.

Moreover, as shown in FIG. 21, a plug 86 applicable to the adapter and the electronic apparatus mounted with the PD device (PD, USB PD) according to the first to sixth embodiments can be connected to the power socket having the AC power source, e.g., 230V, and can also be USB-connected.

Figure 22:
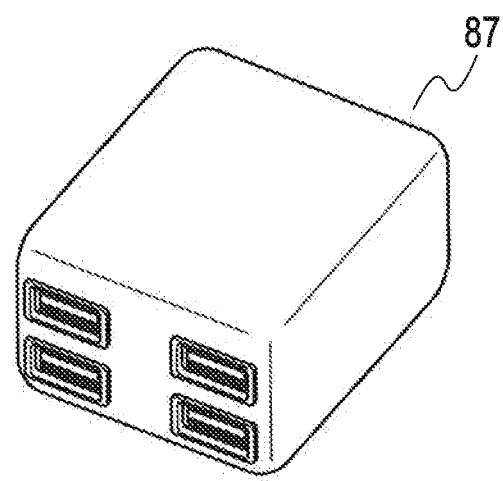
FIG. 22 shows a schematic bird's-eye view structure example of still alternative plug applicable to the USB PD device according to the first to sixth embodiments.

Moreover, as shown in FIG. 22, a plug 87 applicable to the adapter and the electronic apparatus mounted with the PD device (PD, USB PD) according to the first to sixth embodiments can be connected to the power socket having the AC power source, e.g., 100V-115V, and a plurality of the USB connections can also be achieved.

Figure 23:
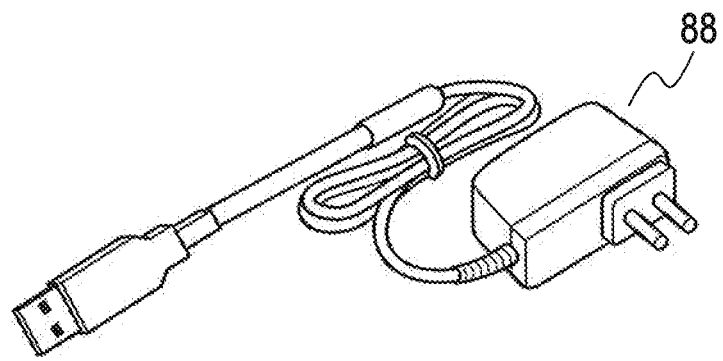
FIG. 23 shows a schematic bird's-eye view structure example of yet alternative plug applicable to the USB PD device according to the first to sixth embodiments.

Moreover, as shown in FIG. 23, a plug 88 applicable to the adapter and the electronic apparatus mounted with the PD device (PD, USB PD) according to the first to sixth embodiments can be connected to the power socket having the AC power source, e.g., 100V-115V, and USB PD cable connection can also be achieved.

(Power Delivery System)

In the power delivery (PD) system capable of applying the PD device according to the first to sixth embodiments, the source of electric power can be switched without changing a direction of the cable. For example, electric charging of a battery in a laptop PC from external devices and power transmission from the battery in the laptop PC to external devices (e.g., display etc.) can be achieved without replacement of the cable.

Moreover, a half-duplex data communication with AC superposition can be achieved between two units through the USB PD cable.

Figure 24A:
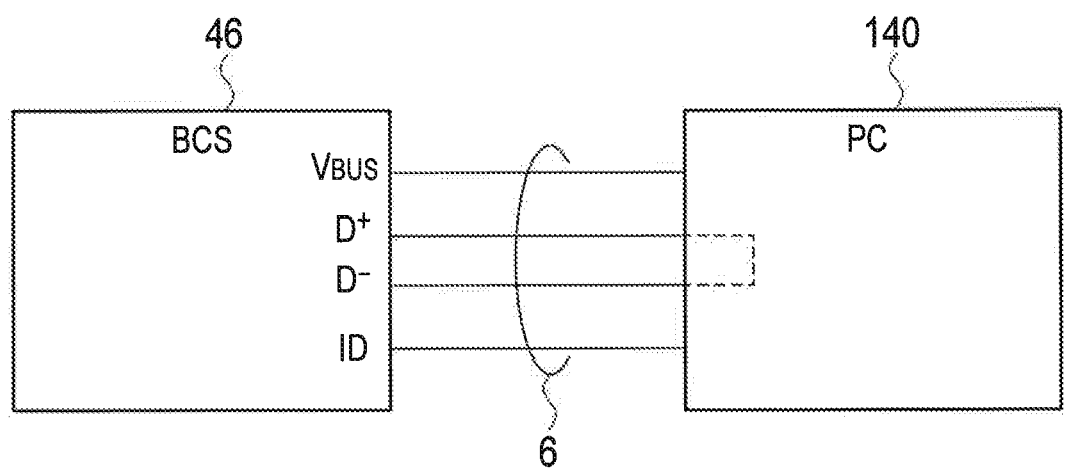
FIG. 24A is a schematic block configuration diagram illustrating a USB data communication and power delivery between a battery charger system and a laptop PC, in a Power Delivery (PD) system to which the PD devices according to the first to sixth embodiments can be applied.

In the PD system capable of applying the PD device according to the first to sixth embodiments, DC power delivery (DC output $V_{BUS}$) and USB data communications ($D^+$, $D^-$, ID, etc.) can be achieved using the USB PD cable 6 between the Battery Charger System (BCS) 46 and the laptop PC 140, as shown in FIG. 24A. In the present embodiment, although the PD device according to the first to sixth embodiments is mounted in the BCS 46 and the laptop PC 140, illustration thereof is omitted.

Figure 24B:
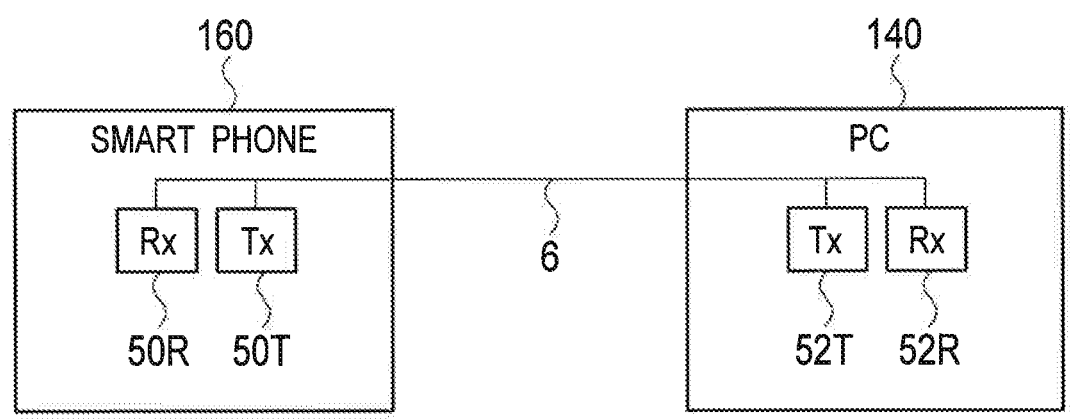
FIG. 24B is a schematic block configuration diagram illustrating the USB data communication and the power delivery between a smart phone and the laptop PC, in the PD system to which the PD devices according to the first to sixth embodiments can be applied.

In the PD system capable of applying the PD device according to the first to sixth embodiments, the DC power delivery (DC output $V_{BUS}$) and the USB data communications ($D^+$, $D^-$, ID, etc.) can be transmitted also between the smart phone 160 and the laptop PC 140 using the USB PD cable 6, in the same manner as FIG. 24A. Furthermore, as shown in FIG. 24B, a transmitter ($T_X$) 50T and a receiver ($R_X$) 50R for USB data communications are mounted in the smart phone 160, and a transmitter ($T_X$) 52T and a receiver ($R_X$) 52R for USB data communications are mounted in the laptop PC 140. In the present embodiment, although the PD device according to the first to sixth embodiments is mounted in the smart phone 160 and the laptop PC 140, illustration thereof is omitted. The transmitter ($T_X$) 50T, 52T and the receiver ($R_X$) 50R, 52R for USB data communications are included in each secondary-side controller (PD CHIP) 16.

Figure 25A:
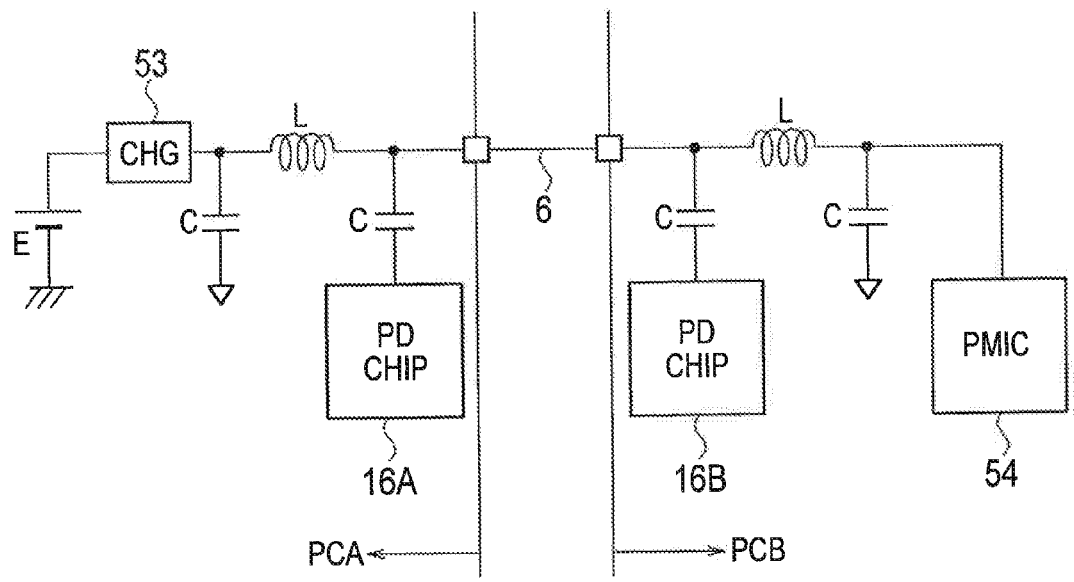
FIG. 25A is a schematic block configuration diagram illustrating the USB data communication and the power delivery between two PCs, in the PD system to which the PD devices according to the first to sixth embodiments can be applied.
Figure 25B:
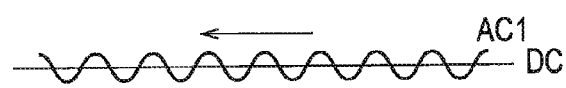
FIG. 25B is schematic diagram of a waveform in which one-directional AC information AC1 is superposed on DC power in the PD system to which the PD devices according to the first to sixth embodiments can be applied.
Figure 25C:
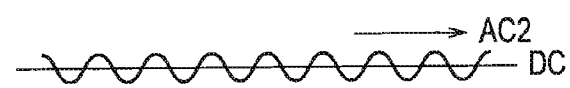
FIG. 25C is schematic diagram of a waveform in which reverse directional AC information AC2 is superposed on DC power in the PD system to which the PD devices according to the first to sixth embodiments can be applied.

In the PD system capable of applying the PD device according to the first to sixth embodiments, FIG. 25A shows a schematic block configuration illustrating the USB data communication and the power delivery between two personal computers PCA, PCB, a waveform in which one-directional AC information AC1 superposed on the DC power is schematically illustrated as shown in FIG. 25B, and a waveform in which reverse directional AC information AC2 superposed on the DC power is schematically illustrated as shown in FIG. 25B. In the present embodiment, between the personal computers PCA, PCB is connected through the USB PD cable 6. Moreover, the PD device according to the first to sixth embodiments is mounted in each personal computer PCA, PCB. The illustration of the DC/DC converter is omitted, and the secondary-side controllers (PD CHIP) 16A, 16B are illustrated in FIG. 25A. As shown in FIG. 25A, a battery E and a battery charger IC (CHG) 53 connected to the battery E are mounted in the personal computer PCA, and a Power Management IC (PMIC) 54 is mounted in the personal computer PCA.

In the PD system capable of applying the PD device according to the first to sixth embodiments, for example, electric charging of the battery E from the personal computer PCB to the personal computer PCA, and power transmission of the battery E from the personal computer PCA to the personal computer PCB can achieved without replacement of any cable.

Moreover, the secondary-side controllers (PD CHIP) 16A, 16B are connected to the DC output $V_{BUS}$ with AC coupling through the capacitor, and the half-duplex data communication with AC superposition is achieved in between the personal computers PCA, PCB. In the present embodiment, the carrier frequency is approximately 23.2 MHz, for example, and the FSK modulation/demodulation frequency is approximately 300 kbps, for example. In the present embodiment, the Bit Error Rate (BER) is approximately $1 \times 10^{-6}$, and an LSI for built-in self tests (BIST) may be included therein, for example.

Figure 26A:
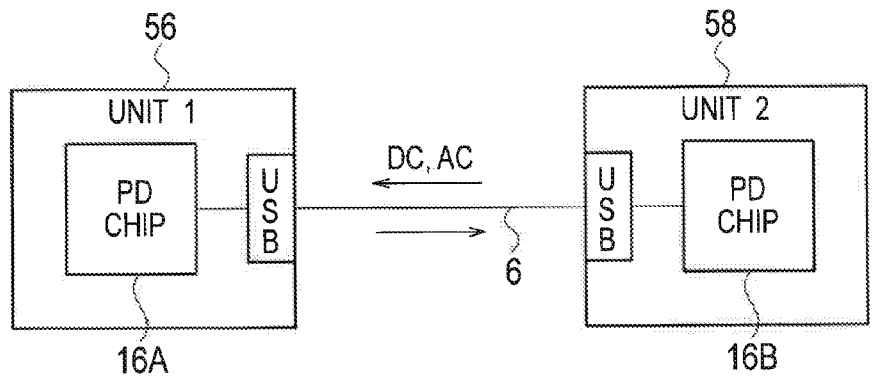
FIG. 26A is a schematic block configuration diagram illustrating the USB data communication and the power delivery between two units, in the PD system to which the PD devices according to the first to sixth embodiments can be applied.
Figure 26B:
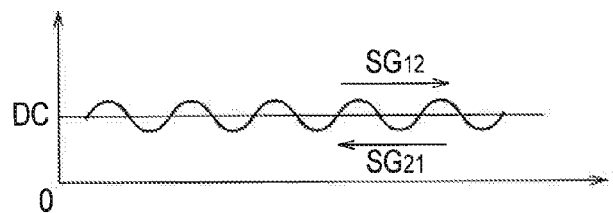
FIG. 26B is schematic diagram of a waveform in which bidirectional control signal is superposed on DC power in the PD system to which the PD devices according to the first to sixth embodiments can be applied.

In the PD system capable of applying the PD device according to the first to sixth embodiments, FIG. 26A shows a schematic block configuration illustrating the USB data communication and the power delivery between two units 56, 58, and a waveform in which the control signals $SG_{12}$, $SG_{21}$ to be bidirectionally transmitted are superposed on the DC power is schematically illustrated as shown in FIG. 26B. The two units 56, 58 are connected to each other through the USB PD cable 6. The two units 56, 58 may be arbitrary electronic apparatus, and the PD device according to the first to sixth embodiments is mounted therein. The illustration of the DC/DC converter is omitted, and the secondary-side controllers (PD CHIP) 16A, 16B are illustrated in FIG. 26A.

Figure 27:
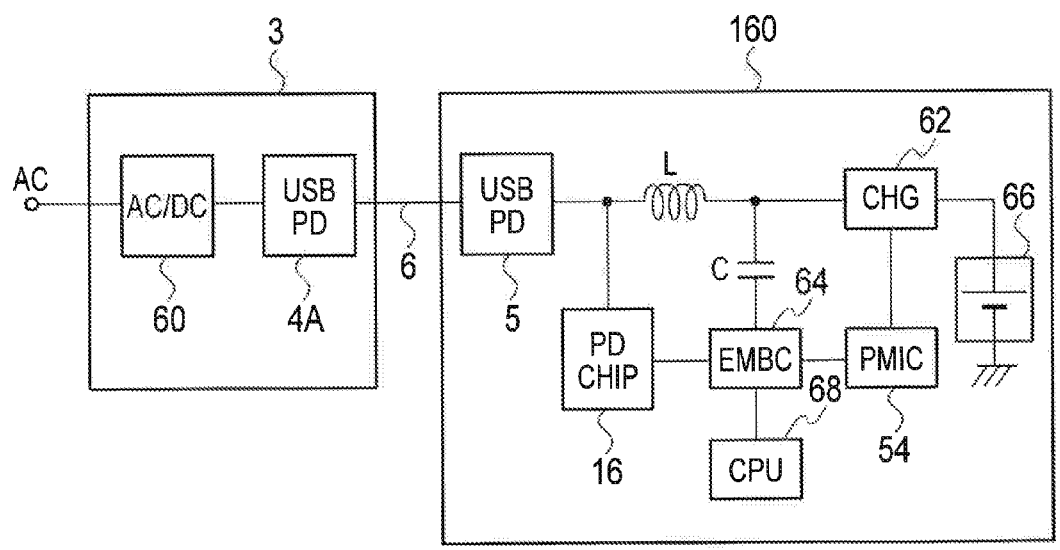
FIG. 27 is a schematic block configuration diagram of the PD system to which the PD devices according to the first to sixth embodiments can be applied composed of an AC adapter and a smart phone each which include the USB PD device therein.

FIG. 27 shows a schematic block configuration in which the smart phone 160 is connected to the AC adapter 3 through the USB PD cable 6, in the PD system capable of applying the PD device according to the first to sixth embodiments.

The AC adapter 3 includes an AC/DC converter 60 and a USB PD 4A. The smart phone 160 includes a USB PD 5, a secondary-side controller (PD CHIP) 16, an embedded type controller (EMBC) 64, a CPU 68, a PMIC 54, a battery 66, and a CHG 62.

In the PD system capable of applying the PD device according to the first to sixth embodiments, for example, electric charging of the battery 66 in the smart phone 160 from the AC adapter 3, and power transmission of the battery 66 in the smart phone 160 to external devices can be achieved without replacement of the cables.

Figure 28:
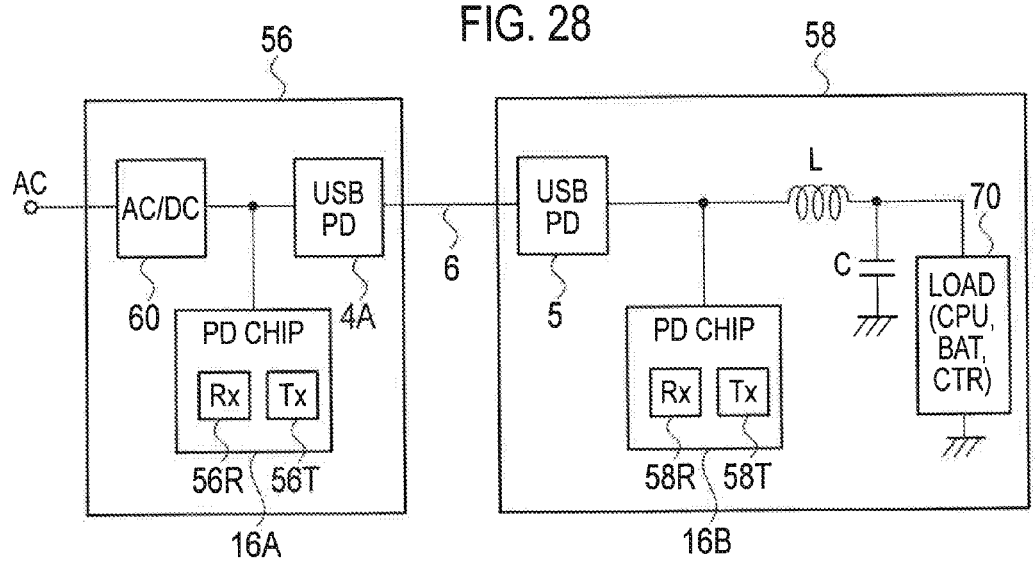
FIG. 28 is a schematic block configuration diagram of the PD system to which the PD devices according to the first to sixth embodiments can be applied composed of two units each which include the USB PD device therein.

FIG. 28 shows a schematic block configuration in which the unit 56 and the unit 58 are connected to each other through the USB PD cable 6, in the PD system capable of applying the PD device according to the first to sixth embodiments.

The unit 56 includes an AC/DC converter 60, a USB PD device 4A, and a secondary-side controller (PD CHIP) 16A, and the unit 58 includes a USB PD device 5, a secondary-side controller (PD CHIP) 16B, and a load 70. In the present embodiment, the load 70 can be composed of a CPU, a battery BAT, a controller CTR, etc.

Furthermore, as shown in FIG. 28, a transmitter ($T_X$) 56T for USB data communications and a receiver ($R_X$) 56R are mounted in the secondary-side controller (PD CHIP) 16A, and a transmitter ($T_X$) 56T for USB data communications and a receiver ($R_X$) 56R are mounted in the secondary-side controller (PD CHIP) 16B.

In the PD system capable of applying the PD device according to the first to sixth embodiments, power transmission from the unit 56 to the unit 58, and power transmission to external devices from the unit 58 can be achieved without replacement of the cable, for example.

Moreover, the half-duplex data communication with AC superposition is achieved also in between the units 56, 58 through the USB PD cable 6.

Figure 29A:
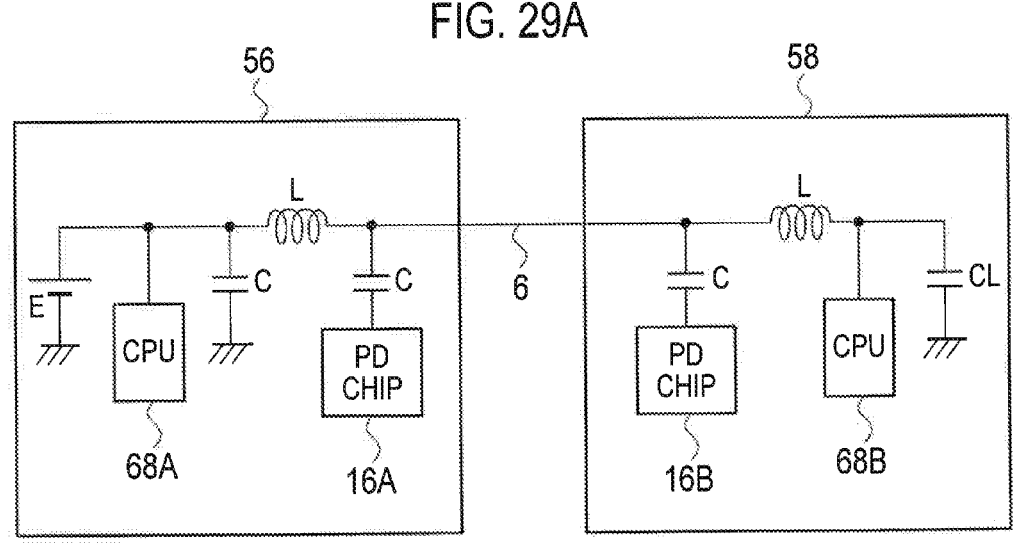
FIG. 29A is a schematic block configuration diagram of the PD system to which the PD devices according to the first to sixth embodiments can be applied composed of alternative two units.
Figure 29B:
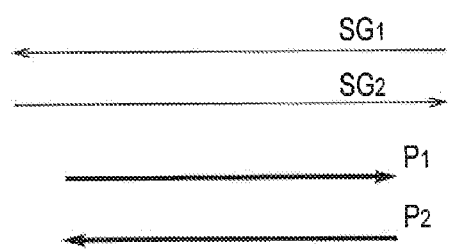
FIG. 29B is a schematic diagram illustrating a transmission direction of USB data and electric power transmitted through the USB PD cable, in the PD system to which the PD devices according to the first to sixth embodiments.

In the PD system capable of applying the PD device according to the first to sixth embodiments, FIG. 29A shows a schematic block configuration composed of two units 56, 58 different from the configuration shown in FIG. 28, and FIG. 29B shows a schematic diagram illustrating a transmission direction of the USB data and electric power transmitted through the USB PD cable 6.

The unit 56 includes a battery E, a CPU 68A and a secondary-side controller (PD CHIP) 16A, and the unit 58 includes a secondary-side controller (PD CHIP) 16B and a load CL.

In the PD system capable of applying the PD device according to the first to sixth embodiments, power transmission from the unit 58 to the unit 56, and power transmission to the unit 58 from the battery E can be achieved without replacement of the cable, for example.

Moreover, the half-duplex data communication with AC superposition is achieved also in between the units 56, 58 through the USB PD cable 6.

(Power Delivery System)

Figure 30:
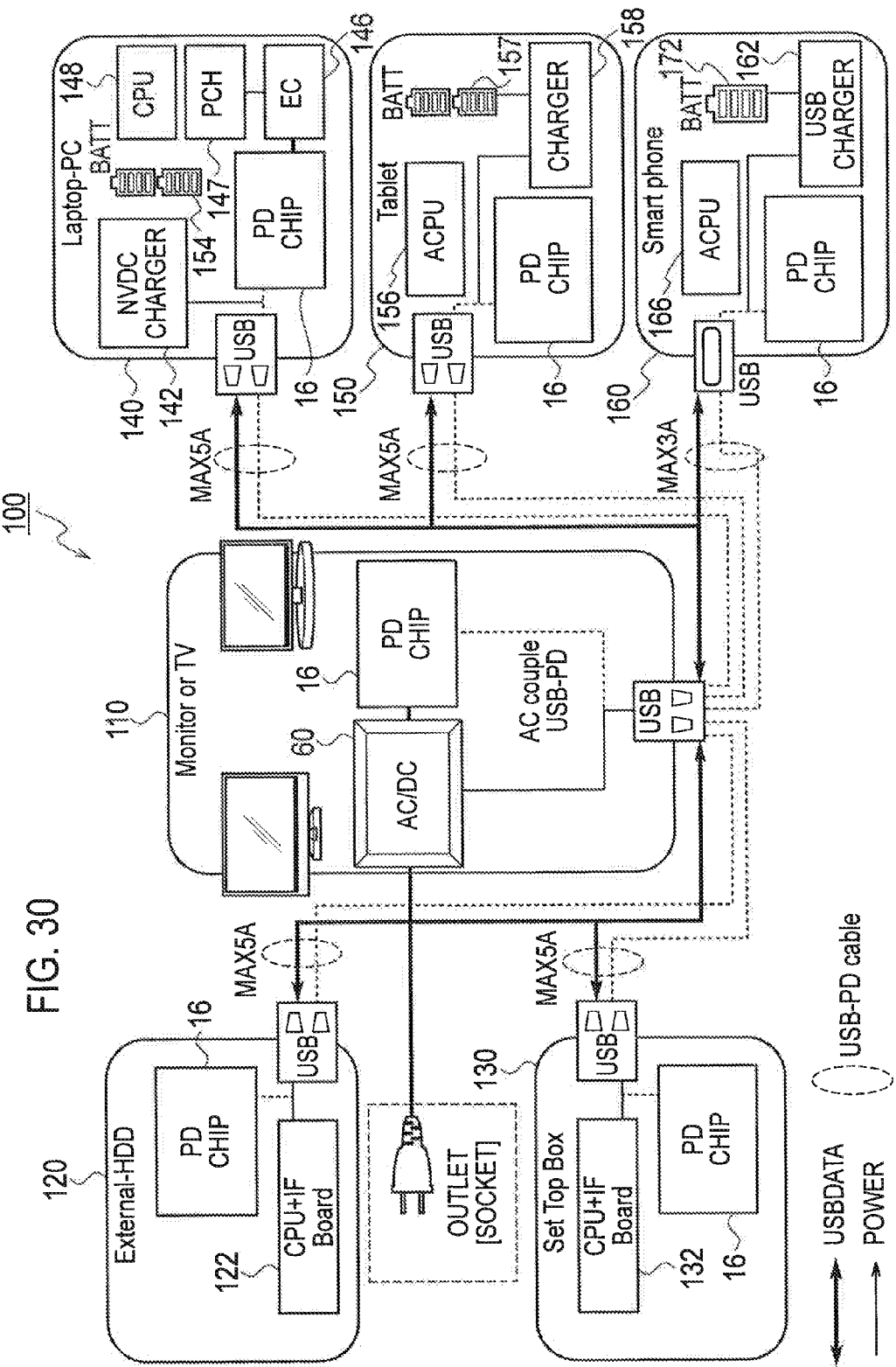
FIG. 30 is a first schematic block configuration diagram of the PD system to which the PD devices according to the first to sixth embodiments.

As shown in FIG. 30, a first PD system 100 capable of applying the PD device (PD, USB PD) according to the first to sixth embodiments includes: a monitor 110 connected to a power socket through a plug; and an external hard disk drive 120/a set top box 130/a laptop PC 140/a tablet PC 150/a smart phone 160 each connected to the monitor 110 using the USB PD cable.

Although the PD device (PD, USB PD) according to the first to sixth embodiments 4A is mounted in each configuring elements, the illustration of the DC/DC converter is omitted in FIG. 30, but the secondary-side controller (PD CHIP) 16 is illustrated in FIG. 30.

USB DATA and DC power can be transmitted between the monitor 110 and the external hard disk drive 120/the set top box 130/the laptop PC 140/the tablet PC 150/the smart phone 160 through the USB PD cable.

An AC/DC converter 60 is mounted in the monitor 110. A CPU/interface board 122 is mounted in the external hard disk drive 120. A CPU/interface board 132 is mounted in the set top box 130. A Narrow Voltage DC/DC (NVDC) charger 142, a CPU 148, a Platform Controller Hub (PCH) 147, and an Embedded Controller (EC) 146 are mounted in the laptop PC 140. An Application CPU (ACPU) 156, a charger 158, and a battery 157 are mounted in the tablet PC 150. An ACPU 166, a USB charger 162, and a battery 172 are mounted in a smart phone 160.

Figure 31:
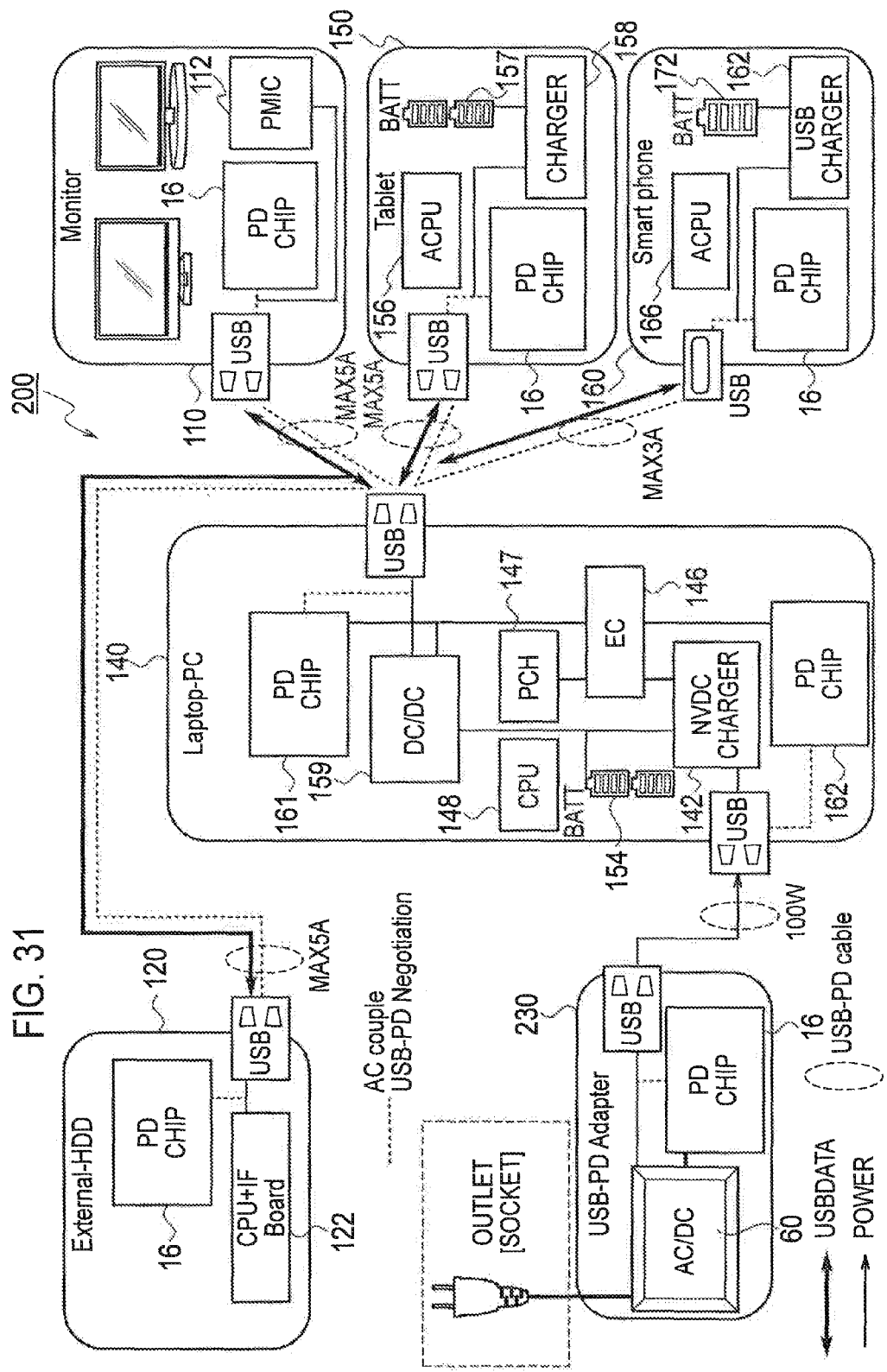
FIG. 31 is a second schematic block configuration diagram of the PD system to which the PD devices according to the first to sixth embodiments.

As shown in FIG. 31, a second PD system 200 capable of applying the PD device (PD, USB PD) according to the first to sixth embodiments includes: a USB PD adapter 230 connected to a power socket through a plug; a laptop PC 140 connected to the USB PD adapter 230 using the USB PD cable; and an external hard disk drive 120/a monitor 110/a tablet PC 150/a smart phone 160 each connected to the laptop PC 140 using the USB PD cable.

Although the PD device (PD, USB PD) according to the first to sixth embodiments 4A is mounted in each configuring elements, the illustration of the DC/DC converter is omitted in FIG. 31, but the secondary-side controller (PD CHIP) 16 is illustrated in FIG. 31.

The USB DATA and the DC power can be transmitted between the laptop PC 140 and the external hard disk drive 120/the monitor 110/the tablet PC 150/the smart phone 160 through the USB PD cable.

An NVDC charger 142, a CPU 148, a PCH 147, an EC 146, a battery 154, a DC/DC converter 159, and PD CHIPs $16_1$, $16_2$ are mounted in the laptop PC 140. A PMIC 112 is mounted in the monitor 110. Other configurations are the same as that of the first PD system 100 (FIG. 30).

Figure 32:
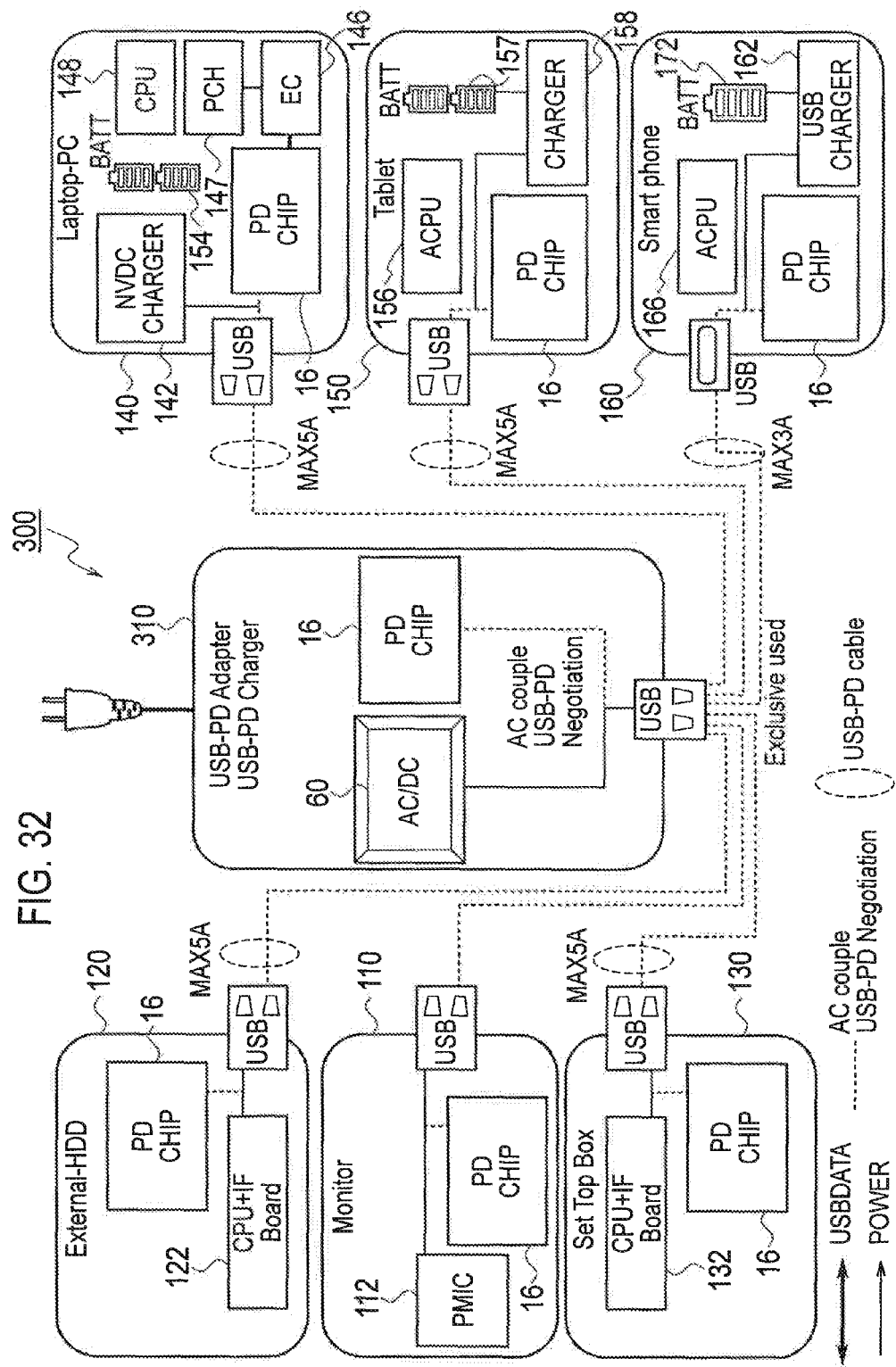
FIG. 32 is a third schematic block configuration diagram of the PD system to which the PD devices according to the first to sixth embodiments.

As shown in FIG. 32, a third PD system 300 capable of applying the PD device (PD, USB PD) according to the first to sixth embodiments includes: a USB PD adapter (USB PD charger) 310 connected to a power socket through a plug; and an external hard disk drive 120/a monitor 110/a set top box 130/a laptop PC 140/a tablet PC 150/a smart phone 160 each connected to the USB PD adapter (USB PD charger) 310 using the USB PD cable.

Although the PD device (PD, USB PD) according to the first to sixth embodiments 4A is mounted in each configuring elements, the illustration of the DC/DC converter is omitted in FIG. 32, but the secondary-side controller (PD CHIP) 16 is illustrated in FIG. 32.

The USB DATA and the DC power can be transmitted between the USB PD adapter 310 (USB PD charger) and the external hard disk drive 120/the monitor 110/the set top box 130/the laptop PC 140/the tablet PC 150/the smart phone 160 through the USB PD cable.

The AC/DC converter 60 is mounted in the USB PD adapter (USB PD charger) 310. Other configurations are the same as those of the first PD system 100 (FIG. 30) and the second PD system 200 (FIG. 31).

Figure 33:
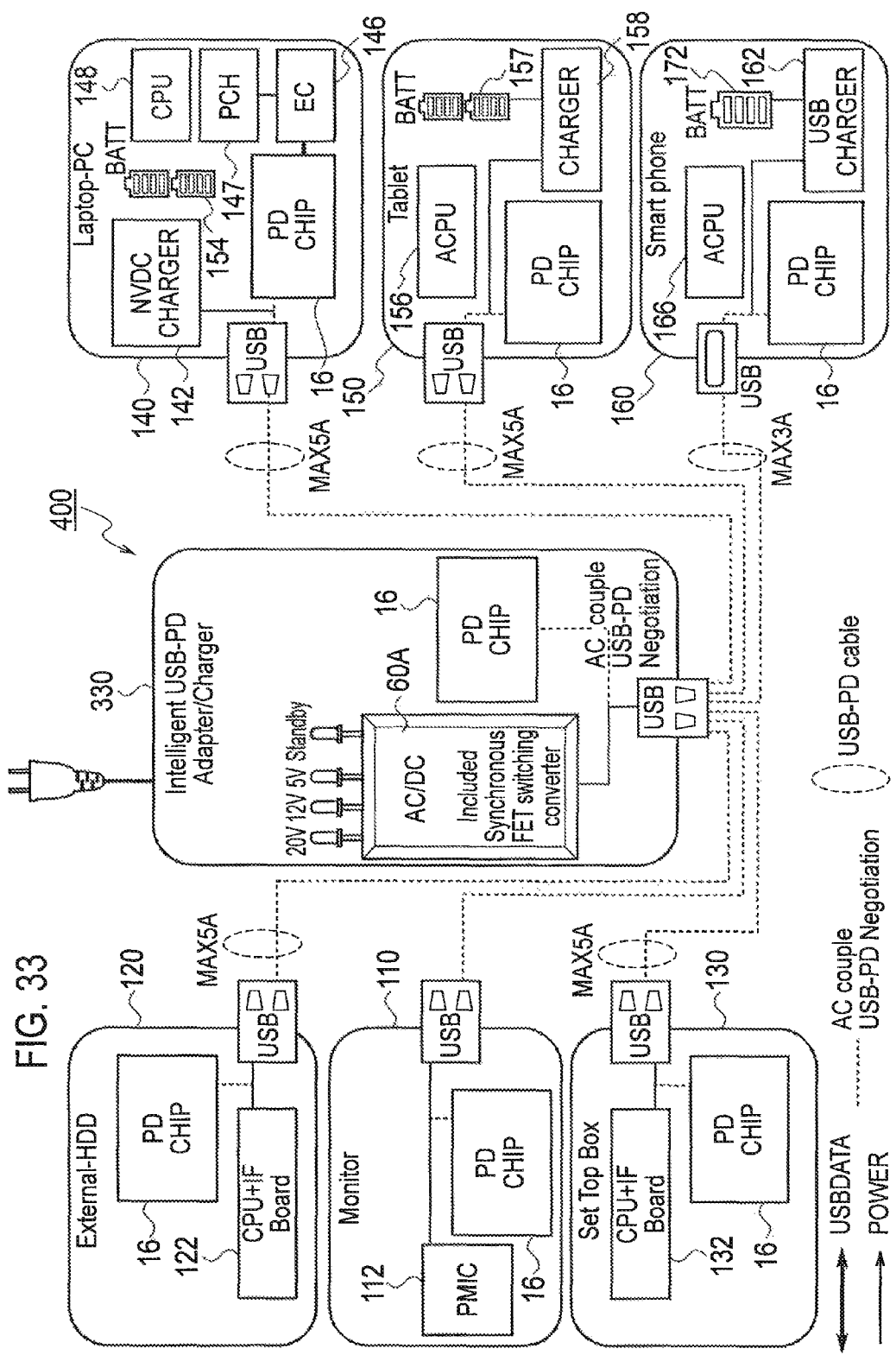
FIG. 33 is a forth schematic block configuration diagram of the PD system to which the PD devices according to the first to sixth embodiments.

As shown in FIG. 33, a fourth PD system 400 capable of applying the PD device (PD, USB PD) according to the first to sixth embodiments includes: a high-performance USB PD adapter/charger 330 connected to a power socket through a plug; and an external hard disk drive 120/a monitor 110/a set top box 130/a laptop PC 140/a tablet PC 150/a smart phone 160 each connected to the high-performance USB PD adapter/charger 330 using the USB PD cable.

Although the PD device (PD, USB PD) according to the first to sixth embodiments 4A is mounted in each configuring elements, the illustration of the DC/DC converter is omitted in FIG. 32, but the secondary-side controller (PD CHIP) 16 is illustrated in FIG. 32.

The USB DATA and the DC power can be transmitted between the high-performance USB PD adapter/charger 330 and the external hard disk drive 120/the monitor 110/the set top box 130/the laptop PC 140/the tablet PC 150/the smart phone 160 through the USB PD cable.

The AC/DC converter 60A including a synchronous FET switching converter is mounted in the high-performance USB PD adapter/charger 330. Other configurations are the same as that of the third PD system 300 (FIG. 32).

Figure 36:
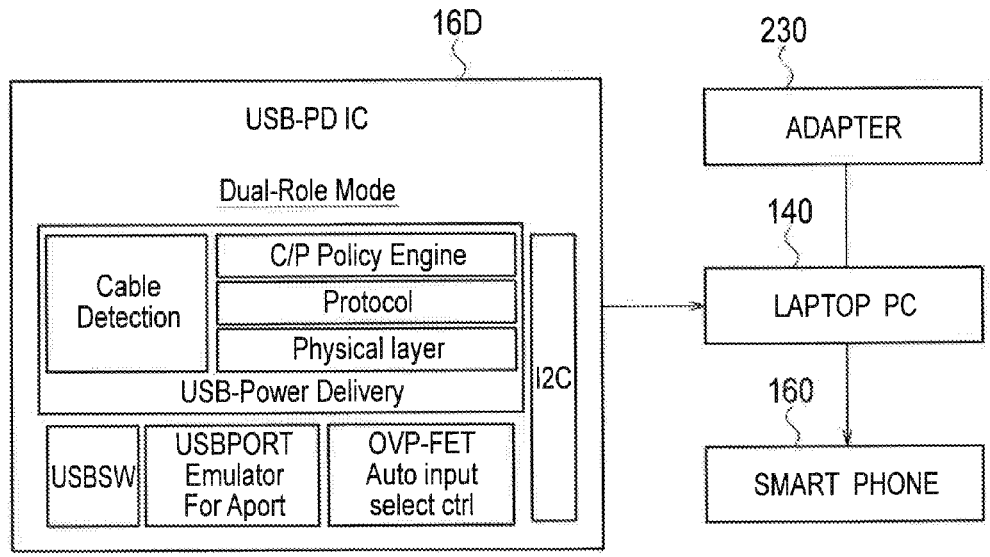
FIG. 36 shows a usage example of the USB PD-IC applicable to the PD devices according to the first to sixth embodiments.
Figure 37:
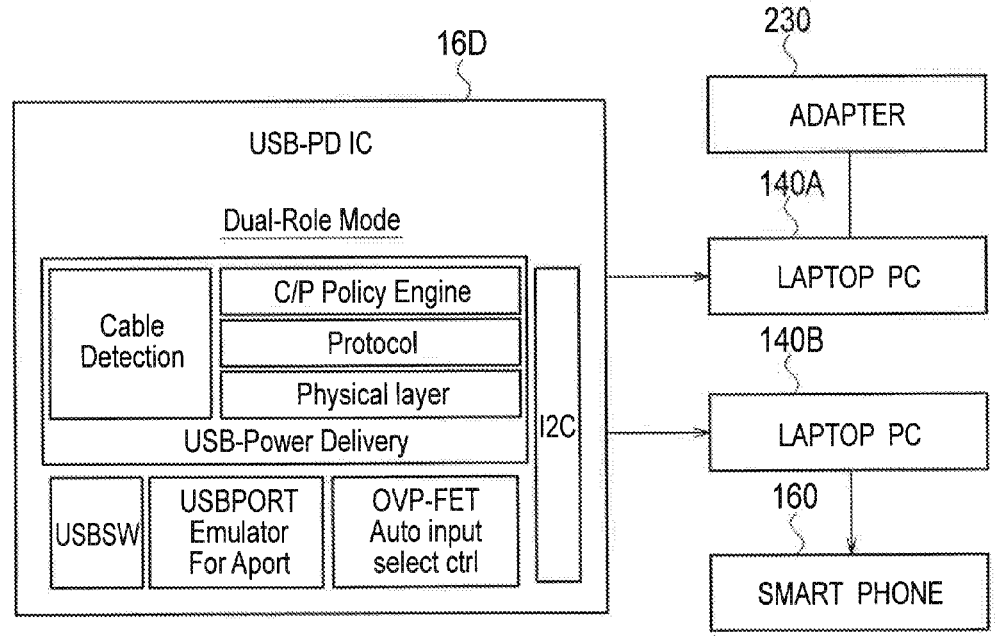
FIG. 37 shows a usage example of the USB PD-IC applicable to the PD devices according to the first to sixth embodiments.
Figure 38:
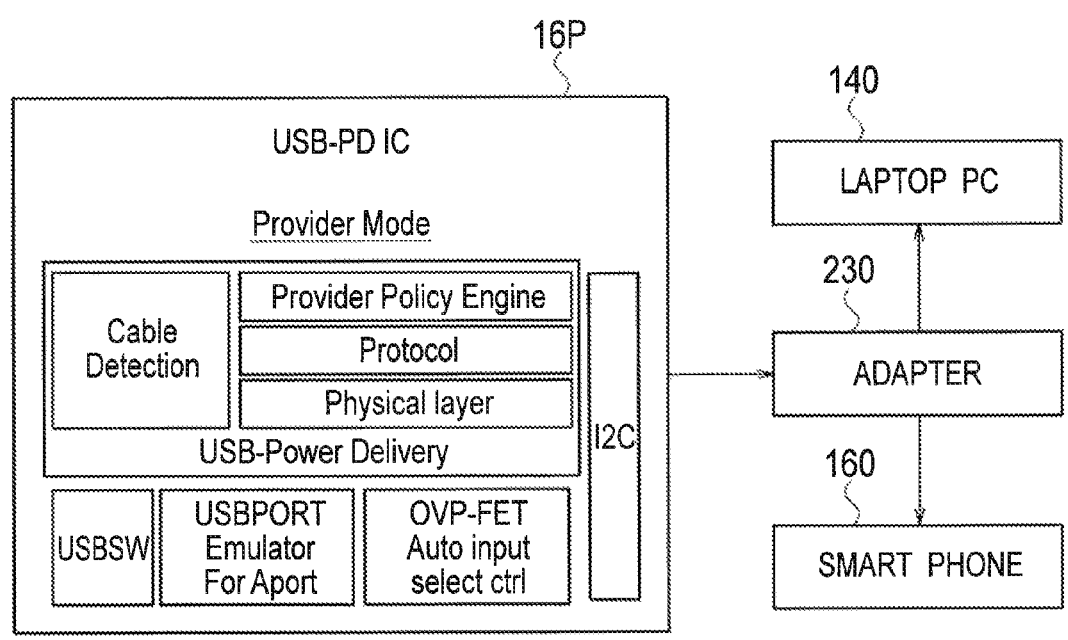
FIG. 38 shows a usage example of the USB PD-IC applicable to the PD devices according to the first to sixth embodiments.

A usage example of the secondary-side controller (PD CHIP) applicable to the PD device according to the first to sixth embodiments is illustrated as shown in FIGS. 36, 37 and 38.

Figure 34:
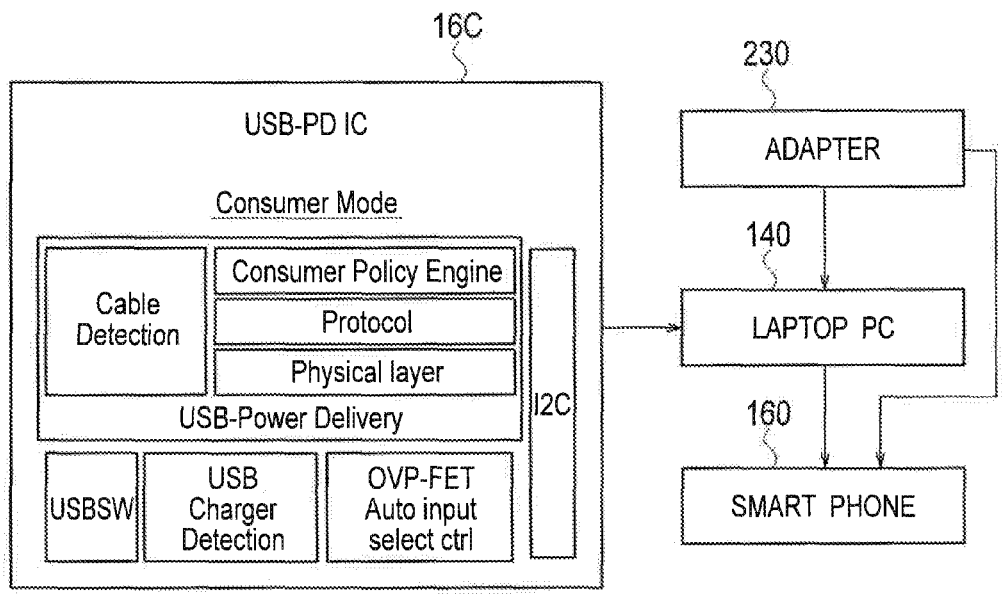
FIG. 34 shows a usage example of a USB PD-IC applicable to the PD devices according to the first to sixth embodiments.

The PD CHIP 16C applicable in a consumer mode for receiving the power supplied from connecting target devices (sets) is connected to the laptop PC 140 connected to the AC adapter 230, as shown in FIG. 34. The laptop PC 140 can be further connected to the smart phone 160, and the smart phone 160 can also be connected to the AC adapter 230.

Figure 35:
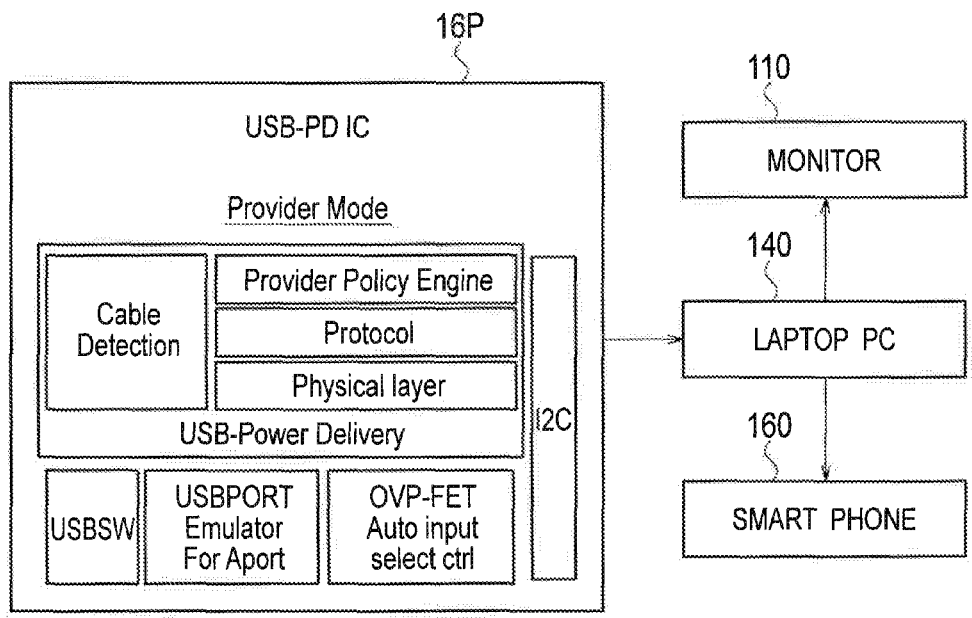
FIG. 35 shows a usage example of the USB PD-IC applicable to the PD devices according to the first to sixth embodiments.

The PD CHIP 16P applicable in a provider mode for delivering (providing) electric power to the connecting target devices (sets) is connected to the laptop PC 140, as shown in FIG. 35. The laptop PC 140 can be further connected to the monitor 110 and the smart phone 160.

The PD CHIP 16D applicable in a dual role mode of both of the consumer mode and the provider mode is connected to the laptop PC 140 connected to the AC adapter 230, as shown in FIG. 36. The laptop PC 140 can be further connected to the smart phone 160.

The PD CHIP 16D applicable in the dual role mode can be connected to the laptop PC 140A connected to connected to the AC adapter 230, and can be further connected to the laptop PC 140B connected to the smart phone 160, as shown in FIG. 37.

As shown in FIG. 38, the PD CHIP 16P applicable in the provider mode for delivering (providing) electric power to the connecting target devices (sets) may be connected to the AC adapter 230, and the AC adapter 230 may be connected to the laptop PC 140 and the smart phone 160.

Seventh Embodiment

Figure 39A:
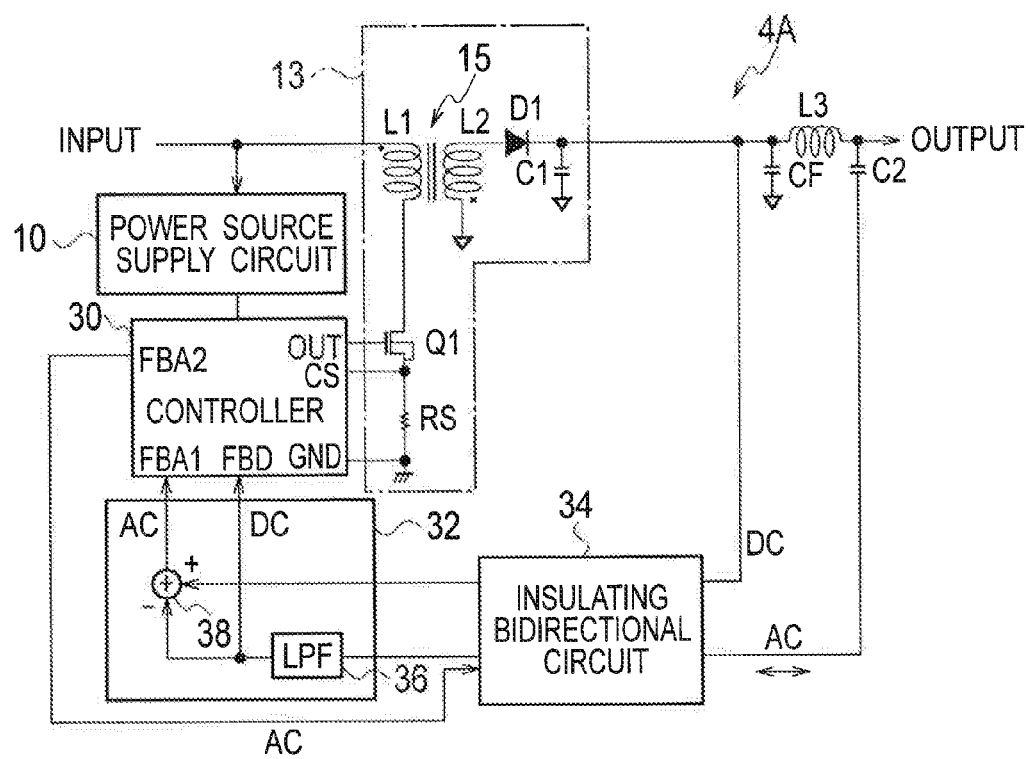
FIG. 39A is a schematic circuit block configuration diagram showing a PD device according to a seventh embodiment.

As shown in FIG. 39A, a PD device 4A according to a seventh embodiment includes: a DC/DC converter 13 disposed between an input and an output, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, and configured to supply a power source to the primary-side controller 30; an insulating bidirectional circuit 34 connected to the output of the DC/DC converter 13, and also connected to the output terminal through the capacitor C2; and a DC/AC component separating circuit 32 which is connected to the insulating bidirectional circuit 34 and which feeds back the electric power information in the output side to the primary-side controller 30.

In the seventh embodiment, the insulating bidirectional circuit 34 achieves DC feedback and AC signal separation with feedback control from the insulating bidirectional circuit 34 to the primary-side controller 30.

An inductance L3 is a separating inductance. More specifically, a filter circuit composed of the inductance L3 and a capacitor CF separates a control signal from the DC/DC converter so that the control signal from the output is not input into the DC/DC converter.

In the PD device 4A according to the seventh embodiment, the voltage is fed back from the output. Moreover, the PD device 4A according to the seventh embodiment has an output voltage variable function.

In the PD device 4A according to the seventh embodiment, the AC signal is superposed on and input into the output terminal from the outside.

In the PD device 4A according to the seventh embodiment, the control signal is input into the insulating bidirectional circuit 34 through the capacitor C2 from the output, and the electric power information in the output side is fed back to the primary-side controller 30 through the DC/AC component separating circuit 32. The primary-side controller 30 controls ON/OFF of the MOS transistor Q1, thereby stabilizing the output voltage.

The DC/AC component separating circuit 32 includes a Low Pass Filter (LPF) 36 and a DC component eliminating circuit 38, in the PD device 4A according to the seventh embodiment.

The DC information of the output of DC/DC converter is input into the DC component eliminating circuit 38 and the LPF 36 in the DC/AC component separating circuit 32 through the insulating bidirectional circuit 34. The input AC information of the output terminal is also input into the DC component eliminating circuit 38 and the LPF 36 in the DC/AC component separating circuit 32 through the capacitor C2 and the insulating bidirectional circuit 34 from the output terminal.

The DC output of LPF 36 is fed back directly to the primary-side controller 30 as DC information (FBD). The DC information (DC component) of the output of DC/DC converter is removed in the DC component eliminating circuit 38, and only the input AC information is fed back to the primary-side controller 30 (FBA1). The input control signal from the outside of the output terminal is AC-superposed on the input AC information.

Furthermore, the output AC information (FBA2) is fed back from the primary-side controller 30 to the output terminal through the insulating bidirectional circuit 34 and the capacitor C2. In the present embodiment, the output control signal is superposed on the output AC information (FBA2) fed back to the output terminal from the primary-side controller 30.

The PD device 4A according to the seventh embodiment includes: a circuit configured to restore the input control signal included in the input AC information; and a circuit configured to superpose the output control signal on the output AC information from the primary-side controller 30, in the primary-side controller 30.

In the PD device 4A according to the seventh embodiment, the input control signal superposed on the input AC information is input into the output terminal from the outside. More specifically, the input control signal is input into the insulating bidirectional circuit 24 through the capacitor C2 from the output, the electric power information is fed back to the primary-side controller 30 through the DC/AC component separating circuit 32 from the insulating bidirectional circuit 34, and ON/OFF of the MOS transistor Q1 is controlled by the primary-side controller 30, thereby stabilizing the output voltage. Moreover, the amount of current conducted to the primary-side inductance L1 is detected by the current sensing resistor RS, and the amount of current of the primary-side overcurrent is controlled in the primary-side controller 30.

The insulating bidirectional circuit 34 can bidirectionally transmit the input/output AC information with the DC information.

A bidirectional transformer having an insulated driver, a bidirectional device, etc. are applicable to the insulating bidirectional circuit 34. Moreover, the insulating bidirectional circuit 34 may be composed by combining a plurality of unidirectional circuits and unidirectional elements.

Figure 39B:
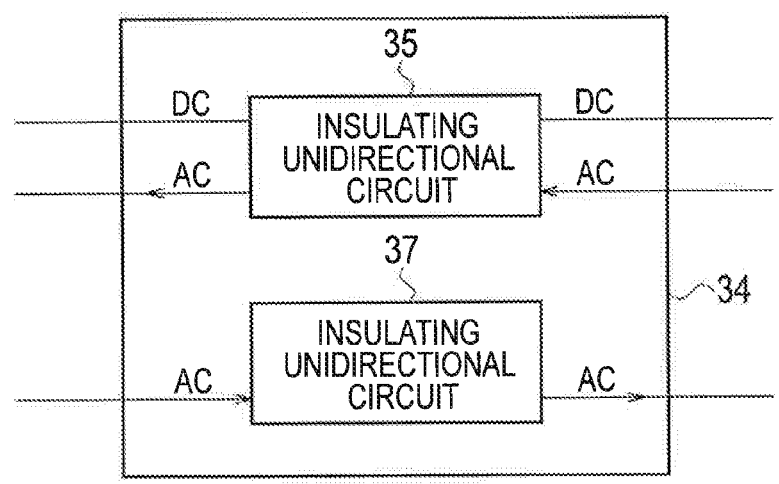
FIG. 39B shows a structural example of an insulating bidirectional circuit applicable to the PD device according to the seventh embodiment.

For example, the insulating bidirectional circuit 34 may include a plurality of insulating unidirectional circuits 35, 37 as shown in FIG. 39B. In the present embodiment, the insulating unidirectional circuit 35 can transmit the DC information and the input AC information from the secondary side to the primary side, and the insulating unidirectional circuit 37 can transmit the output AC information from the primary side to the secondary side. The plurality of the insulating unidirectional circuits 35, 37 are combined, thereby composing the insulating bidirectional circuit 34 as a consequence.

In the PD device 4A according to the seventh embodiment, the control information is transmitted to the primary-side controller 30 through the DC/AC component separating circuit 32 from the insulating bidirectional circuit 34, and thereby the output voltage and the available output current capacity (MAX value) can be varied.

In the PD device 4A according to the seventh embodiment, the variable function of the output voltage value and the available output current capacity (MAX value) of the step-down (buck) type DC/DC converter 13 is achieved by the feedback control from the insulating bidirectional circuit 34 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the seventh embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the seventh embodiment, there can be provided the PD device having the variable function of the output voltage value and the available output current capacity (MAX value) of the diode rectification and step-down (buck) type DC/DC converter 13 achieved by the feedback control to the primary-side controller 30 through the capacitor C2 and the insulation circuit 20 from the insulating bidirectional circuit 34.

The PD device 4A according to the seventh embodiment can be called merely a power delivery (PD) device since the secondary-side controller (PD CHIP) 16 can be omitted.

Eighth Embodiment

Figure 40:
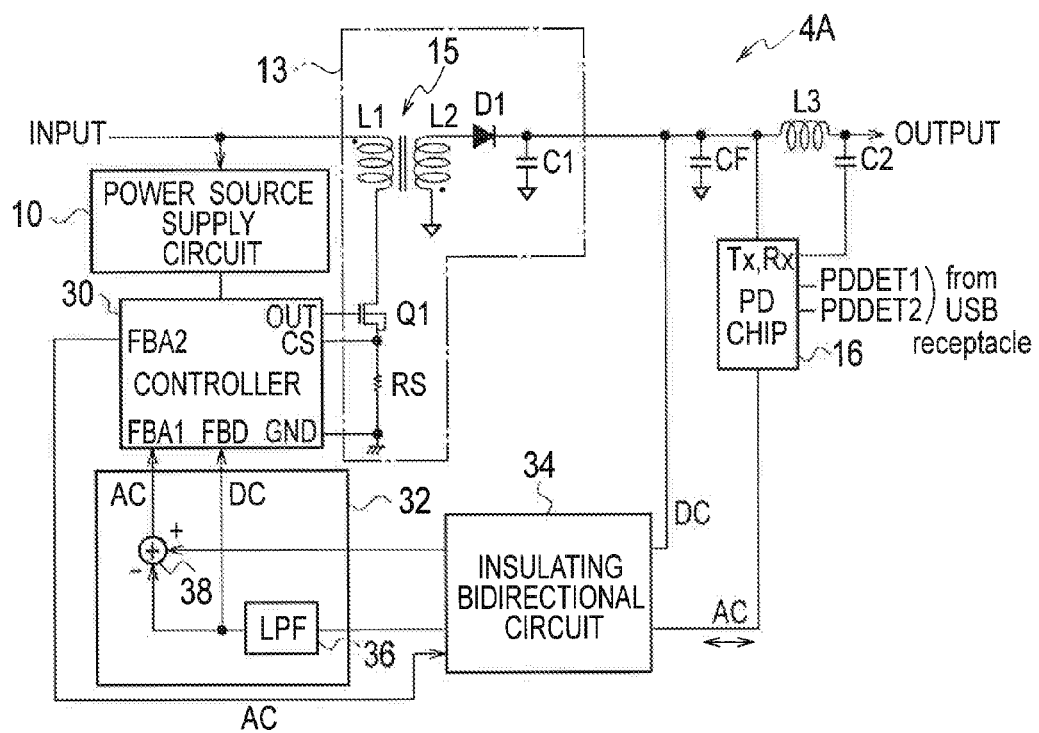
FIG. 40 is a schematic circuit block configuration diagram showing a PD device according to an eighth embodiment.

As shown in FIG. 40, a PD device 4A according to an eighth embodiment includes: a DC/DC converter 13 disposed between an input and an output, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, and configured to supply a power source to the primary-side controller 30; a secondary-side controller (PD CHIP) 16 connected to the output of the DC/DC converter 13, and also connected to the output terminal through the capacitor C2; an insulating bidirectional circuit 34 connected to the output of the DC/DC converter 13, and also connected to the secondary-side controller (PD CHIP) 16; and a DC/AC component separating circuit 32 which is connected to the insulating bidirectional circuit 34 and which feeds back the electric power information in the output side to the primary-side controller 30. Other configurations are the same as those of the seventh embodiment.

In the eighth embodiment, the insulating bidirectional circuit 34 achieves DC feedback and AC signal separation with feedback control from the insulating bidirectional circuit 34 to the primary-side controller 30, in the same manner as the seventh embodiment.

A voltage-current control circuit for controlling the output voltage $V_o$ and the output current $I_o$ is included in the secondary-side controller (PD CHIP) 16.

In the PD device 4A according to the eighth embodiment, the variable function of the output voltage value and the available output current capacity (MAX value) of the step-down (buck) type DC/DC converter 13 is achieved by the feedback control from the secondary-side controller (PD CHIP) 16 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the eighth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the eighth embodiment, there can be provided the PD device having the variable function of the output voltage value and the available output current capacity (MAX value) of the diode rectification system and step-down (buck) type DC/DC converter 13 achieved by the feedback control from the secondary-side controller (PD CHIP) 16 to the primary-side controller 30.

In the PD device 4A according to the eighth embodiment, since the secondary-side controller (PD CHIP) 16 is able to USB-connect, the PD device 4A according to the eighth embodiment can be called a USB Power Delivery (USB PD) device.

Ninth Embodiment

Figure 41:
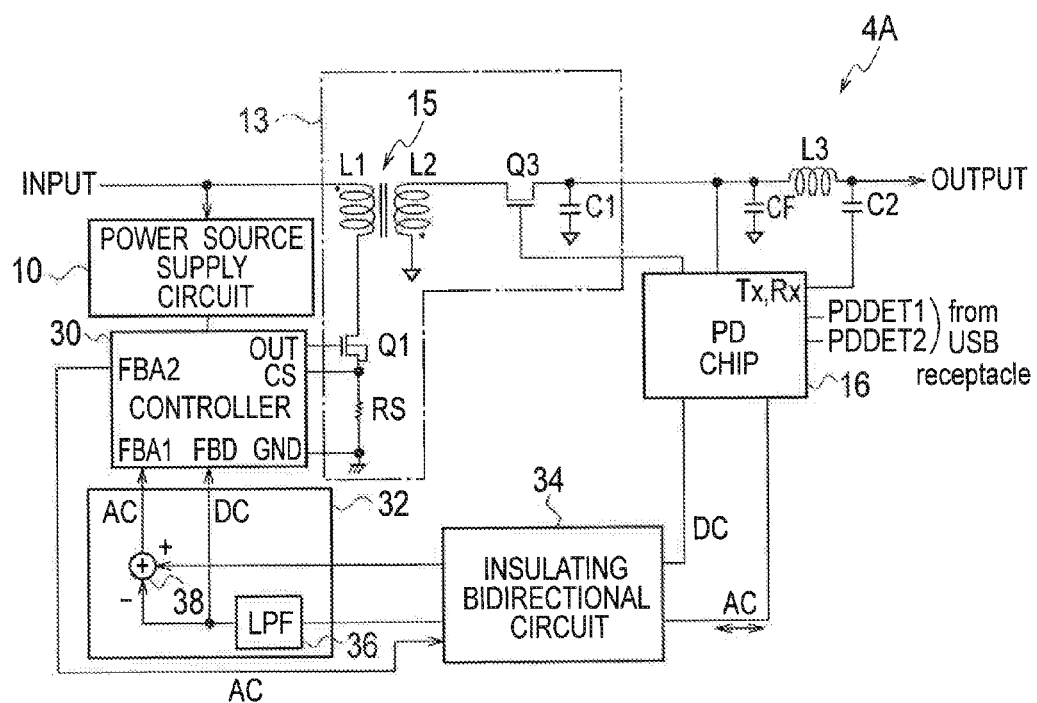
FIG. 41 is a schematic circuit block configuration diagram showing a PD device according to a ninth embodiment.

As shown in FIG. 41, a PD device 4A according to a ninth embodiment includes: a synchronous rectification type DC/DC converter 13 disposed between an input and an output, and composed of a transformer 15, a MOS transistor Q3, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, and configured to supply a power source to the primary-side controller 30; a secondary-side controller (PD CHIP) 16 connected to the output of the DC/DC converter 13, and also connected to the output terminal through the capacitor C2; an insulating bidirectional circuit 34 connected to the secondary-side controller (PD CHIP) 16; and a DC/AC component separating circuit 32 which is connected to the insulating bidirectional circuit 34 and which feeds back the electric power information in the output side to the primary-side controller 30.

The MOS transistor Q3 included in the synchronous rectification type DC/DC converter 13 has ON/OFF controlled by the secondary-side controller (PD CHIP) 16.

Moreover, the secondary-side controller (PD CHIP) 16 can control the output voltage $V_o$ and the output current $I_o$.

The PD device 4A according to the ninth embodiment can improve the DC/DC power conversion efficiency compared with the seventh to eighth embodiments having the diode rectification system since the synchronizing rectification method is used for the DC/DC converter instead of the diode rectification system. Other configurations are the same as those of the seventh embodiment.

A voltage-current control circuit for controlling the output voltage $V_o$ and the output current $I_o$ is included in the secondary-side controller (PD CHIP) 16.

In also the ninth embodiment, the insulating bidirectional circuit 34 achieves DC feedback and AC signal separation with feedback control from the insulating bidirectional circuit 34 to the primary-side controller 30, in the same manner as the seventh to eighth embodiments.

In the PD device 4A according to the ninth embodiment, the variable function of the output voltage value and the available output current capacity (MAX value) of the synchronous rectification type DC/DC converter 13 is achieved by the feedback control from the secondary-side controller (PD CHIP) 16 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the ninth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the ninth embodiment, there can be provided the PD device having the variable function of the output voltage value and the available output current capacity (MAX value) of the synchronous rectification type DC/DC converter 13 achieved by the feedback control from the secondary-side controller (PD CHIP) 16 to the primary-side controller 30.

In the PD device 4A according to the ninth embodiment, since the secondary-side controller (PD CHIP) 16 is able to USB-connect, the PD device 4A according to the ninth embodiment can be called a USB Power Delivery (USB PD) device.

Tenth Embodiment

Figure 42:
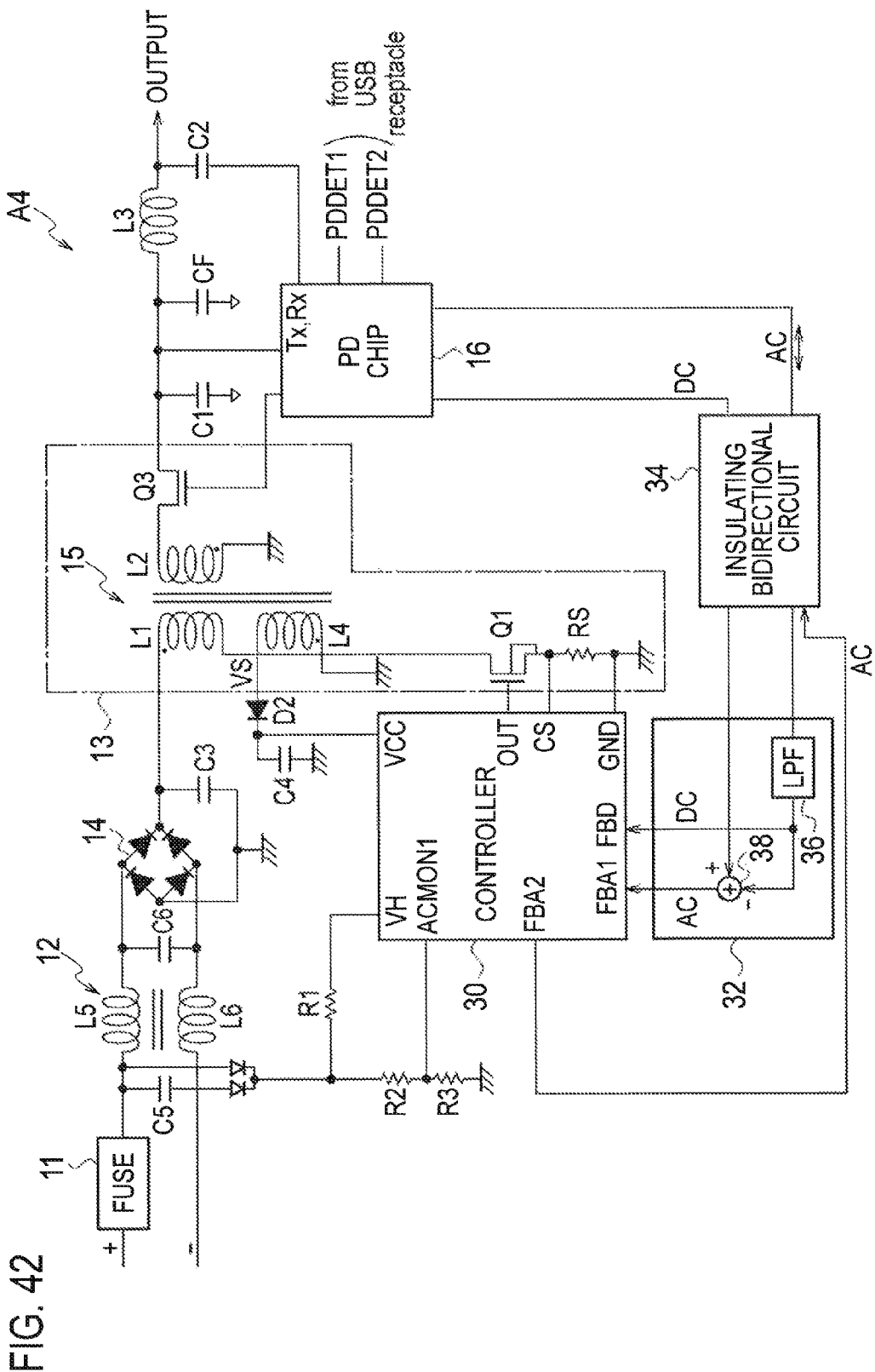
FIG. 42 is a schematic circuit block configuration diagram showing a PD device according to a tenth embodiment.

As shown in FIG. 42, a PD device 4A according to a tenth embodiment includes an AC/DC converter connected to the AC input and composed of a fuse 11, a choke coil 12, a diode rectification bridge 14, capacitors C5, C6, C3, etc., instead of the power source supply circuit 10 as in the ninth embodiment.

Moreover, an auxiliary inductance L4 composed of the primary-side auxiliary winding in the transformer 15, and a diode D2 and a capacitor C4 connected in parallel to the auxiliary inductance L4 are provided therein, and the DC voltage VCC is supplied from the capacitor C4 to the primary-side controller 30.

Furthermore, as shown in FIG. 42, the PD device 4A according to the tenth embodiment includes: a synchronous rectification type DC/DC converter 13 disposed between an output of AC/DC converter and the output, and composed of a transformer 15, a MOS transistor Q3, a capacitor C1, and a MOS transistor Q1 and a resistor RS connected in series between a primary-side inductance L1 of the transformer 15 and a ground potential; a primary-side controller 30 configured to control the MOS transistor Q1; a secondary-side controller (PD CHIP) 16 connected to the output of the DC/DC converter 13, and also connected to the output terminal through the capacitor C2; an insulating bidirectional circuit 34 connected to the secondary-side controller (PD CHIP) 16; and a DC/AC component separating circuit 32 which is connected to the insulating bidirectional circuit 34 and which feeds back the electric power information in the output side to the primary-side controller 30.

The MOS transistor Q3 included in the synchronous rectification type DC/DC converter 13 has ON/OFF controlled by the secondary-side controller (PD CHIP) 16.

Moreover, the secondary-side controller (PD CHIP) 16 can control the output voltage $V_o$ and the output current $I°$.

The PD device 4A according to the tenth embodiment can improve the DC/DC power conversion efficiency compared with the seventh to eighth embodiments having the diode rectification system since the synchronizing rectification method is used for the DC/DC converter instead of the diode rectification system. Other configurations are the same as those of the seventh embodiment.

A voltage-current control circuit for controlling the output voltage $V_o$ and the output current $I_o$ is included in the secondary-side controller (PD CHIP) 16.

In also the tenth embodiment, the insulating bidirectional circuit 34 achieves DC feedback and AC signal separation with feedback control from the insulating bidirectional circuit 34 to the primary-side controller 30, in the same manner as the seventh to ninth embodiments.

In the PD device 4A according to the tenth embodiment, the variable function of the output voltage value and the available output current capacity (MAX value) of the synchronous rectification type DC/DC converter 13 is achieved by the feedback control from the secondary-side controller (PD CHIP) 16 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the tenth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the tenth embodiment, there can be provided the PD device having the variable function of the output voltage value and the available output current capacity (MAX value) of the synchronous rectification type and step-down (buck) type DC/DC converter 13 achieved by the feedback control from the secondary-side controller (PD CHIP) 16 to the primary-side controller 30.

In the PD device 4A according to the tenth embodiment, since the secondary-side controller (PD CHIP) 16 is able to USB-connect, the PD device 4A according to the tenth embodiment can be called a USB Power Delivery (USB PD) device having the AC/DC converter function (AC/DC+USB PD).

Eleventh Embodiment

Figure 43:
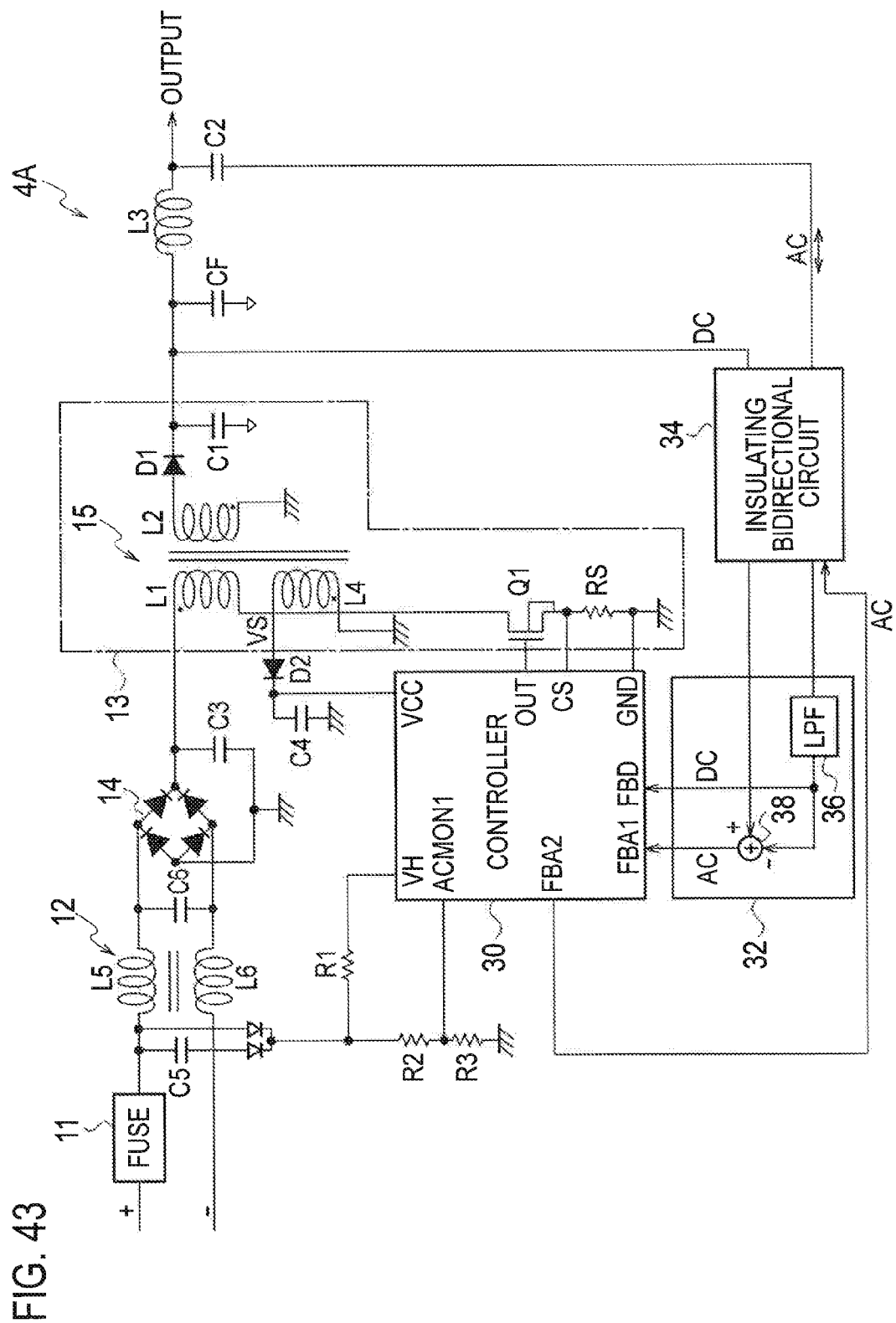
FIG. 43 is a schematic circuit block configuration diagram showing a PD device according to an eleventh embodiment.

As shown in FIG. 43, a PD device 4A according to an eleventh embodiment includes an AC/DC converter connected to the AC input and composed of a fuse 11, a choke coil 12, a diode rectification bridge 14, capacitors C5, C6, C3, etc., instead of the power source supply circuit 10 as in the seventh embodiment.

Moreover, an auxiliary inductance L4 composed of the primary-side auxiliary winding in the transformer 15, and a diode D2 and a capacitor C4 connected in parallel to the auxiliary inductance L4 are provided therein, and the DC voltage VCC is supplied from the capacitor C4 to the primary-side controller 30.

Furthermore, as shown in FIG. 43, the PD device 4A according to the eleventh embodiment includes: a DC/DC converter 13 disposed between an output of AC/DC converter and an output, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; an insulating bidirectional circuit 34 connected to the output of the DC/DC converter 13, and also connected to the output terminal through the capacitor C2; and a DC/AC component separating circuit 32 which is connected to the insulating bidirectional circuit 34 and which feeds back the electric power information in the output side to the primary-side controller 30.

In also the tenth embodiment, the insulating bidirectional circuit 34 achieves DC feedback and AC signal separation with feedback control from the insulating bidirectional circuit 34 to the primary-side controller 30, in the same manner as the seventh to tenth embodiments.

In the PD device 4A according to the eleventh embodiment, the variable function of the output voltage value and the available output current capacity (MAX value) of the step-down (buck) type DC/DC converter 13 is achieved by the feedback control from the insulating bidirectional circuit 34 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the eleventh embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the eleventh embodiment, there can be provided the PD device having the variable function of the output voltage value and the available output current capacity (MAX value) of the diode rectification and step-down (buck) type DC/DC converter 13 achieved by the feedback control to the primary-side controller 30 through the capacitor C2 and the insulation circuit 20 from the insulating bidirectional circuit 34.

In the PD device 4A according to the eleventh embodiment, since the secondary-side controller (PD CHIP) 16 is able to USB-connect, the PD device 4A according to the tenth embodiment can be called a USB Power Delivery (USB PD) device having the AC/DC converter function (AC/DC+USB PD).

Twelfth Embodiment

Figure 44:
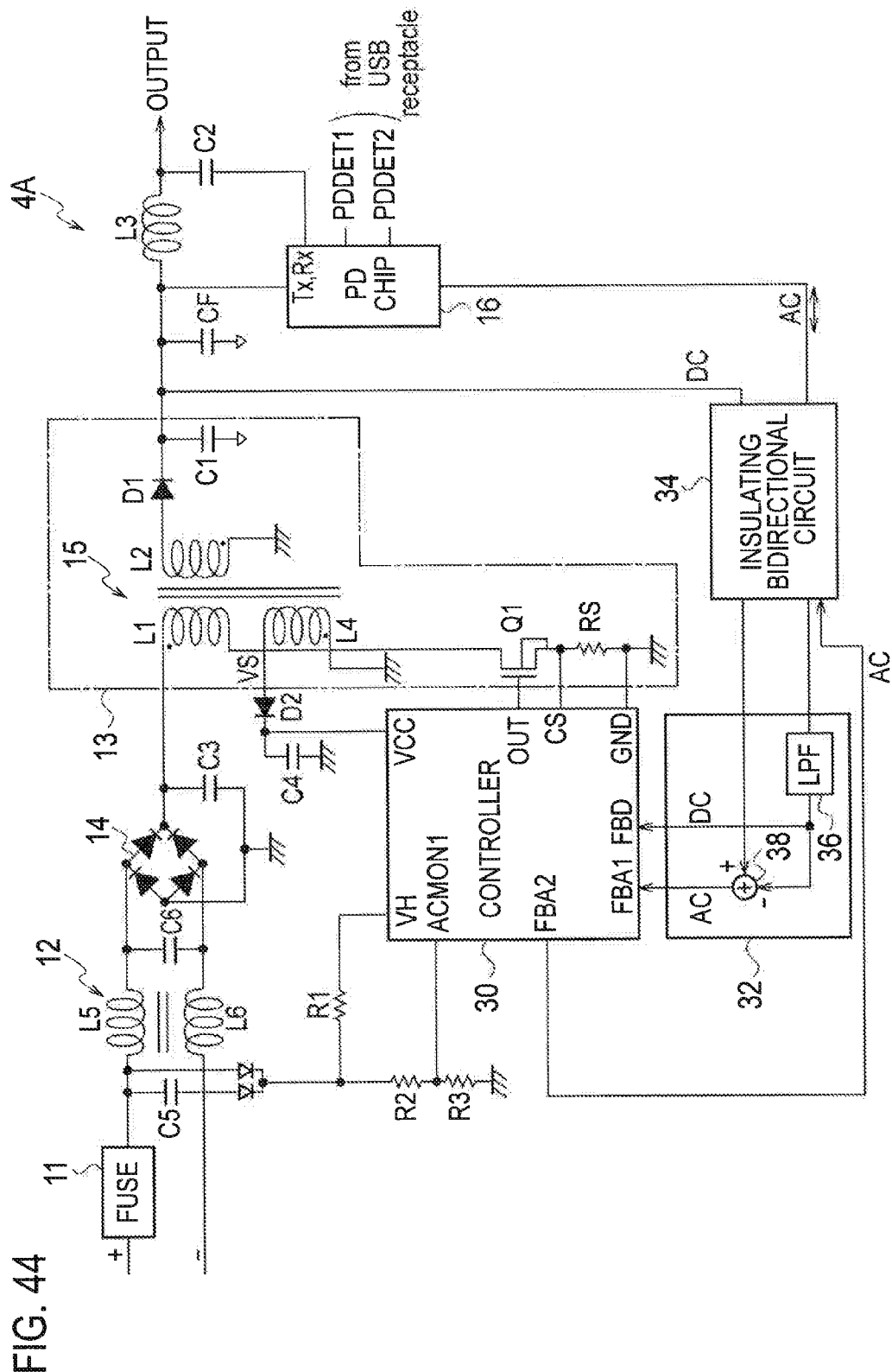
FIG. 44 is a schematic circuit block configuration diagram showing a PD device according to a twelfth embodiment

As shown in FIG. 44, a PD device 4A according to a twelfth embodiment includes an AC/DC converter connected to the AC input and composed of a fuse 11, a choke coil 12, a diode rectification bridge 14, capacitors C5, C6, C3, etc., instead of the power source supply circuit 10 as in the eighth embodiment.

Moreover, an auxiliary inductance L4 composed of the primary-side auxiliary winding in the transformer 15, and a diode D2 and a capacitor C4 connected in parallel to the auxiliary inductance L4 are provided therein, and the DC voltage VCC is supplied from the capacitor C4 to the primary-side controller 30.

Furthermore, as shown in FIG. 44, the PD device 4A according to the twelfth embodiment includes: a DC/DC converter 13 disposed between an output of AC/DC converter and an output, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a secondary-side controller (PD CHIP) 16 connected to the output of the DC/DC converter 13, and also connected to the output terminal through the capacitor C2; an insulating bidirectional circuit 34 connected to the secondary-side controller (PD CHIP) 16; and a DC/AC component separating circuit 32 which is connected to the insulating bidirectional circuit 34 and which feeds back the electric power information in the output side to the primary-side controller 30. Moreover, the secondary-side controller (PD CHIP) 16 can control the output voltage $V_o$ and the output current $I_o$. Other configurations are the same as those of the seventh embodiment.

A voltage-current control circuit for controlling the output voltage $V_o$ and the output current $I_o$ is included in the secondary-side controller (PD CHIP) 16.

In also the twelfth embodiment, the insulating bidirectional circuit 34 achieves DC feedback and AC signal separation with feedback control from the insulating bidirectional circuit 34 to the primary-side controller 30, in the same manner as the seventh to eleventh embodiments.

In the PD device 4A according to the twelfth embodiment, the variable function of the output voltage value and the available output current capacity (MAX value) of the step-down (buck) type DC/DC converter 13 is achieved by the feedback control from the secondary-side controller (PD CHIP) 16 to the primary-side controller 30. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the twelfth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the twelfth embodiment, there can be provided the PD device having the variable function of the output voltage value and the available output current capacity (MAX value) of the diode rectification system and step-down (buck) type DC/DC converter 13 achieved by the feedback control from the secondary-side controller (PD CHIP) 16 to the primary-side controller 30.

In the PD device 4A according to the twelfth embodiment, since the secondary-side controller (PD CHIP) 16 is able to USB-connect, the PD device 4A according to the twelfth embodiment can be called a USB Power Delivery (USB PD) device having the AC/DC converter function (AC/DC+USB PD).

Thirteenth Embodiment

Figure 45:
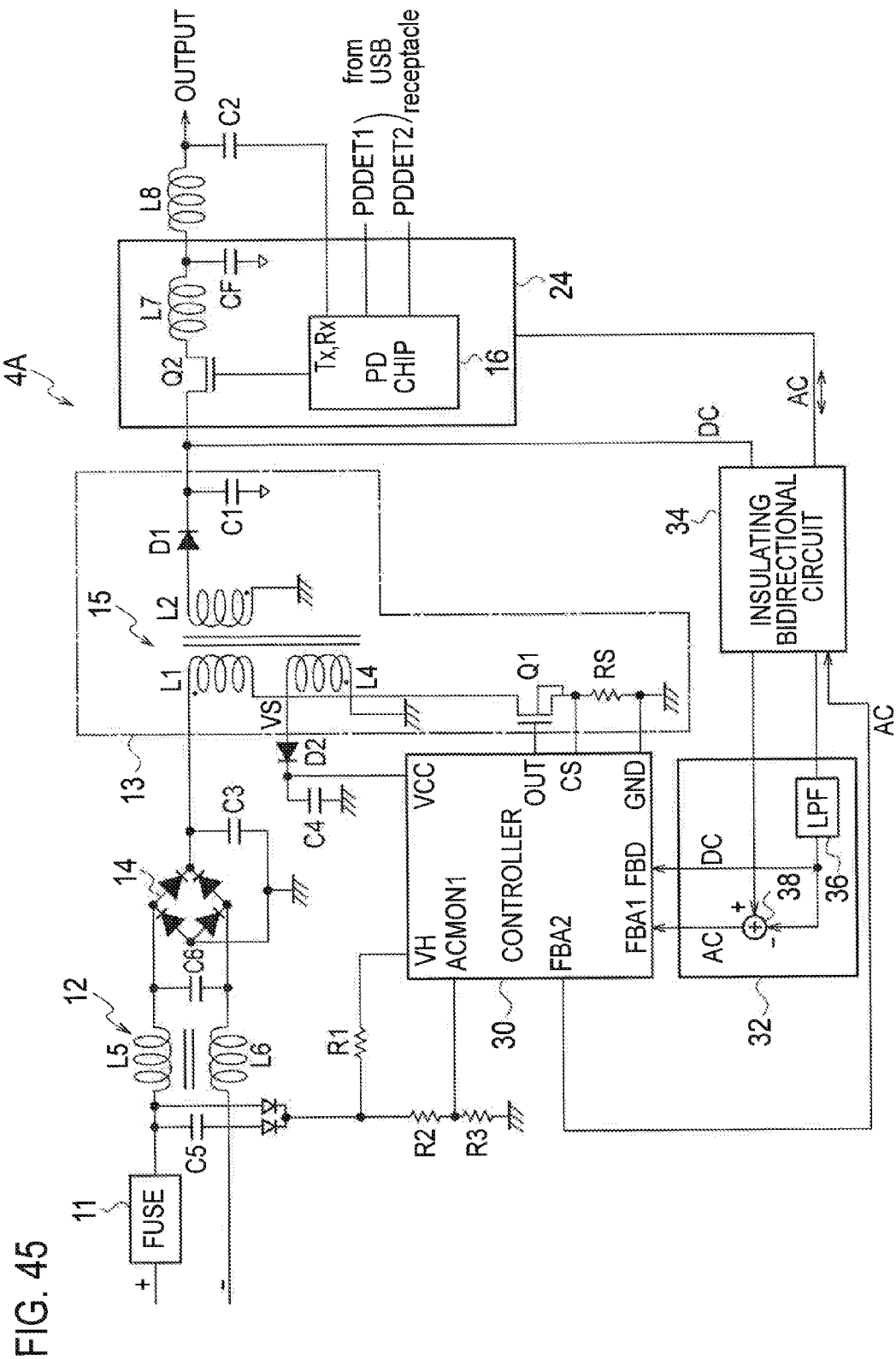
FIG. 45 is a schematic circuit block configuration diagram showing a PD device according to a thirteenth embodiment.

As shown in FIG. 45, a PD device 4A according to a thirteenth embodiment includes an AC/DC converter connected to the AC input and composed of a fuse 11, a choke coil 12, a diode rectification bridge 14, capacitors C5, C6, C3, etc. instead of the power source supply circuit 10 as in the seventh embodiment, in the same manner as the tenth embodiment.

As shown in FIG. 45, the PD device 4A according to the thirteenth embodiment includes an independent DC/DC converter 24 which is connected to the output of the step-down (buck) type DC/DC converter 13 and which includes the secondary-side controller (PD CHIP) 16 therein.

The synchronous rectification type DC/DC converter 24 is composed of the MOS transistor Q2, the inductance L7, and the secondary-side controller (PD CHIP) 16. The secondary-side controller (PD CHIP) 16 is connected to the gate of the MOS transistor Q2, and the secondary-side controller (PD CHIP) 16 controls ON/OFF of the MOS transistor Q2. The inductance L7 is an inductance used for the DC/DC converter 24.

An inductance L8 is a PD separating inductance. More specifically, a filter circuit composed of the inductance L8 and a capacitor C5 separates a control signal from the DC/DC converter so that the control signal from the output side is not input into the DC/DC converter.

Furthermore, as shown in FIG. 45, the PD device 4A according to the thirteenth embodiment includes: A DC/DC converter 13 disposed between the output of the AC/DC converter and the output of the DC/DC converter, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a secondary-side controller (PD CHIP) 16 which is connected to the output through the capacitor C2, and can control an output voltage $V_o$ and an output current $I_o$; an insulating bidirectional circuit 34 connected to the output of DC/DC converter 13, and also connected to the DC/DC converter 24; and a DC/AC component separating circuit 32 which is connected to the insulating bidirectional circuit 34 and which feeds back the electric power information in the output side to the primary-side controller 30. Other configurations are the same as those of the tenth embodiment.

In the PD device 4A according to the thirteenth embodiment, the voltage is fed back from the output of the DC/DC converter 13. More specifically, the electric power information is fed back from the output of the DC/DC converter 13 (secondary) side to the input (primary) side, and ON/OFF of MOS transistor Q1 is controlled by the primary-side controller 30, thereby stabilizing the output voltage. The amount of current conducted to the primary-side inductance L1 in the transformer 15 is detected by the current sensing resistor RS, and the amount of current of the primary-side overcurrent is controlled in the primary-side controller 30.

In the PD device 4A according to the thirteenth embodiment, the variable function of the output voltage value and the available output current capacity (MAX value) of the synchronous rectification type DC/DC converter 24 is achieved by the secondary-side controller (PD CHIP) 16 included in the synchronous rectification type DC/DC converter 24. Accordingly, the relationship between the output voltage $V_o$ and the output currents $I_o$ can be varied (variable function) in accordance with loads (e.g., smart phones, laptop PCs, tablet PCs, etc.) connected to the output.

As the relationship between the output voltage $V_o$ and the output current $I_o$ obtained by using the PD device 4A according to the thirteenth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the thirteenth embodiment, the output voltage of diode rectification and step-down (buck) type DC/DC converter 13 is stabilized by the feedback control from the output of step-down (buck) type DC/DC converter to the primary-side controller 30, and the variable function of the output voltage value and the available output current capacity (MAX value) of the synchronous rectification type DC/DC converter 24 connected to the DC/DC converter 13 is achieved by the secondary-side controller (PD CHIP) 16 included in the synchronous rectification type DC/DC converter 24.

As a consequence, according to the thirteenth embodiment, there can be provided the PD device having the variable function of the output voltage value and the available output current capacity (MAX value) of the diode rectification and step-down (buck) type DC/DC converter 13.

In the PD device 4A according to the thirteenth embodiment, since the secondary-side controller (PD CHIP) 16 is able to USB-connect, the PD device 4A according to the thirteenth embodiment can be called a USB Power Delivery (USB PD) device having the AC/DC converter function (AC/DC+USB PD).

Fourteenth Embodiment

Figure 46:
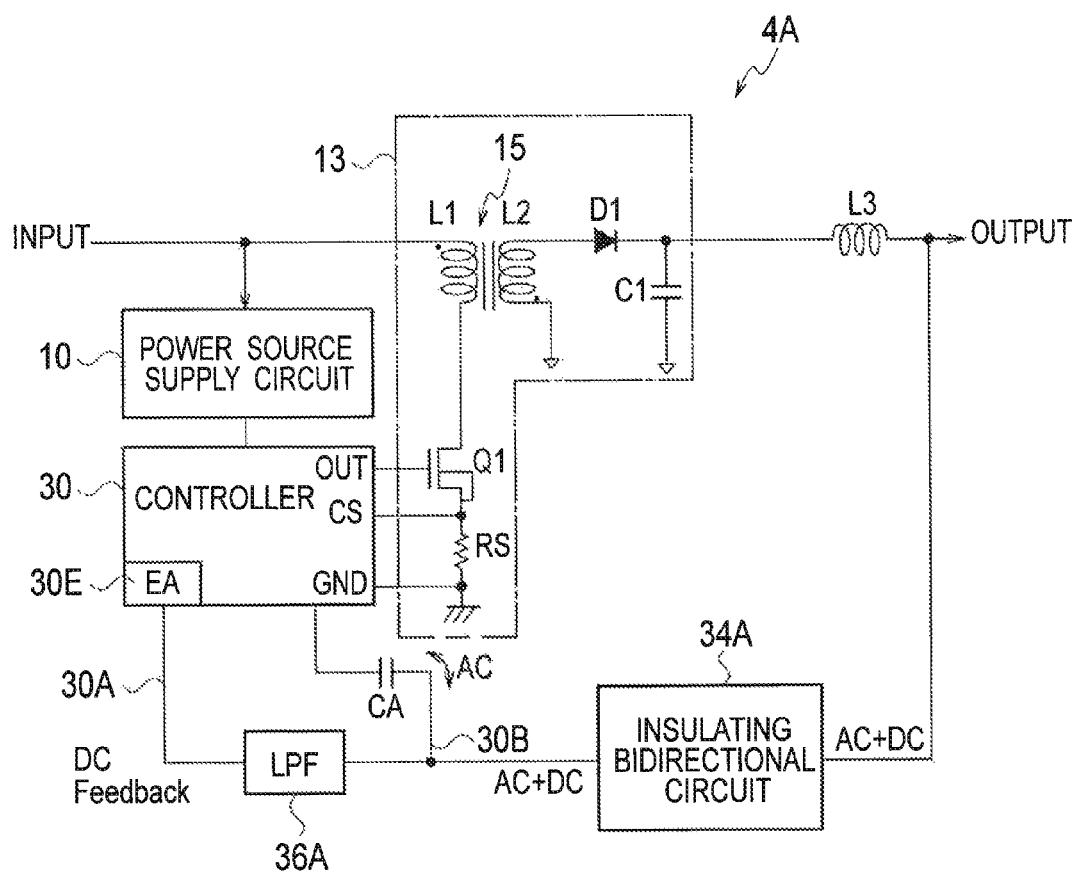
FIG. 46 is a schematic circuit block configuration diagram showing a PD device according to a fourteenth embodiment.

As shown in FIG. 46, a PD device 4A according to a fourteenth embodiment includes: a DC/DC converter 13 disposed between a first terminal and a second terminal, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; A power source supply circuit 10 connected between the first terminal and the primary-side controller 30, and configured to supply a power source to the primary-side controller 30; an insulating bidirectional circuit 34A which is connected to the second terminal and feeds back second terminal information to the primary-side controller 30; a capacitor CA for AC coupling connected to between the insulating bidirectional circuit 34A and the primary-side controllers 30; and a low pass filter (LPF) 36A connected to between the insulating bidirectional circuit 34A and the primary-side controllers 30. In the present embodiment, the LPF 36A may be included in the primary-side controller 30.

Figure 47:
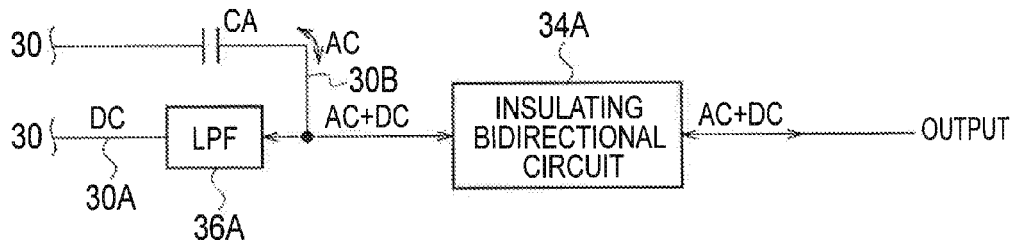
FIG. 47 is a schematic circuit block configuration diagram illustrating an aspect for achieving DC feedback and AC signal common in the fourteenth embodiment.

In the fourteenth embodiment, as shown in FIG. 47, the DC feedback and the AC signal common are achieved by the capacitor CA, the LPF 36A and the insulating bidirectional circuit 34A disposed between the primary-side controller 30 and the second terminal.

In the PD device 4A according to the seventh embodiment, the AC signal is superposed on and input into the second terminal from the outside.

The AC signal input into the second terminal from the outside is fed back to the primary-side controller 30 through the insulating bidirectional circuit 34A and the capacitor CA from the second terminal. The AC signal fed back to the primary-side controller 30 conducts on a connection line 30B between the primary-side controller 30 and the insulating bidirectional circuit 34A.

The DC signal in the second terminal is fed back to the primary-side controller 30 through the insulating bidirectional circuit 34A and the LPF 36A from the second terminal. The DC signal fed back to the primary-side controller 30 conducts on a connection line 30A between the primary-side controller 30 and the LPF 36A. The DC signal fed back to the primary-side controller 30 is input into an error amplifier 30E disposed in the primary-side controller 30, as shown in FIG. 46.

On the other hand, the AC signal transmitted to the second terminal from the primary-side controller 30 (control signal to the connecting targets (set devices) connected to the outside) is transmitted to the second terminal through the capacitor CA and the insulating bidirectional circuit 34A from the primary-side controller 30.

On the basis of the fed back DC signal and the fed back AC signal, the primary-side controller 30 controls ON/OFF of the MOS transistor Q1, thereby stabilizing the output voltage.

Moreover, in the PD device 4A according to the fourteenth embodiment, the amount of current conducted to the primary-side inductance L1 is detected by the current sensing resistor RS, and the amount of current, e.g. a primary-side overcurrent, is controlled in the primary-side controller 30.

As a consequence, the PD device 4A according to the fourteenth embodiment has a variable function of an output voltage value and available output current capacity (MAX value) by the primary-side controller 30.

In the PD device 4A according to the fourteenth embodiment, the control information is transmitted to the primary-side controller 30 through the insulating bidirectional circuit 34A and the LPF 36A from the second terminal, and thereby the output voltage and the available output current capacity (MAX value) can be varied.

An inductance L3 is a separating inductance. More specifically, a filter circuit composed of the inductance L3 and a capacitor C1 separates a control signal from the DC/DC converter so that the control signal from the second terminal is not input into the DC/DC converter 13.

A capacitor, a photo coupler, a transformer, etc. is applicable to the insulating bidirectional circuit 34A. As usage, a bidirectional transformer having an insulated driver, a bilateral device, etc. may also be applied thereto.

In the PD device 4A according to the fourteenth embodiment, the variable function of the output voltage value and the available output current capacity (MAX value) of the step-down (buck) type DC/DC converter 13 is achieved by the feedback control to the primary-side controller 30 through the insulating bidirectional circuit 34A and the LPF 36A from the second terminal. Accordingly, the relationship between the output voltage $V_o$ and the output currents $I_o$ can be varied (variable function) in accordance with loads (e.g., smart phones, laptop PCs, tablet PCs, etc.) connected to the second terminal.

As the relationship between the output voltage $V_o$ and the output current $I_o$ obtained by using the PD device 4A according to the fourteenth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the fourteenth embodiment, there can be provided the PD device having the variable function of the output voltage value and the available output current capacity (MAX value) of the diode rectification and step-down (buck) type DC/DC converter 13, achieved by the feedback control to the primary-side controller 30 from the second terminal through the insulating bidirectional circuit 34A and the LPF 36A.

Figure 48A:
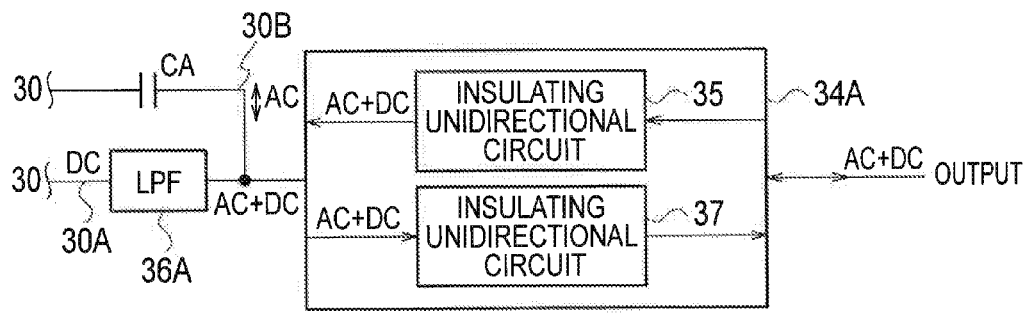
FIG. 48A is a schematic circuit block configuration diagram of an insulating bidirectional circuit applicable to the PD device according to the fourteenth embodiment.

In the PD device 4A according to the fourteenth embodiment, the insulating bidirectional circuit 34A includes a plurality of insulating unidirectional circuits 35, 37, as shown in FIG. 48A. As shown in FIG. 48A, the insulating simplex transmission of AC+DC signal from the second terminal to the primary-side controller 30 is available in the insulating unidirectional circuit 35, and the insulating simplex transmission of AC+DC signal from the second terminal to the primary-side controller 30 is available in the insulating unidirectional circuit 37.

Figure 48B:
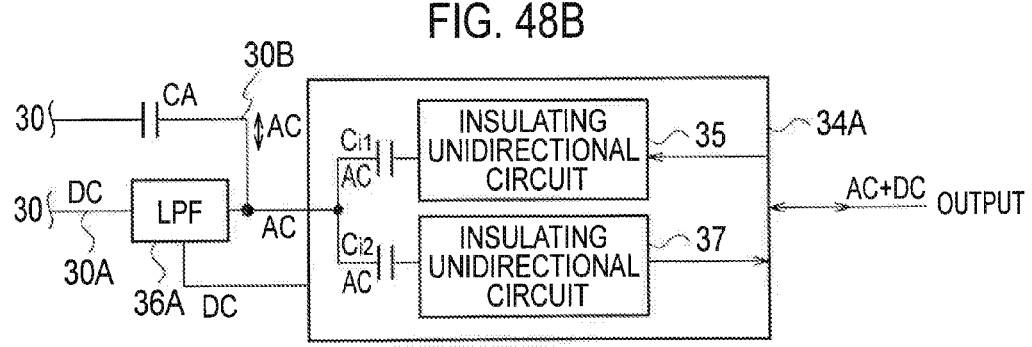
FIG. 48B is a schematic circuit block configuration diagram of an alternative insulating bidirectional circuit applicable to the PD device according to the fourteenth embodiment.
Figure 48C:
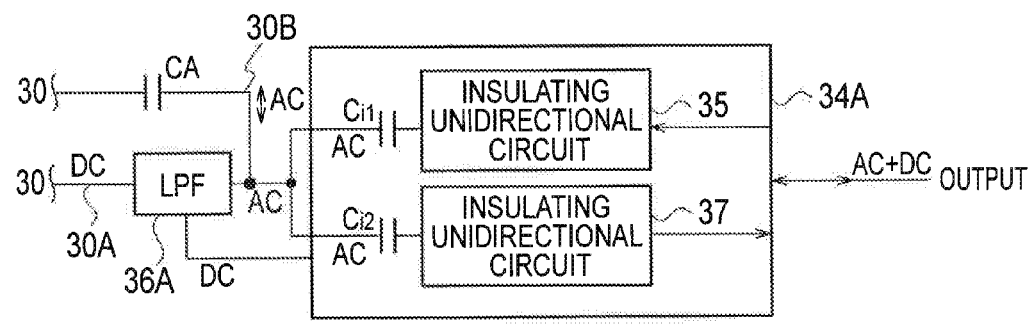
FIG. 48C is a schematic circuit block configuration diagram of still alternative insulating bidirectional circuit applicable to the PD device according to the fourteenth embodiment.

Moreover, in the PD device 4A according to the fourteenth embodiment, the insulating bidirectional circuit 34A includes a plurality of insulating unidirectional circuits 35, 37 and capacitors $C_{i1}$, $C_{i2}$, as shown in FIGS. 48B and 48C. As shown in FIGS. 48B and 48C, the insulating simplex transmission of the AC signal from the second terminal to the primary-side controller 30 is available in the insulating unidirectional circuit 35 and the capacitor $C_{i1}$, and the insulating simplex transmission of the AC signal from the second terminal to the primary-side controller 30 is available in the insulating unidirectional circuit 37 and the capacitor $C_{i2}$. The DC signal conducting between the second terminal and the primary-side controller 30 can be conducted through a DC path in the LPF 36A and the insulating bidirectional circuit 34A.

The electrodes in the primary-side controller 30 side of the capacitors $C_{i1}$, $C_{i2}$ may be connected to each other in the insulating bidirectional circuit 34A as shown in FIG. 48B, and may be connected to each other in the insulating bidirectional circuit 34A as shown in FIG. 48C.

The PD device 4A according to the fourteenth embodiment can be called merely a PD device (PD) in the case of connecting to the external apparatuses using the normal cable, but can be called a USB Power Delivery (USB PD) device in the case where the USB-connecting is available.

Fifteenth Embodiment

Figure 49:
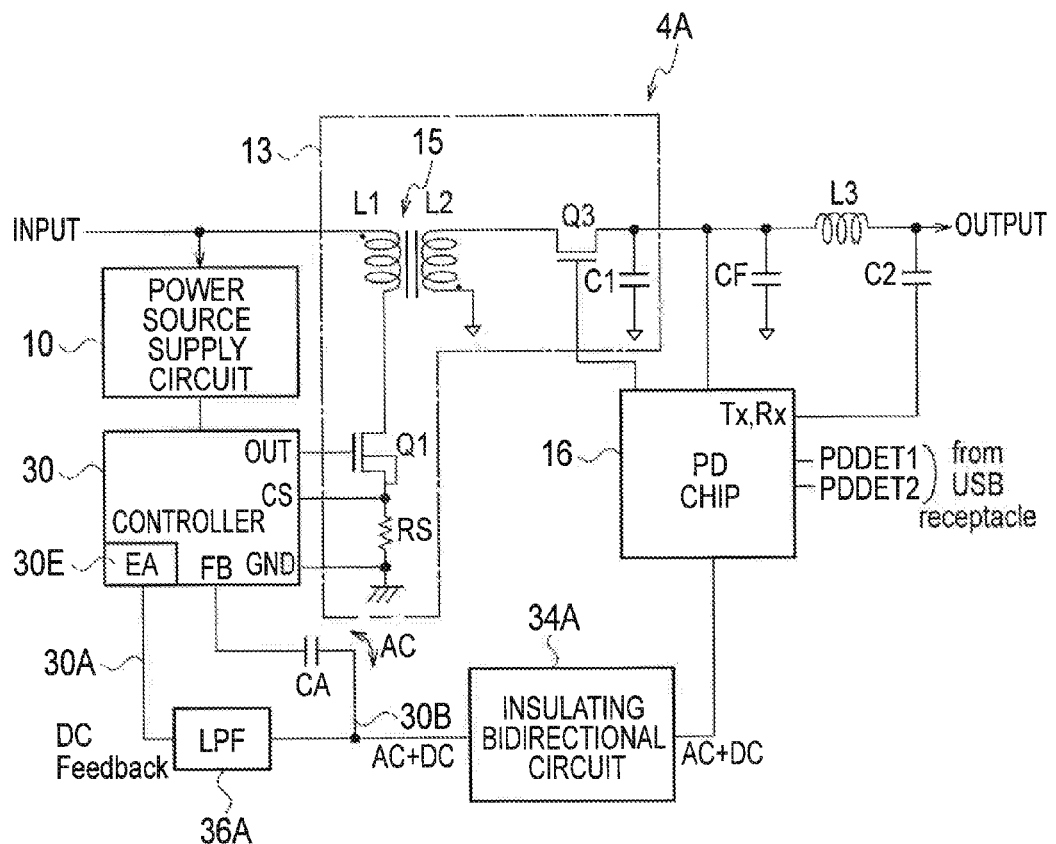
FIG. 49 is a schematic circuit block configuration diagram showing a PD device according to a fifteenth embodiment.

As shown in FIG. 49, a PD device 4A according to a fifteenth embodiment includes: a synchronous rectification type DC/DC converter 13 disposed between a first terminal and a second terminal, and composed of a transformer 15, a MOS transistor Q3, a capacitor C1, and a MOS transistor Q1 and a resistor RS connected in series between a primary-side inductance L1 of the transformer 15 and a ground potential; a primary-side controller 30 configured to control the MOS transistor Q1; A power source supply circuit 10 connected between the first terminal and the primary-side controller 30, and configured to supply a power source to the primary-side controller 30; a secondary-side controller (PD CHIP) 16 connected to the output of the DC/DC converter 13, and also connected to the second terminal through the capacitor C2; an insulating bidirectional circuit 34A which is connected to the secondary-side controller (PD CHIP) 16, and feeds back second terminal information to the primary-side controller 30; a capacitor CA for AC coupling connected to between the insulating bidirectional circuit 34A and the primary-side controllers 30; and a low pass filter (LPF) 36A connected to between the insulating bidirectional circuit 34A and the primary-side controllers 30. In the present embodiment, the LPF 36A may be included in the primary-side controller 30.

The secondary-side controller (PD CHIP) 16 can control the output voltage $V_o$ and the output current $I_o$.

The PD device 4A according to the fifteenth embodiment can improve the DC/DC power conversion efficiency compared with the fourteenth embodiment having the diode rectification system since the synchronizing rectification method is used for the DC/DC converter instead of the diode rectification system. Other configurations are the same as those of the fourteenth embodiment.

A voltage-current control circuit for controlling the output voltage $V_o$ and the output current $I_o$ is included in the secondary-side controller (PD CHIP) 16.

In the fifteenth embodiment, as shown in FIG. 49, the DC feedback and the AC signal common are achieved by the capacitor CA, the LPF 36A and the secondary-side controller 16 disposed between the primary-side controller 30 and the second terminal.

In the PD device 4A according to the fifteenth embodiment, the AC signal is superposed on and input into the second terminal from the outside.

The AC signal input into the second terminal from the outside is fed back to the primary-side controller 30 through the secondary-side controller 16, the insulating bidirectional circuit 34A and the capacitor CA from the second terminal. The AC signal fed back to the primary-side controller 30 conducts on a connection line 30B between the primary-side controller 30 and the insulating bidirectional circuit 34A.

The DC signal in the second terminal is fed back to the primary-side controller 30 through the secondary-side controller 16, the insulating bidirectional circuit 34A and the LPF 36A from the second terminal. The DC signal fed back to the primary-side controller 30 conducts on a connection line 30A between the primary-side controller 30 and the LPF 36A. The DC signal fed back to the primary-side controller 30 is input into an error amplifier 30E disposed in the primary-side controller 30, as shown in FIG. 49.

On the other hand, the AC signal transmitted to the second terminal from the primary-side controller 30 (control signal to the connecting targets (set devices) connected to the outside) is transmitted to the second terminal through the capacitor CA, the insulating bidirectional circuit 34A and the secondary-side controller 16 from the primary-side controller 30.

On the basis of the fed back DC signal and the fed back AC signal, the primary-side controller 30 controls ON/OFF of the MOS transistor Q1, thereby stabilizing the output voltage.

Moreover, the primary-side controller 30 detects the amount of the current conducted to the primary-side inductance L1 by the current sensing resistor RS, thereby controlling the amount of the current, such as a primary-side overcurrent.

As a consequence, the PD device 4A according to the fifteenth embodiment has a variable function of an output voltage value and available output current capacity (MAX value) by the primary-side controller 30.

In the PD device 4A according to the fifteenth embodiment, the control information is transmitted to the primary-side controller 30 through the secondary-side controller 16, the insulating bidirectional circuit 34A and the LPF 36A from the second terminal, and thereby the output voltage and the available output current capacity (MAX value) can be varied.

An inductance L3 is a separating inductance. More specifically, a filter circuit composed of the inductance L3 and a capacitor CF separates a control signal from the DC/DC converter so that the control signal from the second terminal is not input into the DC/DC converter 13. In the present embodiment, the capacitor C1 can also be applied thereto, omitting the capacitor CF.

A capacitor, a photo coupler, a transformer, etc. is applicable to the insulating bidirectional circuit 34A. As usage, a bidirectional transformer having an insulated driver, a bilateral device, etc. may also be applied thereto. The insulating bidirectional circuit 34A may also be composed of a plurality of the insulating unidirectional circuits, as shown in FIGS. 48A, 48B, and 48C.

In the PD device 4A according to the fifteenth embodiment, the variable function of the output voltage value and the available output current capacity (MAX value) of the step-down (buck) type DC/DC converter 13 is achieved by the feedback control to the primary-side controller 30 through the secondary-side controller 16, the insulating bidirectional circuit 34A and the LPF 36A from the second terminal. Accordingly, the relationship between the output voltage $V_o$ and the output currents $I_o$ can be varied (variable function) in accordance with loads (e.g., smart phones, laptop PCs, tablet PCs, etc.) connected to the second terminal.

As the relationship between the output voltage $V_o$ and the output current $I_o$ obtained by using the PD device 4A according to the fifteenth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the fifteenth embodiment, achieved by the feedback control to the primary-side controller 30 from the second terminal through the secondary-side controller 16, the insulating bidirectional circuit 34A and the LPF 36A, there can be provided the PD device having the variable function of the output voltage value and the available output current capacity (MAX value) of the diode rectification and step-down (buck) type DC/DC converter 13.

In the PD device 4A according to the fifteenth embodiment, since the secondary-side controller (PD CHIP) 16 is able to USB-connect, the PD device 4A according to the fifteenth embodiment can be called a USB Power Delivery (USB PD) device.

In addition, the PD device 4A according to the fifteenth embodiment may include an AC/DC converter connected to the AC input (first terminal) and composed of a fuse, a choke coil, a diode rectification bridge capacitor etc., instead of the power source supply circuit 10 shown in FIG. 49.

Sixteenth Embodiment

Figure 50:
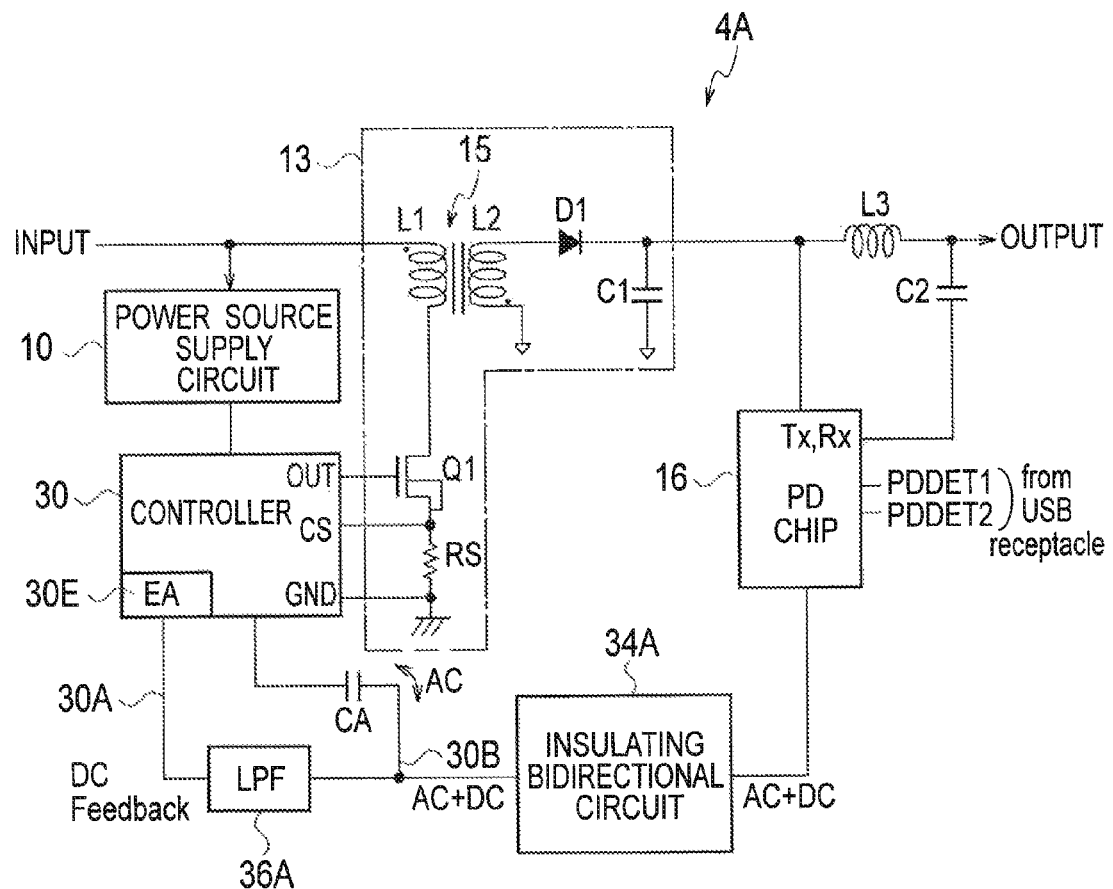
FIG. 50 is a schematic circuit block configuration diagram showing a PD device according to a sixteenth embodiment.

As shown in FIG. 50, a PD device 4A according to a sixteenth embodiment includes: a DC/DC converter 13 disposed between a first terminal and a second terminal, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; A power source supply circuit 10 connected between the first terminal and the primary-side controller 30, and configured to supply a power source to the primary-side controller 30; a secondary-side controller (PD CHIP) 16 connected to the output of the DC/DC converter 13, and also connected to the second terminal through the capacitor C2; an insulating bidirectional circuit 34A which is connected to the secondary-side controller (PD CHIP) 16, and feeds back second terminal information to the primary-side controller 30; a capacitor CA for AC coupling connected to between the insulating bidirectional circuit 34A and the primary-side controllers 30; and a low pass filter (LPF) 36A connected to between the insulating bidirectional circuit 34A and the primary-side controllers 30. In the present embodiment, the LPF 36A may be included in the primary-side controller 30.

The secondary-side controller (PD CHIP) 16 can control the output voltage $V_o$ and the output current $I_o$, and a voltage-current control circuit for controlling the output voltage $V_o$ and the output current $I_o$ is included in the secondary-side controller (PD CHIP) 16.

Also in the sixteenth embodiment, as shown in FIG. 50, the DC feedback and the AC signal common are achieved by the capacitor CA, the LPF 36A and the secondary-side controller 16 disposed between the primary-side controller 30 and the second terminal, as in the case of the fifteenth embodiment. Other configurations are the same as those of the fifteenth embodiment.

In the PD device 4A according to the sixteenth embodiment, the variable function of the output voltage value and the available output current capacity (MAX value) of the step-down (buck) type DC/DC converter 13 is achieved by the feedback control to the primary-side controller 30 through the secondary-side controller 16, the insulating bidirectional circuit 34A and the LPF 36A from the second terminal. Accordingly, the relationship between the output voltage $V_o$ and the output currents $I_o$ can be varied (variable function) in accordance with loads (e.g., smart phones, laptop PCs, tablet PCs, etc.) connected to the second terminal.

As the relationship between the output voltage $V_o$ and the output current $I_o$ obtained by using the PD device 4A according to the sixteenth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the sixteenth embodiment, there can be provided the PD device having the variable function of the output voltage value and the available output current capacity (MAX value) of the diode rectification and step-down (buck) type DC/DC converter 13, achieved by the feedback control to the primary-side controller 30 from the second terminal through the secondary-side controller 16, the insulating bidirectional circuit 34A and the LPF 36A.

In the PD device 4A according to the sixteenth embodiment, since the secondary-side controller (PD CHIP) 16 is able to USB-connect, the PD device 4A according to the fifteenth embodiment can be called a USB Power Delivery (USB PD) device.

Seventeenth Embodiment

Figure 51:
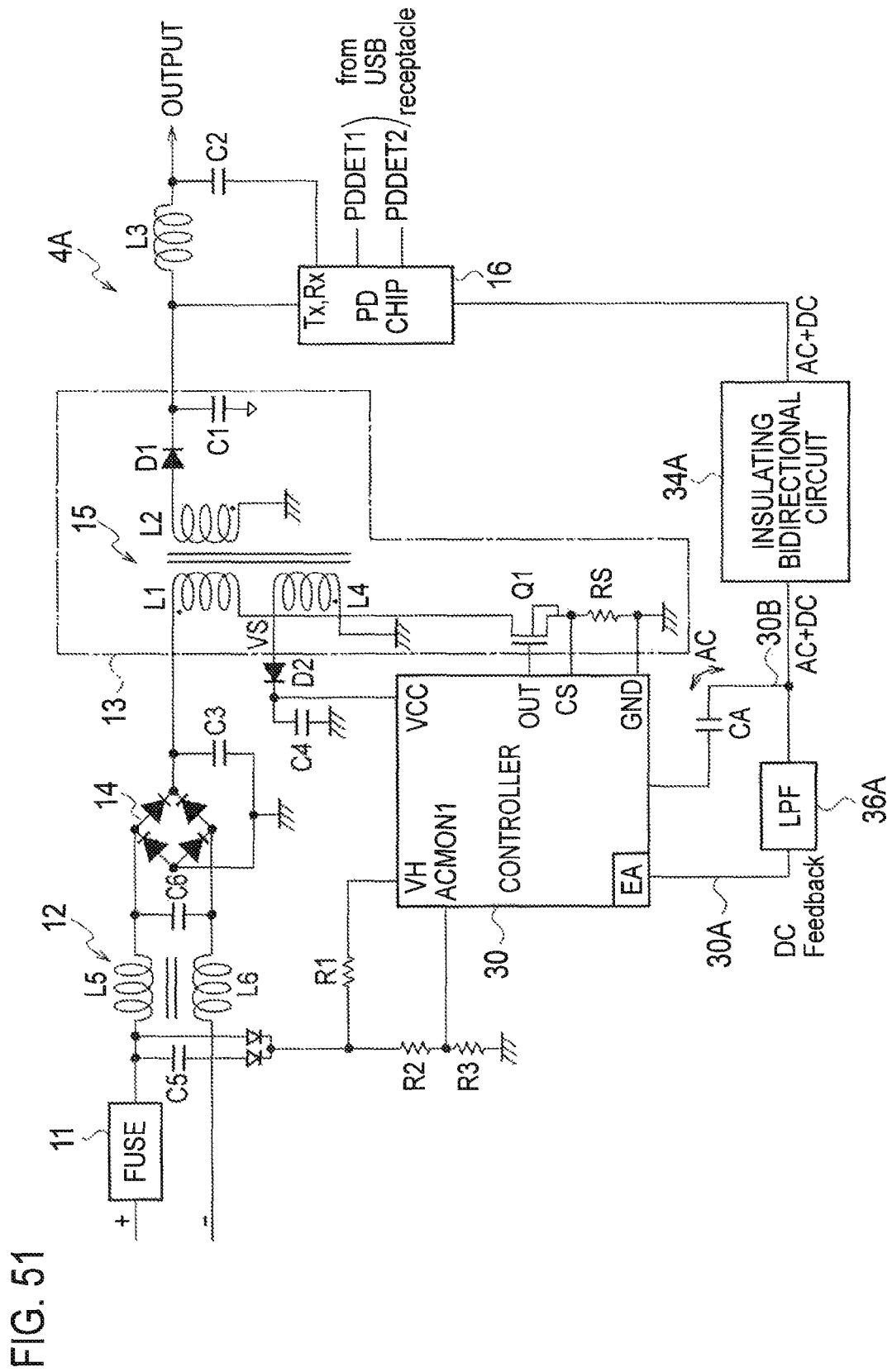
FIG. 51 is a schematic circuit block configuration diagram showing a PD device according to a seventeenth embodiment.

As shown in FIG. 51, a PD device 4A according to a seventeenth embodiment includes an AC/DC converter connected to the AC input (first terminal) and composed of a fuse 11, a choke coil 12, a diode rectification bridge 14, capacitors C5, C6, C3, etc., instead of the power source supply circuit 10 as in the sixteenth embodiment.

Moreover, an auxiliary inductance L4 composed of the primary-side auxiliary winding in the transformer 15, and a diode D2 and a capacitor C4 connected in parallel to the auxiliary inductance L4 are provided therein, and the DC voltage VCC is supplied from the capacitor C4 to the primary-side controller 30.

Furthermore, as shown in FIG. 51, the PD device 4A according to the seventeenth embodiment includes: a DC/DC converter 13 disposed between the output of AC/DC converter and a second terminal, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a secondary-side controller (PD CHIP) 16 connected to the output of the DC/DC converter 13, and also connected to the second terminal through the capacitor C2; an insulating bidirectional circuit 34A which is connected to the secondary-side controller (PD CHIP) 16, and feeds back second terminal information to the primary-side controller 30; a capacitor CA for AC coupling connected to between the insulating bidirectional circuit 34A and the primary-side controllers 30; and a low pass filter (LPF) 36A connected to between the insulating bidirectional circuit 34A and the primary-side controllers 30. In the present embodiment, the LPF 36A may be included in the primary-side controller 30. Other configurations are the same as those of the sixteenth embodiment.

In the PD device 4A according to the seventeenth embodiment, the variable function of the output voltage value and the available output current capacity (MAX value) of the step-down (buck) type DC/DC converter 13 is achieved by the feedback control to the primary-side controller 30 through the secondary-side controller 16, the insulating bidirectional circuit 34A and the LPF 36A from the second terminal. Accordingly, the relationship between the output voltage $V_o$ and the output currents $I_o$ can be varied (variable function) in accordance with loads (e.g., smart phones, laptop PCs, tablet PCs, etc.) connected to the second terminal.

As the relationship between the output voltage $V_o$ and the output current $I_o$ obtained by using the PD device 4A according to the seventeenth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

According to the seventeenth embodiment, there can be provided the PD device having the variable function of the output voltage value and the available output current capacity (MAX value) of the diode rectification and step-down (buck) type DC/DC converter 13, achieved by the feedback control to the primary-side controller 30 from the second terminal through the secondary-side controller 16, the insulating bidirectional circuit 34A and the LPF 36A.

In the PD device 4A according to the seventeenth embodiment, since the secondary-side controller (PD CHIP) 16 is able to USB-connect, the PD device 4A according to the thirteenth embodiment can be called a USB Power Delivery (USB PD) device having the AC/DC converter function (AC/DC+USB PD).

Eighth Embodiment

Figure 52:
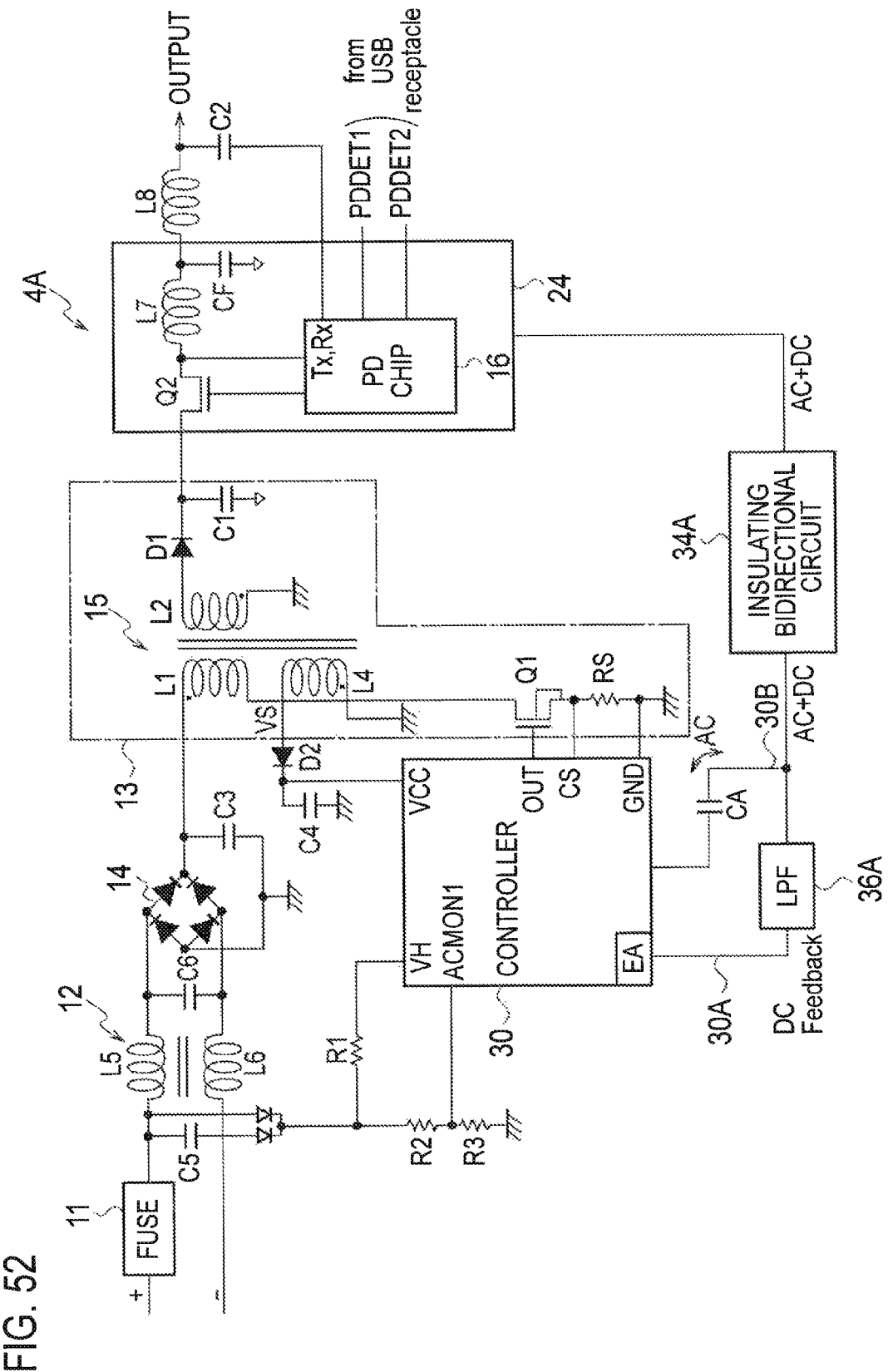
FIG. 52 is a schematic circuit block configuration diagram showing a PD device according to an eighteenth embodiment.

As shown in FIG. 52, a PD device 4A according to an eighteenth embodiment includes an independent DC/DC converter 24 which is connected to the output of the step-down (buck) type DC/DC converter 13 and which includes the secondary-side controller (PD CHIP) 16 therein. Moreover, the PD device 4A according to the eighteenth embodiment includes an AC/DC converter connected to the AC input (first terminal) and composed of a fuse 11, a choke coil 12, a diode rectification bridge 14, capacitors C5, C6, C3, as in the case of the seventeenth embodiment.

The synchronous rectification type DC/DC converter 24 is composed of the MOS transistor Q2, the inductance L7, and the secondary-side controller (PD CHIP) 16. The secondary-side controller (PD CHIP) 16 is connected to the gate of the MOS transistor Q2, and the secondary-side controller (PD CHIP) 16 controls ON/OFF of the MOS transistor Q2. The inductance L7 is an inductance used for the DC/DC converter 24.

An inductance L8 is a PD separating inductance. More specifically, a filter circuit composed of the inductance L8 and a capacitor CF separates a control signal from the DC/DC converter so that the control signal from the second terminal side is not input into the DC/DC converter 24.

Furthermore, as shown in FIG. 52, the PD device 4A according to the eighteenth embodiment includes: a DC/DC converter 13 disposed between the output of the AC/DC converter and the output of the DC/DC converter, and composed of a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a secondary-side controller (PD CHIP) 16 DC-connected to the second terminal, and AC-connected through the capacitor C2; An insulating bidirectional circuit 34A which is connected to the secondary-side controller (PD CHIP) 16, and feeds back second terminal information to the primary-side controller 30; a capacitor CA for AC coupling connected to between the insulating bidirectional circuit 34A and the primary-side controllers 30; and a low pass filter (LPF) 36A connected to between the insulating bidirectional circuit 34A and the primary-side controllers 30. In the present embodiment, the LPF 36A may be included in the primary-side controller 30.

An inductance L8 is a separating inductance. More specifically, a filter circuit composed of the inductance L8 and a capacitor CF separates a control signal from the DC/DC converter so that the control signal from the second terminal side is not input into the DC/DC converter 24. Other configurations are the same as those of the seventeenth embodiment.

A voltage-current control circuit for controlling the output voltage $V_o$ and the output current $I_o$ is included in the secondary-side controller (PD CHIP) 16.

In the eighteenth embodiment, as shown in FIG. 52, the DC feedback and the AC signal common are achieved by the capacitor CA, the LPF 36A and the secondary-side controller 16 disposed between the primary-side controller 30 and the second terminal.

The AC signal input into the second terminal from the outside is fed back to the primary-side controller 30 through the secondary-side controller 16, the insulating bidirectional circuit 34A and the capacitor CA from the second terminal. The AC signal fed back to the primary-side controller 30 conducts on a connection line 30B between the primary-side controller 30 and the insulating bidirectional circuit 34A.

The DC signal in the second terminal is fed back to the primary-side controller 30 through the secondary-side controller 16, the insulating bidirectional circuit 34A and the LPF 36A from the second terminal. The DC signal fed back to the primary-side controller 30 conducts on a connection line 30A between the primary-side controller 30 and the LPF 36A. The DC signal fed back to the primary-side controller 30 is input into an error amplifier 30E disposed in the primary-side controller 30, as shown in FIG. 52.

On the other hand, the AC signal transmitted to the second terminal from the primary-side controller 30 (control signal to the connecting targets (set devices) connected to the outside) is transmitted to the second terminal through the capacitor CA, the insulating bidirectional circuit 34A and the secondary-side controller 16 from the primary-side controller 30.

On the basis of the fed back DC signal and the fed back AC signal, the primary-side controller 30 controls ON/OFF of the MOS transistor Q1, thereby stabilizing the output voltage.

Moreover, the primary-side controller 30 detects the amount of the current conducted to the primary-side inductance L1 by the current sensing resistor RS, thereby controlling the amount of the current, such as a primary-side overcurrent.

As a consequence, the PD device 4A according to the eighteenth embodiment has a variable function of an output voltage value and available output current capacity (MAX value) by the primary-side controller 30.

In the PD device 4A according to the eighteenth embodiment, the control information is transmitted to the primary-side controller 30 through the secondary-side controller 16, the insulating bidirectional circuit 34A and the LPF 36A from the second terminal, and thereby the output voltage and the available output current capacity (MAX value) can be varied.

A capacitor, a photo coupler, a transformer, etc. is applicable to the insulating bidirectional circuit 34A. As usage, a bidirectional transformer having an insulated driver, a bilateral device, etc. may also be applied thereto. Moreover, the insulating bidirectional circuit 34A may also be composed of a plurality of the insulating unidirectional circuits, as shown in FIGS. 48A, 48B, and 48C.

In the PD device 4A according to the eighteenth embodiment, the variable function of the output voltage value and the available output current capacity (MAX value) of the step-down (buck) type DC/DC converter 13 is achieved by the feedback control to the primary-side controller 30 through the secondary-side controller 16, the insulating bidirectional circuit 34A and the LPF 36A from the second terminal. Accordingly, the relationship between the output voltage $V_o$ and the output currents $I_o$ can be varied (variable function) in accordance with loads (e.g., smart phones, laptop PCs, tablet PCs, etc.) connected to the second terminal.

As the relationship between the output voltage $V_o$ and the output current $I_o$ obtained by using the PD device 4A according to the eighteenth embodiment, there can be adopted various shape, e.g. a rectangular shape as shown in FIG. 3A, an inverted trapezoidal shape as shown in FIG. 3B, an inverted triangle shape as shown in FIG. 3C, a trapezoidal shape as shown in FIG. 3D, and a pentagonal shape as shown in FIG. 3E.

In the PD device 4A according to the eighteenth embodiment, the variable function of the output voltage value and the available output current capacity (MAX value) of the synchronous rectification type DC/DC converter 24 is achieved by the secondary-side controller (PD CHIP) 16 included in the synchronous rectification type DC/DC converter 24. Accordingly, the relationship between the output voltage $V_o$ and the output currents $I_o$ can be varied (variable function) in accordance with loads (e.g., smart phones, laptop PCs, tablet PCs, etc.) connected to the second terminal.

According to the eighteenth embodiment, the output voltage of diode rectification and step-down (buck) type DC/DC converter 13 is stabilized by the feedback control from the output of step-down (buck) type DC/DC converter to the primary-side controller 30, and the variable function of the output voltage value and the available output current capacity (MAX value) of the synchronous rectification type DC/DC converter 24 connected to the DC/DC converter 13 is achieved by the secondary-side controller (PD CHIP) 16 included in the synchronous rectification type DC/DC converter 24.

As a consequence, according to eighteenth embodiment, there can be provided the PD device having the variable function of the output voltage value and the available output current capacity (MAX value) of the diode rectification and step-down (buck) type DC/DC converter 13.

In the PD device 4A according to the eighteenth embodiment, since the secondary-side controller (PD CHIP) 16 is able to USB-connect, the PD device 4A according to the thirteenth embodiment can be called a USB Power Delivery (USB PD) device having the AC/DC converter function (AC/DC+USB PD).

A point that the PD device according to the seventh to eighth embodiments can also be included in the AC adapter is the same as that of the first to sixth embodiments. Accordingly, the duplicated description thereof is omitted hereinafter.

A point that the PD device according to the seventh to eighth embodiments can also be included in the electronic apparatuses is the same as that of the first to sixth embodiments. Accordingly, the duplicated description thereof is omitted hereinafter.

A point that the PD device according to the seventh to eighth embodiments can also apply the protection function thereto is the same as that of the first to sixth embodiments. Accordingly, the duplicated description thereof is omitted hereinafter.

The Plug structure applicable to the adapter and the electronic apparatuses including the PD device according to the seventh to eighth embodiments is the same as that of the first to sixth embodiments. Accordingly, the duplicated description thereof is omitted hereinafter.

A point that the PD device according to the seventh to eighth embodiments can also apply the PD system thereto is the same as that of the first to sixth embodiments. Accordingly, the duplicated description thereof is omitted hereinafter.

As explained above, according to the present invention, there is provided the PD device, the AC adapter, the electronic apparatus, and the PD system each which can control the variable function of the output voltage value and the available output current capacity (MAX value).

Other Embodiments

While the solution testing equipments are described in accordance with the embodiments, it should be understood that the description and drawings that configure part of this disclosure are merely instances, and are not intended to limit the present invention. This disclosure makes clear a variety of alternative embodiments, working examples, and operational techniques for those skilled in the art.

Such being the case, the present invention covers a variety of embodiments, whether described or not.

What is claimed is:

1. A power delivery device comprising:
a DC/DC converter disposed between an input and an output;
a primary-side controller configured to control an input current of the DC/DC converter;
a secondary-side controller connected with AC coupling to the output, the secondary-side controller configured to feed back electric power information of the output to the primary-side controller;
an insulation circuit connected to the secondary-side controller, the insulation circuit configured to feed back the electric power information of the output to the primary-side controller; and
a DC/AC component separating circuit connected to the insulation circuit, the DC/AC component separating circuit configured to feed back the electric power information of the output to the primary-side controller, wherein
the insulation circuit is an insulating bidirectional circuit connected with DC coupling to an output of the DC/DC converter, wherein
the primary-side controller varies an output voltage value and an available output current capacity of the DC/DC converter by controlling the input current on the basis of the electric power information fed back from the secondary-side controller through the insulation circuit and the DC/AC component separating circuit.

2. The power delivery device according to claim 1 further comprising:
an error amplifier for error compensation connected to the secondary-side controller, the error amplifier configured to feed back the electric power information of the output to the insulation circuit.

3. A power delivery device comprising:
a DC/DC converter disposed between an input and an output;

a primary-side controller configured to control an input current of the DC/DC converter;

an AC coupling capacitor connected to the output;

an insulation circuit connected to the output through the AC coupling capacitor, the insulation circuit configured to feed back the electric power information of the output to the primary-side controller; and a DC/AC component separating circuit connected to the insulation circuit, the DC/AC component separating circuit configured to feed back the electric power information of the output to the primary-side controller, wherein the insulation circuit is an insulating bidirectional circuit connected with DC coupling to an output of the DC/DC converter, wherein the primary-side controller varies an output voltage value and an available output current capacity of the DC/DC converter by controlling the input current on the basis of the electric power information fed back from the insulation circuit through the DC/AC component separating circuit.

4. The power delivery device according to claim 1, wherein the electric power information includes DC information in the output, and AC information AC-superposed on the DC information to be input into the output from an outside.

5. The power delivery device according to claim 1 further comprising:

a power source supply circuit connected between the input and the primary-side controller, the power source supply circuit configured to supply a power source to the primary-side controller.

6. The power delivery device according to claim 1 further comprising:

an AC input; and an AC/DC converter connected between the AC input and an input of the DC/DC converter.

7. The power delivery device according to claim 3 further comprising:

an error amplifier for error compensation connected to the output through the AC coupling capacitor, the error amplifier configured to feed back the electric power information of the output to the insulation circuit.

8. The power delivery device according to claim 7, wherein the insulating bidirectional circuit feeds back AC information in the primary-side controller to the output.

9. The power delivery device according to claim 3 further comprising:

a capacitor disposed between the output and the insulating bidirectional circuit, wherein the insulating bidirectional circuit is connected with AC coupling to the output through the capacitor.

10. The power delivery device according to claim 3, wherein the DC/AC component separating circuit comprises a low pass filter and a DC component eliminating circuit.

11. The power delivery device according to claim 3 further comprising:

a low pass filter connected to the insulation circuit, the low pass filter configured to feed back a DC component of the electric power information to the primary-side controller, wherein the insulation circuit is an insulating bidirectional circuit connected with DC coupling to an output of the DC/DC converter.

12. The power delivery device according to claim 11, wherein the insulating bidirectional circuit feeds back AC information in the primary-side controller to the output through the AC coupling capacitor.

13. The power delivery device according to claim 11 further comprising:

an inductance connected between the output and an output of the DC/DC converter, wherein an AC component of the electric power information is separated between the output and the output of the DC/DC converter.

14. An AC Adapter comprising a power delivery device, wherein the power delivery device comprises:

a DC/DC converter disposed between an input and an output;

a primary-side controller configured to control an input current of the DC/DC converter;

a secondary-side controller connected with AC coupling to the output, the secondary-side controller configured to feed back electric power information of the output to the primary-side controller;

an insulation circuit connected to the secondary-side controller, the insulation circuit configured to feed back the electric power information of the output to the primary-side controller; and a DC/AC component separating circuit connected to the insulation circuit, the DC/AC component separating circuit configured to feed back the electric power information of the output to the primary-side controller, wherein the insulation circuit is an insulating bidirectional circuit connected with DC coupling to an output of the DC/DC converter, wherein the primary-side controller varies an output voltage value and an available output current capacity of the DC/DC converter by controlling the input current on the basis of the electric power information fed back from the secondary-side controller through the insulation circuit and the DC/AC component separating circuit.

15. An electronic apparatus comprising a power delivery device, wherein the power delivery device comprises:

a DC/DC converter disposed between an input and an output;

a primary-side controller configured to control an input current of the DC/DC converter;

a secondary-side controller connected with AC coupling to the output, the secondary-side controller configured to feed back electric power information of the output to the primary-side controller;

an insulation circuit connected to the secondary-side controller, the insulation circuit configured to feed back the electric power information of the output to the primary-side controller; and a DC/AC component separating circuit connected to the insulation circuit, the DC/AC component separating circuit configured to feed back the electric power information of the output to the primary-side controller, wherein the insulation circuit is an insulating bidirectional circuit connected with DC coupling to an output of the DC/DC converter, wherein the primary-side controller varies an output voltage value and an available output current capacity of the DC/DC converter by controlling the input current on the basis of the electric power information fed back from the secondary-side controller through the insulation circuit and the DC/AC component separating circuit.

16. A power delivery system comprising a power delivery device, wherein the power delivery device comprises:

a DC/DC converter disposed between an input and an output;

a primary-side controller configured to control an input current of the DC/DC converter;

a secondary-side controller connected with AC coupling to the output, the secondary-side controller configured to feed back electric power information of the output to the primary-side controller;

an insulation circuit connected to the secondary-side controller, the insulation circuit configured to feed back the electric power information of the output to the primary-side controller; and a DC/AC component separating circuit connected to the insulation circuit, the DC/AC component separating circuit configured to feed back the electric power information of the output to the primary-side controller, wherein the insulation circuit is an insulating bidirectional circuit connected with DC coupling to an output of the DC/DC converter, wherein the primary-side controller varies an output voltage value and an available output current capacity of the DC/DC converter by controlling the input current on the basis of the electric power information fed back from the secondary-side controller through the insulation circuit and the DC/AC component separating circuit.

* * * * *